United States Patent
Zmijewski et al.

(10) Patent No.: US 10,552,137 B2
(45) Date of Patent: Feb. 4, 2020

(54) METHOD AND APPARATUS FOR RUNNING MOBILE DEVICE SOFTWARE

(71) Applicant: IRON GAMING LIMITED, Swatar (MT)

(72) Inventors: Peter Marek Zmijewski, Singapore (SG); Scott Matthew Dowdell, Singapore (SG)

(73) Assignee: IRON GAMING LIMITED, Swatar (MT)

( * ) Notice: Subject to any disclaimer, the term of this patent is extended or adjusted under 35 U.S.C. 154(b) by 0 days.

(21) Appl. No.: 16/072,509

(22) PCT Filed: May 18, 2018

(86) PCT No.: PCT/SG2018/050243
§ 371 (c)(1),
(2) Date: Jul. 25, 2018

(87) PCT Pub. No.: WO2019/032045
PCT Pub. Date: Feb. 14, 2019

(65) Prior Publication Data
US 2019/0310837 A1    Oct. 10, 2019

(30) Foreign Application Priority Data

Aug. 7, 2017  (SG) ................. PCT/SG2017/050395
Jan. 16, 2018  (SG) ................. PCT/SG2018/050024

(51) Int. Cl.
*G06F 9/455*       (2018.01)
*G06F 9/24*        (2006.01)
(Continued)

(52) U.S. Cl.
CPC ............... *G06F 8/61* (2013.01); *G06F 9/451* (2018.02); *G06F 16/986* (2019.01);
(Continued)

(58) Field of Classification Search
CPC ..... G06F 8/60; G06F 8/71; G06F 8/61; G06F 8/62; G06F 9/455; G06F 9/45537; G06F 9/441
See application file for complete search history.

(56) References Cited

U.S. PATENT DOCUMENTS 7,925,250 B2 *    4/2011   Redpath .............. G06F 9/45537
                                                  455/418
2003/0156131 A1   8/2003   Khazaka
(Continued)

FOREIGN PATENT DOCUMENTS

| CN | 103176899 A | 6/2013 |
| CN | 105573817 A | 5/2016 |
| EP | 2821994 A2  | 1/2015 |

OTHER PUBLICATIONS

Jeremy Andrus et al., Teaching Operating Systems using Android, Feb. 29-Mar. 3, 2012, [Retrieved on Aug. 16, 2019]. Retrieved from the internet: <URL: https://dl.acm.org/citation.cfm?id=2157312> 6 Pages (613-618) (Year: 2012).*

(Continued)

*Primary Examiner* — Anibal Rivera
(74) *Attorney, Agent, or Firm* — Thompson Hine LLP

(57) ABSTRACT

A method and an apparatus for running mobile device software, the method comprising: receiving a request to run mobile device software on the apparatus; activating an application of the apparatus to determine whether a platform for operating the mobile device software is installed on the apparatus and whether the mobile device software is installed on the apparatus; downloading and installing the platform and/or the mobile device software, if applicable; determining screen size and/or orientation for displaying graphical contents of the mobile device software on a display; running the mobile device software through the platform; displaying translated graphical contents of the (Continued)

mobile device software on the display; and converting user controls received at the apparatus to controls for the mobile device software based on predefined configuration data, wherein the platform is configured to operate in an existing operating system of the apparatus not originally configured to run the mobile device software.

43 Claims, 19 Drawing Sheets

(51) Int. Cl.
*G06F 8/61* (2018.01)
*H04N 21/431* (2011.01)
*G06F 16/958* (2019.01)
*G06F 9/451* (2018.01)
*G06F 8/60* (2018.01)
*G06F 8/71* (2018.01)
*G06F 9/4401* (2018.01)

(52) U.S. Cl.
CPC ........... *H04N 21/4316* (2013.01); *G06F 8/60* (2013.01); *G06F 8/71* (2013.01); *G06F 9/441* (2013.01); *G06F 9/455* (2013.01)

(56) References Cited

U.S. PATENT DOCUMENTS

| | | | | |
|---|---|---|---|---|
| 2004/0002382 A1* | 1/2004 | Ho | ................... | H04M 1/72525 463/41 |
| 2007/0015458 A1* | 1/2007 | Corbett | ................... | A63F 13/12 455/3.06 |
| 2009/0182546 A1* | 7/2009 | Gentric | ............... | G06F 9/45537 703/27 |
| 2010/0027530 A1* | 2/2010 | Hsieh | ................... | H04M 1/2473 370/352 |
| 2010/0211769 A1* | 8/2010 | Shankar | ................... | G06F 9/441 713/2 |
| 2011/0154305 A1* | 6/2011 | LeRoux | ..................... | G06F 8/71 717/140 |
| 2011/0314389 A1* | 12/2011 | Meredith | ................... | G06F 8/60 715/751 |
| 2012/0005691 A1* | 1/2012 | Wong | ...................... | G06F 9/541 719/319 |
| 2012/0084542 A1* | 4/2012 | Reeves | ................... | G06F 13/14 713/1 |
| 2012/0245918 A1* | 9/2012 | Overton | ................... | G06F 9/455 703/27 |
| 2012/0252405 A1* | 10/2012 | Lortz | ........................ | G06F 8/60 455/410 |
| 2013/0047149 A1* | 2/2013 | Xu | ............................ | G06F 8/61 717/175 |
| 2014/0108496 A1* | 4/2014 | Heller | ................... | G06F 16/951 709/203 |
| 2014/0137100 A1* | 5/2014 | Won | ........................ | G06F 8/61 717/176 |
| 2015/0067819 A1* | 3/2015 | Shribman | ............... | H04L 67/06 726/12 |
| 2015/0186126 A1* | 7/2015 | Ivanov | ...................... | G06F 8/61 717/174 |
| 2015/0378709 A1* | 12/2015 | D'Amico | ................... | G06F 8/61 717/176 |
| 2018/0109624 A1* | 4/2018 | Jayaraman | ............ | H04L 67/141 |
| 2018/0109625 A1* | 4/2018 | Jayaraman | ............ | H04L 67/141 |

OTHER PUBLICATIONS

PVR Murthy, Efficient Parallel Browser for Mobile Devices, Feb. 18-20, 2016, [Retrieved on Aug. 16, 2019]. Retrieved from the internet: <URL: https://dl.acm.org/citation.cfm?id=2856660> 1 Pages (198-198) (Year: 2016).*
PCT, Intellectual Property Office of Singapore, International Search Report and Written Opinion of the International Searching Authority, International Application No. PCT/SG2018/050243, 10 pages, dated Aug. 1, 2018.
PCT, Intellectual Property Office of Singapore, International Search Report and Written Opinion of the International Searching Authority, International Application No. PCT/SG2018/050024, 10 pages, dated Mar. 26, 2018.
PCT, Intellectual Property Office of Singapore, International Search Report, International Application No. PCT/SG2017/050395, 3 pages, dated Sep. 13, 2017.
PCT, Intellectual Property Office of Singapore, Written Opinion of the International Searching Authority, International Application No. PCT/SG2017/050395, 6 pages, completed Sep. 8, 2017 (dated Sep. 13, 2017).

* cited by examiner

Virtualization Block Diagram

METHOD AND APPARATUS FOR RUNNING MOBILE DEVICE SOFTWARE

FIELD OF THE INVENTION

The present invention relates to a method and an apparatus for running mobile device software, in particular, running the mobile device software originally run in a mobile device operating system in an existing operating system of the apparatus not originally configured to run the mobile device software. The method and apparatus cover translating graphical contents of the mobile device software for displaying on a browser.

BACKGROUND

In today's society, digital mobile devices are prevalent and penetration rates in developed economies are substantial. In this regard, an increasing amount of digital content is consumed on the digital mobile devices, and correspondingly, a decreasing amount of digital content is consumed on personal computers (desktop and laptop).

One of the reasons for the decreasing amount of digital content consumed on personal computers is because an increasing volume of software is developed solely for digital mobile devices and not for personal computers. Software which is developed solely for digital mobile devices cannot be easily consumed on personal computers. Such software requires either costly software development for use on specific personal computer operating systems or the use of emulators. However, emulators currently in use are typically for technically inclined users and not for mainstream users. Generally, the usability of emulators requires technical expertise which lessens adoption of emulators considerably.

In this regard, even if users are willing to bear with inconveniences of using emulators, there is still an issue of control inputs for software which is developed solely for digital mobile devices not being readily adaptable for personal computers. For example, there are mobile games which rely on inputs provided via a touch screen interface whereby, for example, users touch virtual scroll wheels, virtual steering wheels, virtual arrow keys, and the like in order to input commands in relation to the games.

Another reason for decreasing amount of digital content consumed on personal computers may be due to decreased digital content advertising due to the presence of anti-advertisement blockers available for personal computers. Although anti-advertisement blockers enhance security of the personal computer, they take away the freedom of some users to receive advertisements and the freedom of some advertisers to send advertisements.

Turning away from personal computers and focusing now on an issue with mobile devices, currently, mobile device software has to be developed specifically to run in different mobile operating systems (e.g. Android, iPhone® Operating System etc.). Hence, there is a problem that mobile device software made for one mobile operating system cannot be run on a mobile device that is operated by another mobile operating system.

SUMMARY

In accordance with one aspect of an example of the present disclosure, there is provided a method for running mobile device software, the method comprising: receiving, on an apparatus, a request to run mobile device software; determining whether a platform for operating the mobile device software is installed on the apparatus and whether the mobile device software is installed on the apparatus; connecting to one or more servers to download the platform from the one or more servers to the apparatus if the platform is determined to be not installed on the apparatus, and/or download the mobile device software from the one or more servers to the apparatus if the mobile device software is determined to be not installed on the apparatus; installing the platform if the platform is determined to be not installed on the apparatus; instructing the platform to install the mobile device software if the mobile device software is determined to be not installed on the apparatus; determining at the apparatus screen size and/or orientation for displaying graphical contents of the mobile device software on a display of the apparatus; running the mobile device software on the apparatus through the platform if the platform is installed and the mobile device software is installed; translating at the apparatus graphical contents generated by the mobile device software running through the platform into the graphical contents of the mobile device software that are displayable on the display of the apparatus; and converting at the apparatus user controls received at the apparatus to controls for the mobile device software based on predefined configuration data and instructing the platform to execute the controls for the mobile device software, wherein the platform is configured to operate in an existing operating system of the apparatus to run the mobile device software and the existing operating system of the apparatus is not originally configured to run the mobile device software.

In accordance with another aspect of an example of the present disclosure, there is provided an apparatus for running mobile device software, the apparatus comprises: a memory; a display; and a processor configured to execute instructions stored in the memory to operate the apparatus to receive a request to run a mobile device software; and determine whether a platform for running the mobile device software is installed on the apparatus and whether the mobile device software is installed on the apparatus; connect to one or more servers to download the platform from the server to the apparatus if the platform is determined to be not installed on the apparatus, and/or download the mobile device software from the one or more servers to the apparatus if the mobile device software is determined to be not installed on the apparatus; install the platform if the platform is determined to be not installed on the apparatus; instruct the platform to install the mobile device software if the mobile device software is determined to be not installed on the apparatus; determine at the apparatus screen size and/or orientation for displaying the graphical contents of the mobile device software on the display; run the mobile device software on the apparatus through the platform if the platform is installed and the mobile device software is installed; translating at the apparatus graphical contents generated by the mobile device software run through the platform into the graphical contents of the mobile device software that are displayable on the display; and convert at the apparatus user controls received at the apparatus to controls for the mobile device software based on configuration data and instruct the platform to execute the controls for the mobile device software, wherein the platform is configured to operate in an existing operating system of the apparatus to run the mobile device software and the existing operating system of the apparatus is not originally configured to run the mobile device software.

In accordance with yet another aspect of an example of the present disclosure, there is provided a non-transitory computer readable storage medium embodying thereon a program of computer readable instructions which, when executed by one or more processors of an apparatus, cause the apparatus to carry out a method for running mobile device software, the method comprising: receiving, on the apparatus, a request to run the mobile device software; determining whether a platform for operating the mobile device software is installed on the apparatus and whether the mobile device software is installed on the apparatus; connecting to one or more servers to download the platform from the one or more servers to the apparatus if the platform is determined to be not installed on the apparatus, and/or download the mobile device software from the one or more servers to the apparatus if the mobile device software is determined to be not installed in the apparatus; installing the platform if the platform is determined to be not installed on the apparatus; instructing the platform to install the mobile device software if the mobile device software is determined to be not installed on the apparatus; determining at the apparatus screen size and/or orientation for displaying graphical contents of the mobile device software on a display of the apparatus; running the mobile device software on the apparatus through the platform if the platform is installed and the mobile device software is installed; translating at the apparatus graphical contents generated by the mobile device software run through the platform into the graphical contents of the mobile device software that are displayable on the display of the apparatus; and converting at the apparatus user controls received at the apparatus to controls for the mobile device software based on predefined configuration data and instructing the platform to execute the controls for the mobile device software, wherein the platform is configured to operate in an existing operating system of the apparatus to run the mobile device software and the existing operating system of the apparatus is not originally configured to run the mobile device software.

BRIEF DESCRIPTION OF THE DRAWINGS

Embodiments of the invention will be better understood and readily apparent to one skilled in the art from the following written description, by way of example only and in conjunction with the drawings, in which.

DETAILED DESCRIPTION

Figure 1A:
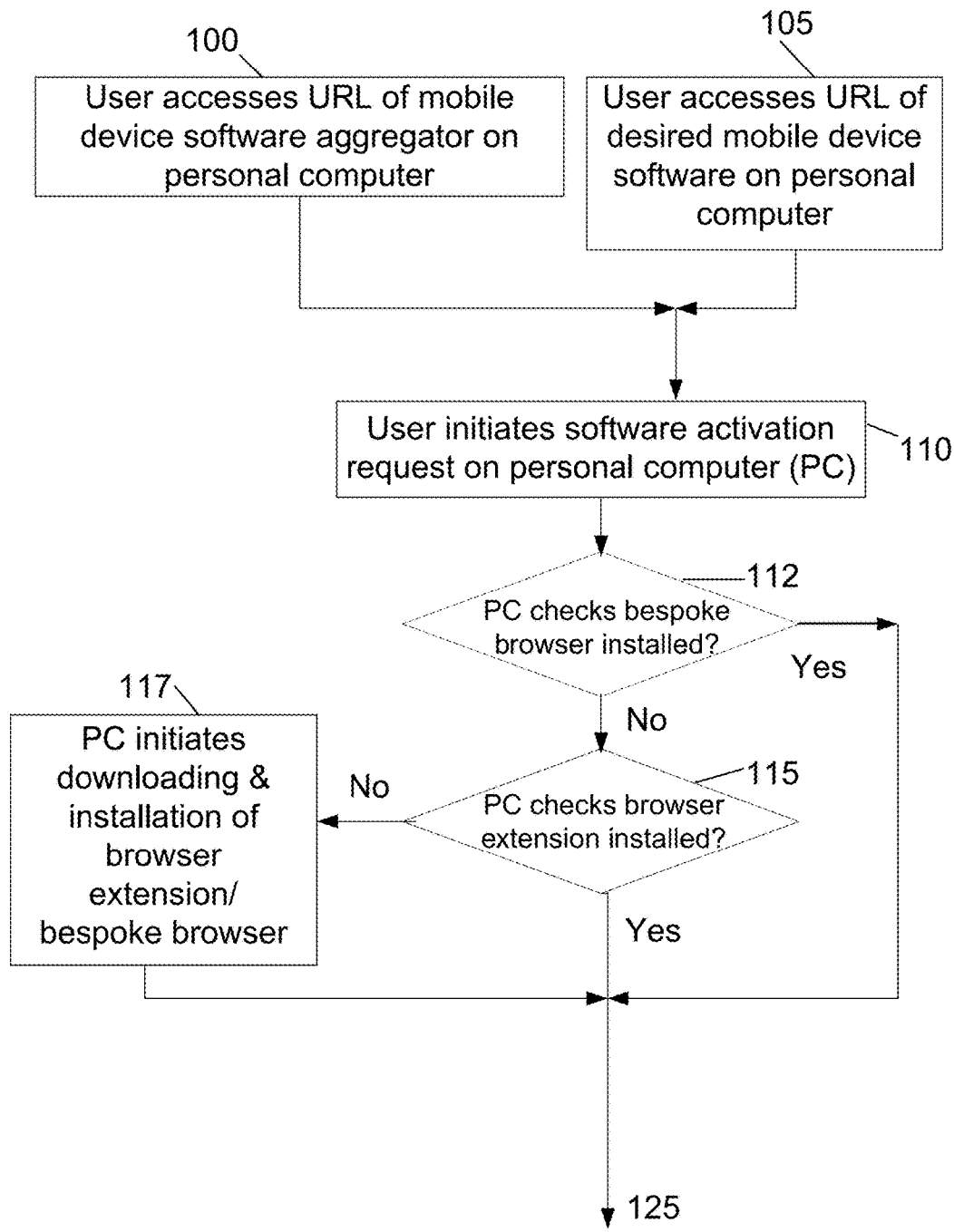
FIGS. 1A and 1B show a flow chart of an example of a method for running a mobile device software and providing user controls for the mobile device software on an apparatus.

Embodiments described in the present disclosure provide users with an application platform (or in short "platform") that allow the user to seamlessly access and use a mobile application (i.e. a mobile device software) with a click from an apparatus or from a browser accessed from an apparatus. It is understood that the mobile device software is originally run in a mobile device operating system (e.g. Android Operating System, and the like). The apparatus may be a personal computer such as a desktop computer, or a mobile device such as a smartphone, a tablet, a laptop, and the like, or a video game console or television streaming box (e.g. Android box for television). Consequently, users are able to seamlessly execute mobile applications and plug-ins on the apparatus. The platform is particularly beneficial to desktop computer users. There is provided a method that bundles all the necessary components to enable the platform to run the mobile application with pre-set control mapping, thereby allowing users to access mobile applications on the apparatus, which in the case of a desktop computer would be a desktop environment, with minimal computing technical knowledge. In addition, with the use of the platform, there is now a new avenue for mobile software owners to show mobile user-specific advertisements that would circumvent advertisement blockers. With the use of the platform, it is also possible to provide suggestions for other software based on user profiling. It should be noted that the terms "browser" and "web browser" are used interchangeably in the present disclosure.

The platform is configured to operate in an existing operating system of the apparatus to run the mobile device software. The existing operating system of the apparatus is not originally configured to run the mobile device software, or in other words, the existing operating system of the apparatus is not initially designed to run the mobile device software. The platform includes an emulator or virtualization engine to run the mobile device software. There is an existing problem in that users without relatively advanced level of technical knowledge are unable to operate such emulator or virtualization engine, or know how and what configurations need to be made to properly control and display the mobile device software in the existing operating system of the apparatus, and which components are required in order to successfully run the mobile device software on the existing operating system of an apparatus. In two examples of the present disclosure that is described with reference to FIGS. 9A, 9B and 9C and with reference to FIGS. 9A, 9D and 9C, additional software and configuration/connection data have been created to ensure, amongst other things, that 1) the necessary/updated components (e.g. including the emulator or virtualization engine) to run the mobile device software are downloaded (i.e. download facilitating), 2) the controls received at the apparatus are converted for the mobile device software (i.e. control mapping), and, additionally, 3) the mobile device software is displayed appropriately (i.e. display configuration). The combination of these features i.e. download facilitating and control mapping, and additionally, display configuration, gives rise to an overall positive synergistic effect that makes the operation of the mobile device software on the apparatus appears seamless even to a user without much technical knowledge. Such additional software and configuration/connection data that have been created and described in examples of the present disclosure are not obvious to a skilled artisan in the current field of technology as no skilled artisan has been able to come up with a solution for seamless operation despite that emulator or virtualization engine have already been around for a while. The examples of the present disclosure fulfil a long unfelt want for a seamless way to run a mobile device software in an existing operating system of the apparatus. Details of such additional software and configuration/connection data are provided later.

In the following paragraphs, basic examples of various methods of interfacing with mobile device software on an apparatus will be described with reference to respective associated figures as indicated in the following paragraphs. For illustration purposes, unless otherwise stated, the apparatus referred herein is a personal computer. It is appreciated that the apparatus can also be other devices as exemplified earlier. The basic examples enable various functionalities of the mobile device software which would otherwise not be accessible on the apparatus, as will be evident from subsequent portions of the description. For the purpose of illustration, it is assumed that the method can be performed at least in part using one or more electronic processing devices (or in short "processor" or "processors") which form part of the apparatus and/or any data processing apparatus.

Figure 1B:
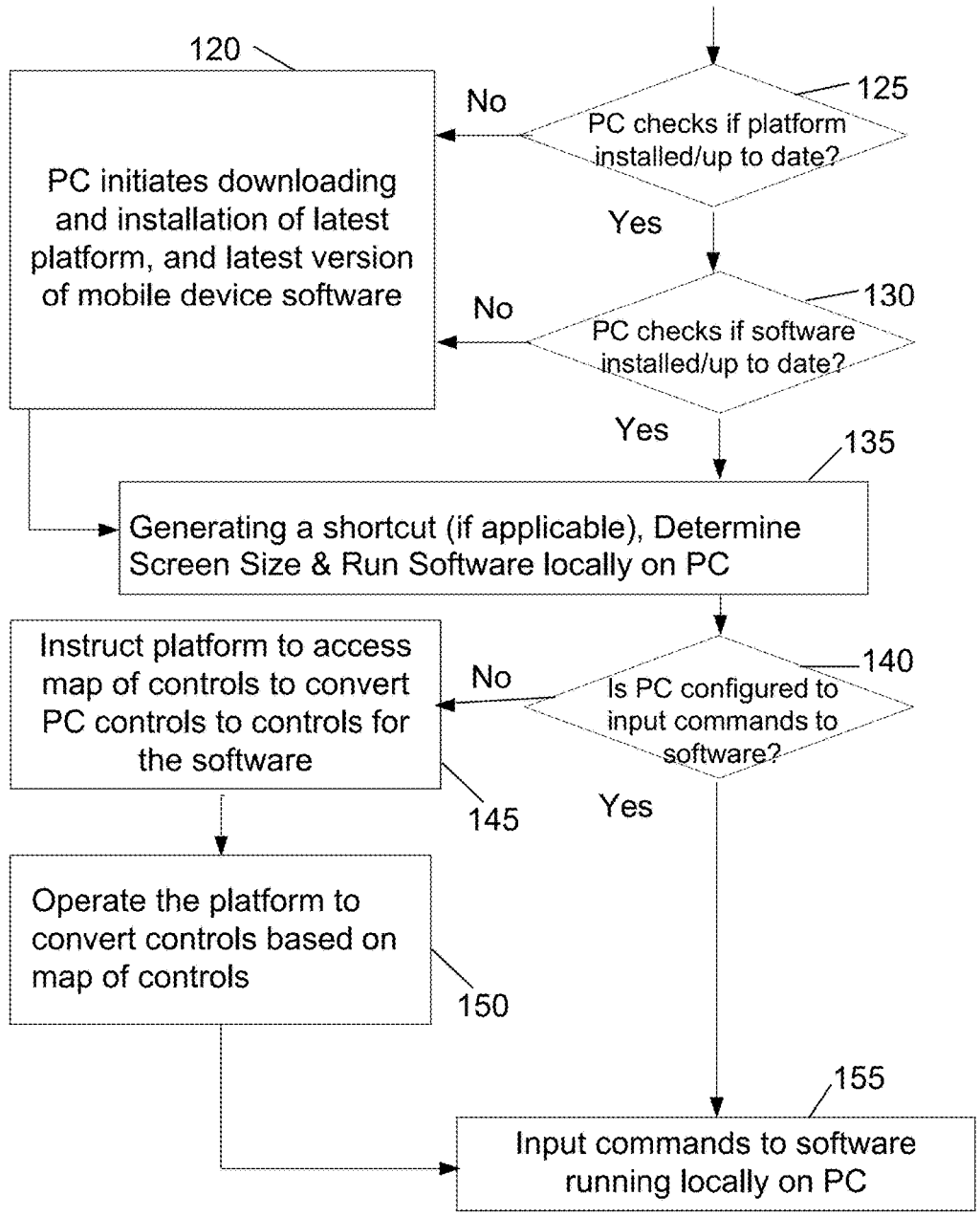

FIGS. 1A and 1B illustrates a method for running mobile device software on an apparatus, which is a personal computer in the present example. The method allows a user to control the mobile device software (i.e. a mobile application of the type downloadable from a mobile app store) from the personal computer. An advantage provided by the method is that the method enables users to operate the mobile device software on the personal computer in an appropriate manner, even if the personal computer does not include identical input devices like, for example, touch screens, accelerometers, and the like which are typically found on mobile smartphones, a tablet computers, and so forth.

In this example, at step 100, from the personal computer, a user accesses a webpage (in other words, a URL) on a web browser and initiates a request to run mobile device software (i.e. a specific mobile application). Such initiation can be accomplished by clicking a link on the webpage. The link may be a hyperlink in a form of an image and/or text and is basically a trigger to start a process to run the mobile device software and ultimately display graphical contents of the mobile device software on the browser. The link is just an example of the trigger and other suitable triggers may also be used. In the present example pertaining to step 100, the webpage contains hyperlinks to each piece of mobile device software of an aggregation of mobile device software. The mobile device software shown on the webpage can include, for example, game software, office-task software, media management software, and so forth. In the present example, the webpage is a landing page for a user to view an availability of a plurality of mobile device software, which is usable on the personal computer, and previews/reviews of the mobile device software can also be accessible at the landing page. The selection of one of the plurality of mobile device software shown on the webpage can lead to initiation of a request to run the selected mobile device software on the personal computer at step 110.

Alternatively, at step 105, from the personal computer, the user accesses a webpage (in other words, a URL) on a web browser and initiates a request to run mobile device software (i.e. a specific mobile application). Such initiation can be accomplished by clicking a link on the webpage. The link may be a hyperlink in a form of an image and/or text and is basically a trigger to start a process to run the mobile device software and ultimately display graphical contents of the mobile device software on the browser. The link is just an example of the trigger and other suitable triggers may also be used. In the present example pertaining to step 105, the webpage contains just one hyperlink to a specific mobile device software instead of an aggregation of mobile device software. The specific mobile device software can be, for example, game software, office-task software, media management software, and so forth. In the present example, the webpage can be an introduction page for a user to understand the specific mobile device software and how the specific mobile device software can be usable on the personal computer through the method that is now described in the present disclosure. The triggering of a "play" or "run" control on the webpage leads to initiation of a request to run the specific mobile device software on the personal computer at step 110.

Consequently, at step 112, the one or more electronic processing devices (i.e. processor or processors) of the personal computer determine if a bespoke (in other words, customised) browser is installed on the personal computer. The bespoke browser is one that is configured to enable a webpage to determine whether the necessary software has been downloaded to the personal computer to enable the mobile device software to run, and to enable the webpage to launch or run the mobile device software upon user input. Typically, the bespoke browser is incorporated with a pre-defined extension or a set of instructions which can be used to identify the personal computer to one or more servers (or computing devices). Identifying the personal computer to the one or more servers facilitates connecting to the one or more servers to download/upload software from the one or more servers, interact with the one or more servers to carry out functions, or to receive data, images, streaming content, information etc. that may be in the form of advertisements, announcements, links (e.g. hyperlinks), video/audio content, and the like. If the bespoke browser is installed, the method proceeds to step 125.

If the bespoke browser is not installed, at step 115, the one or more electronic processing devices determine if a pre-defined browser extension is installed on an existing web browser of the personal computer. The pre-defined browser extension is a browser extension to work with an existing browser of the personal computer to enable a webpage to determine whether the necessary software has been downloaded to the personal computer to enable the mobile device software to run, and to enable the webpage to launch or run the mobile device software upon user input. In some embodiments, the pre-defined browser extension can be used to identify the personal computer to one or more servers or other computing devices. Identifying the personal computer to the one or more servers facilitates connecting to the one or more servers to download/upload software from the one or more servers, interact with the one or more servers or computing devices to carry out functions, or to receive data, images, streaming content, information etc. that may be in the form of advertisements, announcements, links (e.g. hyperlinks), video/audio content, and the like.

If the pre-defined browser extension and/or the bespoke browser is not installed on the personal computer, the method proceeds to step 117 which includes one or more electronic processing devices initiating downloading and subsequent installation of the pre-defined browser extension and/or the bespoke browser.

Subsequently, if the pre-defined browser extension is installed on the personal computer, at step 125, the one or more electronic processing devices determine if a platform for installation of the mobile software is installed or up-to-date on the personal computer. If the platform is not installed or up-to-date on the personal computer, the method proceeds to step 120 as described below.

In the present example, the platform includes a secondary operating system which provides user conveniences such as, for example, automatic starting, installation and running of the mobile software without user intervention or knowledge of the secondary operating system such that the process is seamless and convenient for the user. The secondary operating system is a mobile operating system that is compatible and supports the running of the mobile device software. The bespoke browser and the pre-defined browser extension enable checking of whether the required software to run the mobile device software is installed, launching of the mobile device software (i.e. trigger request to launch the mobile device software) and ultimately displaying of the graphical contents of the mobile device software on the bespoke browser and the browser having the pre-defined browser extension respectively. The platform is configured to run in the background to facilitate the running of the mobile device software.

The browser is a convenient tool to link to the platform to trigger running of the mobile device software and to display graphical contents of the mobile device software as most users are familiar with the operation of the browser and the browser is an essential tool for accessing a data network (Internet, Intranet etc.), which is necessary to enable the downloading of the platform, the mobile device software, the browser extension, and/or the bespoke browser. Using the browser will enhance seamless mobile device software operation experience on the personal computer.

In addition, if the platform is installed or up-to-date on the personal computer, at step 130, the one or more electronic processing devices determine if the mobile device software is installed or up-to-date on the personal computer. If the mobile device software is not installed or up-to-date on the personal computer, the method proceeds to step 120 as described below.

At step 120, the one or more electronic processing devices initiate downloading a primary executable file (PEF) from the one or more servers and, if necessary, initiate subsequent installation of at least one of the following:
  a. a latest version of the platform; and
  b. a latest version of the mobile device software.

The PEF is basically an executable application to be downloaded to the apparatus, which in this example is a personal computer. After the PEF is downloaded, it becomes an application of the personal computer. The PEF can function like an installer program to facilitate or trigger the downloading of the latest version of the platform and the latest version of the mobile software from the one or more servers. Hence, upon receiving the request to run the mobile device software at step 100 or 105 and before the PEF can be activated, the PEF has to be downloaded from the one or more servers to the apparatus if the PEF is not installed in the personal computer. Furthermore, the PEF may provide a downloader module to perform the downloading of the platform and/or the mobile device software or their respective latest versions from the one or more servers. The PEF may also provide connection data (or server address) to connect to the one or more servers to enable the downloader module to perform the downloading of the platform and/or the mobile device software or their respective latest versions from the one or more servers. If nothing needs to be downloaded, triggering or activating the PEF would result in running of the mobile device software through the platform.

Upon installation of the mobile device software on the personal computer, at step 135, a shortcut that can be triggered to execute/run the mobile device software through the platform can be generated for displaying on a display interface shown on a display of the personal computer if such shortcut is not already generated. The display of the personal computer can be a Liquid Crystal Display Monitor, Light Emitting Diode Monitor, and a touch enabled screen monitor, the like. More details of the display will be provided in the description of FIG. 6. The desired interface can be, for example, a home screen of the operating system of the personal computer, a folder view of the operating system of the personal computer, and so forth. In subsequent instances, the mobile device software can be activated by triggering the shortcut at the desired interface. The shortcut provides user convenience to run the mobile device software.

Subsequently, also at step 135, a downloaded local copy of the mobile device software is run through (or on) the platform. The platform is configured to run in a manner similar to a second operating system in addition to an existing operating system on the personal computer. An advantage of downloading the mobile device software and running the local copy of the mobile device software is that there is reduction of lag in the running of the mobile device software compared to running the mobile device software remotely and relying more on the data network (i.e. Internet, Intranet, etc.) connectivity of the personal computer. In the present example, the platform is proprietary, and appropriate versions are able to run on various operating systems of personal computers, in a uniform manner which does not require much user configuration in order to enable the execution of the mobile device software through the platform.

Moreover, the platform may be configured to determine screen size and/or orientation (portrait, landscape) for displaying graphical information or contents of the mobile device software on the display of the personal computer. The determination of screen size and/or orientation can be done automatically without requiring user input on the preferred size and accomplished by referring to predefined data that contains optimised screen size information for displays having different resolution and/or sizes. Such predefined data can be provided by the PEF and/or the platform and/or the one or more servers. For instance, in the present example, before the mobile device software is run, a check is conducted at step 135 to identify the resolution and/or size of the display of the personal computer. After the resolution and/or size are identified, the predefined data containing the optimised screen size information for displays having different resolution and size is accessed or referred. Thereafter, the optimised screen size and/or orientation for displaying graphical contents of the mobile device software on the display of the personal computer indicated in the predefined data is determined as the screen size and/or orientation for displaying graphical contents of the mobile device software on the display of the personal computer. The mobile device software would then be run in the optimised screen size and/or orientation. In other examples, the platform may be configured to enable a user to change the screen size and/or orientation settings in the predefined data.

The predefined data may indicate that for certain mobile device software the optimised screen size is a full screen display of the graphical contents of the mobile device software that fills up fully the display space of the display of the personal computer. For some other mobile device software, if more appropriate, the optimised screen size may only fill up partially the display space of the display of the personal computer due to the preferred orientation of the mobile device software. For instance, some mobile device software prefers to have its graphical contents viewed in portrait orientation rather than in landscape orientation. As some displays for personal computers are typical elongate (e.g. aspect ratio 16:9) as opposed to squarish (e.g. aspect ratio 4:3), the optimised screen orientation would be a portrait view of the graphical contents of the mobile device software on such elongate displays with unfilled display spaces on the sides and/or the top and bottom of the displayed graphical contents of the mobile device software.

At step 140, the one or more electronic processing devices determine if the personal computer is configured to input commands to the mobile device software in an originally intended form. For example, it is less likely that the personal computer is configured to be able to input commands in an identical manner as a mobile device that can fully control the mobile device software if the mobile device software originally relies on either movement of the mobile device involving, for instance, use of an accelerometer, a gyrometer, Global Positioning System (GPS) and the like, video/image input via a camera, audio input via a microphone input, other inputs via scanners such as iris scanner, fingerprint scanner, etc., or detection of touchscreen gestures to input commands. In such a situation, the method proceeds to step 145, whereby the electronic processing devices initiate instructions to the platform to access a map of controls (or configuration data) for converting user controls received at the personal computer to controls for the mobile software. The map of controls is essentially configuration data that can be part of the PEF, and is associated with the specific mobile device software. The platform is configured to convert user controls received at the personal computer to controls for the mobile software by referring to the map of controls. The map of controls functions as a conversion interface for controls to the mobile device software that cannot be input in an identical manner as a mobile device that can fully control the mobile device software when using the personal computer or any other apparatus that cannot be input in the identical manner. To further expand on the earlier illustration, the map can include actions like, for example:

tilting of the mobile device to the left being associated with pressing a left arrow key of a keyboard of the personal computer;

shaking of the mobile device (like a cocktail mixer) being associated with continuous pressing of an up arrow key and a down arrow key of a keyboard of the personal computer;

a sweeping finger movement across a touchscreen of the mobile device being associated with tandem pressing of a "Ctrl" key and corresponding directional arrow keys of a keyboard of the personal computer; and so forth.

Typically, other input/peripheral devices such as, for example, mouse, touchpad, number pad, web camera, microphone, and the like of the personal computer can also be utilised in the map of controls to convert to corresponding controls for the mobile device software. Alternatively, instead of providing the map of controls via the PEF, the map of controls can be also be provided as part of the platform or the latest version of the platform that is downloaded, or can be stored at a central server connectable to the personal computer for the platform to access as and when required via the data network (i.e. internet, intranet, etc.). It is also possible that the map of controls is not provided from one source but is provided by the sources: the PEF and/or the platform and/or the one or more servers. To prevent copying of the map of controls, which is proprietary and optimised for each of the mobile device software, the map of controls may be split up and each part is provided by different one of these sources.

At step 150, the platform is operated to convert user controls based on the accessed map of controls so that, at step 155, appropriate commands (or user input) received at the personal computer can be input to the mobile device software running on the platform at the personal computer. In this manner, the mobile device software is able to operate in a substantially similar manner as per a typical running of the mobile device software on a mobile device. The map of controls can be pre-defined at an earlier juncture, for instance, at a time before the PEF for a particular mobile device software is made available to users. The map of controls can also be referred to by a user at any time to confirm the associated controls of the mobile device software when running on the platform on the personal computer. That is, information from the map of controls can be displayed on a display of the personal computer for informing the user which user control at the personal computer converts to which control for the mobile device software. It can also be configured such that user input can be received at the personal computer to edit the map of controls to set how user control at the apparatus converts to control for the mobile device software.

Although in the present example, the request to run the mobile device software on the personal computer through the platform is initiated through a browser, it is appreciated that in other examples, the mobile device software need not be initiated through the browser. For instance, it could be that the PEF is made available in a memory device or computer readable medium (can be non-transitory) such as flash memory card or drive, solid state drive, CD-ROM, DVD-ROM, Blu-ray Disc, and the like. In this case, the request or trigger to run the mobile device software can be made by accessing or activating the PEF in the memory device or computer readable medium from the personal computer. Another way to access the PEF could be through other software applications running on the personal computer or through a link, announcement, or advertisement provided by the platform. If the apparatus is not a personal computer but a video game device (or console), a television streaming box, or a virtual reality (VR) software operating device (e.g. VR goggles), the PEF can be accessed through, for instance, slotting in a memory card to the device or can be provided with the operating system of the apparatus.

As the platform operates as or operates like a secondary operating system, some applications operating in an existing operating system of the personal computer would not interfere with the operations of the platform. If there would be interference, the platform can be updated or configured to get around the interference. For instance, if a link (e.g. hyperlink), announcement and/or advertisement is transmitted to the personal computer via the platform and displayed with or over the graphical contents of the mobile device software or displayed on a browser (in the case that the mobile device software is to be displayed on the browser), the platform can be configured such that applications operating in the existing operating system of the personal computer such as anti-advertisement blockers would not block the link, announcement and/or advertisement transmitted via the platform to the personal computer. Although anti-advertisement blockers enhance security of the personal computer, they take away the freedom of some users to receive advertisements and the freedom of some advertisers to send advertisements. This feature is beneficial to users that do not mind or have consented to receiving links, announcement and/or advertisement via the platform and parties like advertisers who want to reach out to those users. It is appreciated that security to the personal computer is still maintained because a proprietor controlling the platform can set controls to prevent links, announcements, and/or advertisements directed to unsecured/malicious content from be transmitted. Hence, users willing or consenting to use the platform can be assured of the security of the personal computer.

Furthermore, user input directed to the one or more links, announcements and/or advertisements may be received at the personal computer and the following steps may be performed. That is, downloading to the apparatus software associated with the one or more links, announcements and/or advertisements, or activating software associated with the one or more links, announcements and/or advertisements. A shortcut associated with the one or more links, announcements and/or advertisements may be created. The shortcut would be displayable on the display of the personal computer to enable a user to make a request to run the software associated with the one or more links, announcements and/or advertisements by selecting the shortcut.

Specifically, the shortcut may be displayed on a display interface shown on the display of the personal computer. The desired interface can be, for example, a home screen of the operating system of the personal computer, a folder view of the operating system of the personal computer, and so forth. In subsequent instances, the software associated with the one or more links, announcements and/or advertisements can be activated by triggering the shortcut at the desired interface. The shortcut provides user convenience to run the software associated with the one or more links, announcements and/or advertisements. More information on the receipt of the one or more links, announcements and/or advertisements via the platform would be provided in the description of FIG. 2.

The platform can be configured to facilitate operating an instant messaging platform or social networking platform together with the mobile device software running on the personal computer. This feature makes it possible for users to communicate via the instant messaging platform or interact with other users on their social networking platform when the mobile device software is running. Conventionally, such communication with the instant messaging platform and interaction on the social networking platform while the mobile device software is running can only be done if the mobile device software provides such features. However, with the use of the platform, any mobile device software can be run along with the instant messaging platform and the social networking platform. As an example, such integration with the instant messaging platform or social networking platform may be provided the bespoke browser and/or the browser extension discussed earlier.

Furthermore, the platform may be configured to maintain a record collating a plurality of mobile device software downloaded to the personal computer or operated through the platform. The platform may be configured to receive from the one or more servers at least one suggestion for a mobile device software for consumption by a user for displaying on the display of the personal computer. The record contributes to derivation of the at least one suggestion. For example, if the record shows that the user downloads many mobile device software of a specific genre, the at least one suggestion would suggest one or more mobile device software of the same genre to the user via an announcement pushed to the platform operating at the personal computer from the one or more servers. Another example is that if numerous records maintained for different personal computers show that there is high usage (operation) for a specific mobile device software, the at least one suggestion would suggest the specific mobile device software to the user via an announcement pushed to the platform operating at the personal computer from the one or more servers. More information on the suggestions would be provided in the description of FIG. 3.

In the case that the displayed graphical contents of the mobile device software do not fill up all the display space of the display of the personal computer, the platform may be configured to display in the available display space the aforementioned one or more links, announcements, and/or advertisements, the aforementioned at least one suggestions, the instant messaging platform and/or the social networking platform.

The platform may be activated or controlled by the one or more electronic processing devices of the personal computer to run in the background of the personal computer and act as a proxy for streaming to the display of the personal computer content (including text, graphical (images, video etc.) and audio content) processed at the platform or received by the platform from the one or more servers. If the content is from the one or more servers, the streaming will be done through the data network (i.e. Internet, Intranet, etc.). The content (including text, graphical (images, video, etc.) and audio content) processed at the platform or received by the platform from the one or more servers may be streamed to a bespoke browser enabled to work with the platform to run mobile device software or a browser with a browser extension enabled to work with the platform to display the graphical contents of the mobile device software. In the case that a browser is not used, the content (including graphical (images, video, etc.) and audio content) processed at the platform or received by the platform from the one or more servers may be streamed directly for displaying on the display of the personal computer by the platform. For instance, a window may be used to present the streaming content. The content (including graphical and audio content) being streamed can be the contents of the mobile device software that is run, the content (including text, graphical (images, video, etc.) and audio content) of the aforementioned one or more links, announcements, and/or advertisements, the aforementioned at least one suggestions, the instant messaging platform and/or the social networking platform.

Accordingly, the above described method provides a number of advantages. The abovementioned example provides users with a convenient way to interface with the mobile device software through an apparatus that is not configured to work with the mobile device software. The mobile device is advantageously made accessible to the apparatus using the platform. Furthermore, the user need not have a high level of technical expertise (for example, installation and separate execution/configuration of an emulator and control mapping is not required), and the user is able to interface with the mobile device software when running it on the platform on the apparatus in a manner which is familiar and/or intuitive to the user.

The above described method is particularly beneficial to personal computer users. Given that a substantial number of personal computers do not have touch screens or controls specific to mobile devices such as movement controls via accelerometer, gyrometer, etc., and that the existing emulators do not cater for porting of control inputs of a personal computer to a mobile device software, it is evident that some mobile device software is unable to be consumed on a personal computer via the use of existing emulators. Other limitations also arise when existing emulators are used, for example, an inability of the mobile device software to determine a location of the device running the emulator, an inability of mobile device advertisements to be reproduced in the existing emulator, and so forth. Furthermore, existing emulators provide an undesirable interface for a substantial number of mobile device software that are playable on personal computers via the existing emulators. The above described method aims to solve one or more of such problems with existing emulators.

Referring to FIGS. 8A, 8B, 8C, 8D and 8E, there are shown a series of screen shots for setting up the map of controls in a mobile game software (Game A) provided for illustrative purposes. The mobile game software is one type of the mobile device software described with reference to the above paragraphs. The setting up of the map of controls is done on a personal computer with a mouse for receiving user input. An application for setting up the map of controls is run on the personal computer to enable the map of controls to be edited. The setting up of the map of controls can be done by a user. The setting up of the map of controls can also be done by a developer to enable the personal computer to control the mobile game software that is run through the platform as described in the above paragraphs.

Figure 8A:
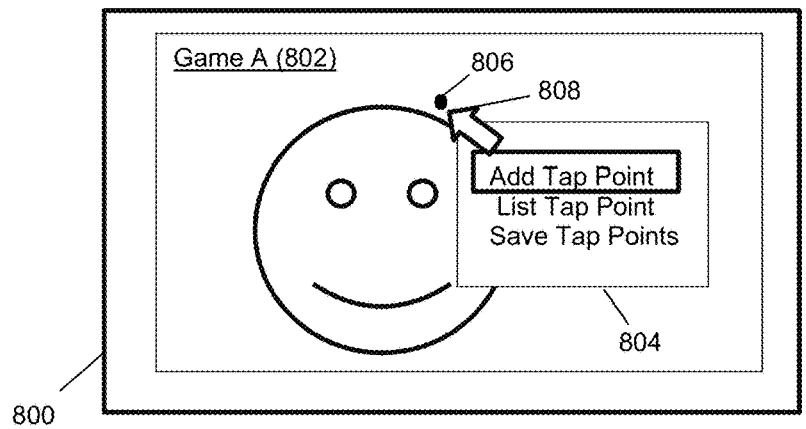
FIGS. 8A, 8B, 8C, 8D and 8E show screen shots of a process of defining a map of controls.
Figure 8B:
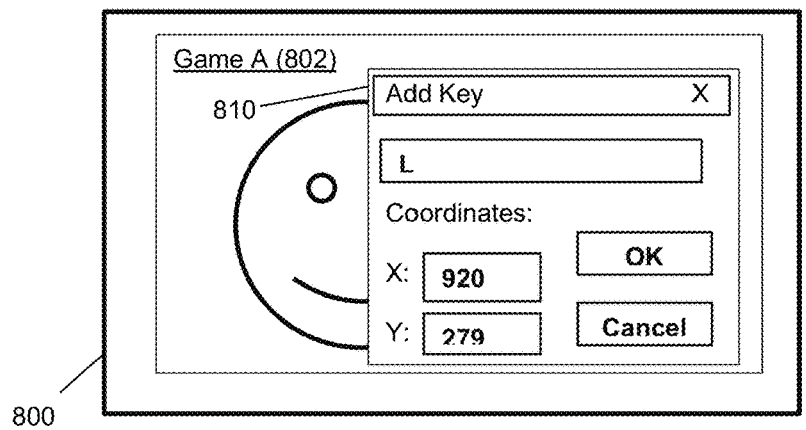
Figure 8C:
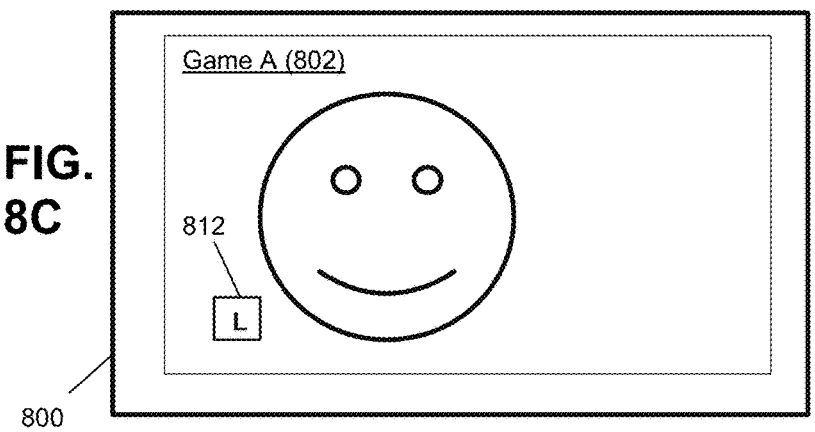
Figure 8D:
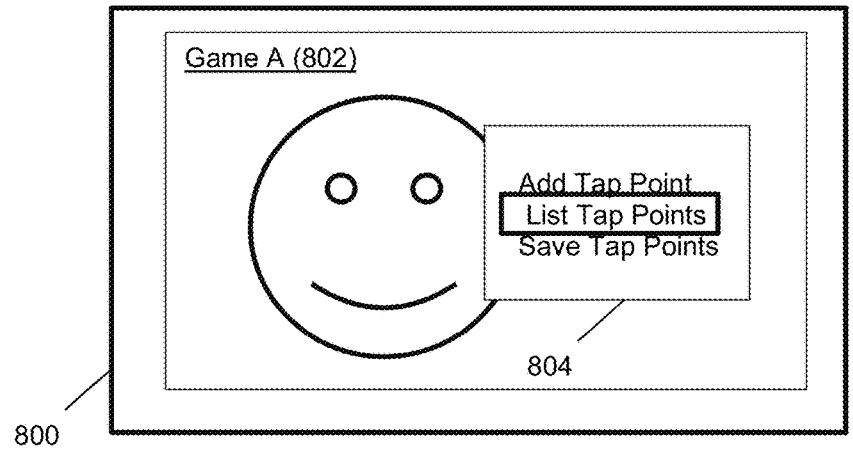
Figure 8E:
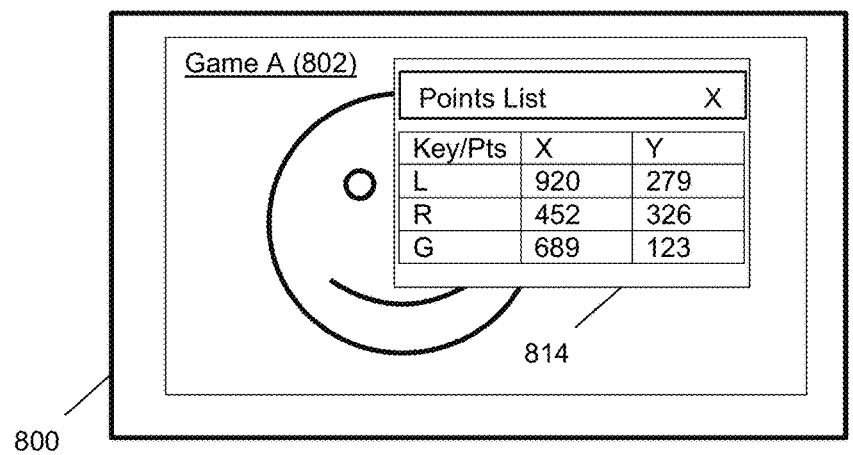

In FIG. 8A, after the application for setting up the map of controls is run on the personal computer to enable the map of controls to be edited, the game software is launched or run through the platform. At a landing page 802 of the game displayed on a display 800 of the personal computer, using a mouse cursor 808, a right click of the mouse is carried out by a user or developer to select a point 806 (i.e. a pixel point or a plurality of pixel points) in the landing page 802 of the game and "Add Tap Point" is selected from a triggered menu 804 to configure the selected point 806 as a tap point for the game. In FIG. 8B, a window 810 indicates a key on a keyboard ("L" in this example) of the personal computer is selected to be associated with the selected tap point 806 of the game. X and Y coordinate values (i.e. X: 920 and Y: 279) of the selected tap point 806 in the landing page of the game will be associated with the "L" key so that whenever the key "L" is pressed, a tap at the X and Y coordinate values will be input to the mobile device software. The X and Y coordinate values of the selected tap point is shown in FIG. 8B. Triggering "OK" displayed in the window 810 using the mouse saves the association made between the "L" key and the selected tap point at the saved X and Y coordinate values. FIG. 8C shows another way to associate a tap point in the game with a key of the keyboard. A "L" key mini box 812 associated with the keyboard "L" key may be called out to be displayed on the display 800 of the personal computer. It is possible to drag and drop the "L" mini box 812 to a desired location on the landing page 802 of the game to select the X and Y coordinates of the desired location to be associated with the "L" key. FIG. 8E shows a table 814 containing information of associated keys of the keyboard assigned for the game. With reference to FIG. 8D, the table 814 can be called out via a right click of the mouse, followed by selecting "List Tap Points" from the triggered menu 804 appearing after the right click. Turning back to FIG. 8E, the table 814 provides information of the map of controls to the user or developer. Once the keys of the keyboard have been assigned to the controls of the game, configuration data that may be in the form of a configuration file is updated or created if the keys are assigned to the controls of the game for the first time. If the keys are assigned to the controls of the game by a developer, the configuration file may be made available, for instance, through the PEF, and/or the platform and/or uploaded to the one or more servers as described in the present disclosure prior to the description of FIGS. 8A to 8E. Once the configuration file of the map of controls is provided through the PEF, and/or the platform, and or the one or more servers, the map of controls would be accessible to all users that download the game through the PEF and run the game using the platform.

Figure 8F:
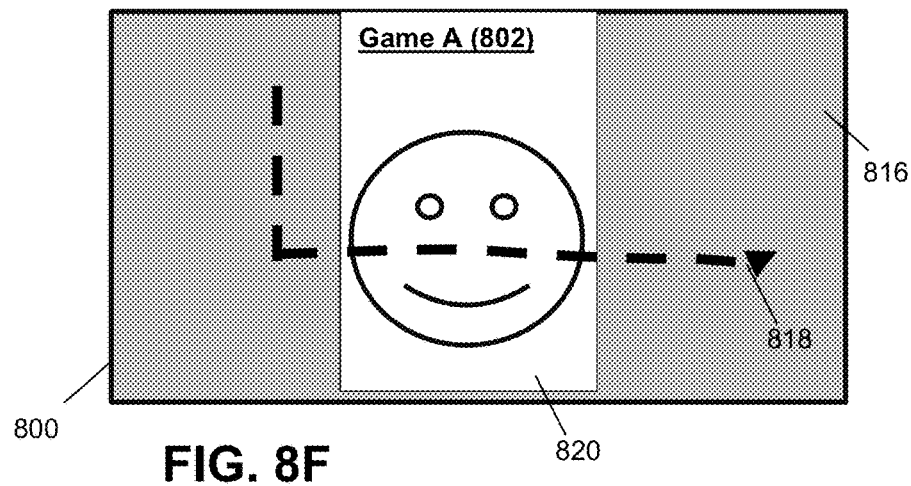
FIG. 8F shows extending of user input area for mobile software controls beyond a display area of the mobile device software displayed on a display of an apparatus.

FIG. 8F illustrates extension of user input area for mobile software controls beyond a display area 820 of mobile device software on a wide screen display 800 of an apparatus. In this case, the mobile device software is Game A 802 and the apparatus is a personal computer. Specifically, graphical contents of Game A 802 are displayed in portrait manner on the wide screen display 800. In this case, the graphical contents of Game A 802 are confined to a game display area 820 (i.e. game boundaries). There is empty space 816 outside the game display area 820 filling up the rest of the wide screen display 800. Such empty space 816 does not display graphical contents of Game A 802. In the present example, user input area for controls for the mobile device software are configured such that user controls are also detectable or considered outside the game display area 820. For instance, a dashed arrow 818 in FIG. 8F represents an "L" shaped mouse cursor swipe from top to bottom and then from left to right of the display. The dashed arrow 818 moves across the display area 820 and the empty space 816. Such "L" shaped mouse cursor swipe may be a specific control for a particular action in the Game A 802. If user control detection is confined to just the game display area 820, the action that is detected would be just a left to right swipe. However, if the user control detection is the entire display space or area of the wide screen display 800, the action that is detected is the "L" shape swipe. It is an advantage to extend the control beyond the game boundaries so that the game is not interrupted when, for instance, the mouse cursor is accidentally out of the display area 820 while the game is being played. A larger space for user input also makes user control easier for the user. The application for setting up the map of controls as described earlier may allow a user to indicate the breath or limits of the game boundaries that the user would be able to control the mobile device software. For example, it may be configured such that the control boundaries are confined within the space of the display 800, within the space of the game display area 820 or a user-specified space. Such feature to extend mobile software control beyond a display area for displaying graphical contents of the mobile device software is very beneficial especially for mobile device software displayed in portrait. In the case that the game is displayed through the platform on a browser and full screen display of the browser is activated (e.g. "F11" keyboard key), the same extension of user input area as described above is applicable for games displayed in portrait manner.

Figure 2:
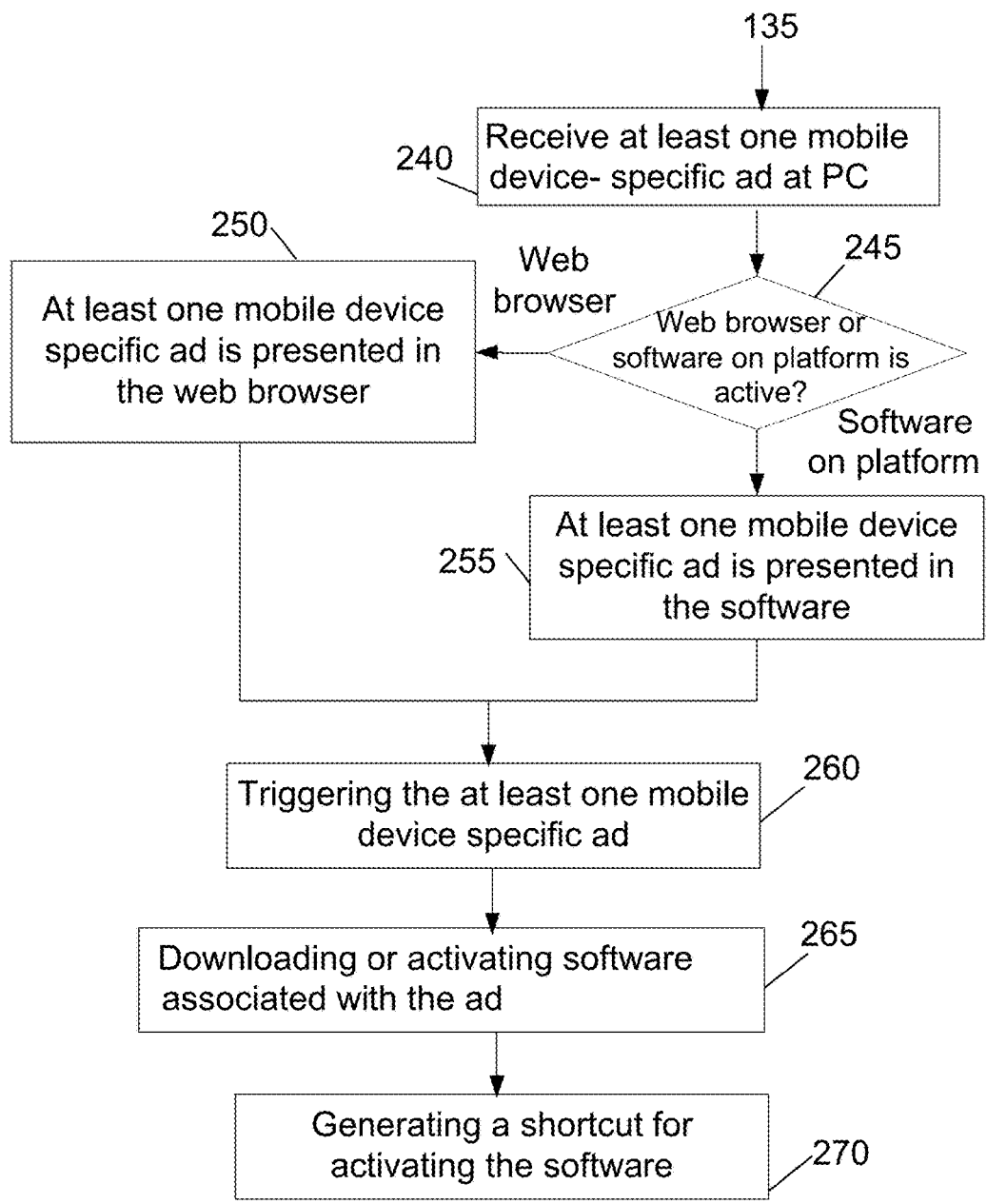
FIG. 2 shows a flow chart of steps for providing at least one advertisement.

FIG. 2 illustrates method steps continuing from step 135 in FIG. 1B. The steps 240 to 270 of FIG. 2 relate to providing at least one link, announcement or advertisement to the apparatus, which in the present example is a personal computer. In other examples, the apparatus may be a device other than a personal computer. In the present example, for illustration purposes, the method allows users to consume at least one mobile device-specific advertisement on the personal computer. In other examples, instead of at least one advertisement, it may be at least one link or at least one announcement and the same steps of steps 240 to 270 are applicable. The announcement may be in the form of a message. In other examples, the advertisement to be consumed need not be an advertisement that is mobile device-specific like the present example. For instance, the advertisement may be one that is configured for displaying on a web browser of a personal computer and not one that is configured for displaying on a mobile device.

The steps 240 to 270 of FIG. 2 carry on from step 135 of FIG. 1B. Step 135 indicates that the mobile device software is already running on the personal computer through the platform. Specifically, steps 140 to 155 in FIG. 1B are steps relating to accessing of the map of controls to enable a user to control the mobile device software on the personal computer. Each of the set of steps 140 to 155 after step 135 of FIG. 1B and the set of steps 240 to 270 of FIG. 2 is carried out separately from each other or concurrently.

At step 240, the one or more electronic processing devices of the personal computer operates the platform to connect to the one or more servers to receive at least one mobile device-specific advertisement for displaying on the display of the personal computer. The platform running in the background of the personal computer may be configured to periodically connect to the one or more servers to receive the at least one mobile device-specific advertisement or the one or more servers may be configured to initiate connection with the platform as and when one or more advertisement is available to be pushed to the display interface displaying the mobile device software run through the platform on the display of the personal computer. The at least one mobile device-specific advertisement can be consumed by the user either via a web browser, or via the mobile device software operating through or on the platform, whereby the advertisement will appear in an identical manner as if it were provided on a mobile device. The at least one mobile device-specific advertisement can include, for example, download links, rich media content, static banner content, embedded video content, interstitial content, full-page content and the like. It is determined at step 245, whether the web browser or the platform is the channel for presenting the advertisement. If it is the web browser, the method proceeds to step 250 where the advertisement would be presented on the web browser. If it is the platform, the method proceeds to step 255 where the advertisement would be presented in a display interface of the personal computer for displaying graphical contents of the mobile device software on the display of the personal computer through the operation of the platform.

At step 260, user input directed to the at least one mobile device-specific advertisement activates or triggers the one or more electronic processing devices to perform: downloading to the personal computer software associated with the at least one advertisement, or activating software associated with the at least one advertisement.

Subsequently, the software associated with the advertisement to which the user input is directed is downloaded or activated through the platform at step 265. The software may be activated through the browser with assistance from the platform. The software associated with the advertisement can be personal computer software or mobile device software. If the software is downloaded at step 265, the software can be installed on the personal computer in a typical manner if the software is personal computer software. If the software is mobile device software, step 265 can be the request to run the mobile device software and steps 110 to 135 of FIGS. 1A and 1B can be carried out to activate the mobile device software through the platform. It is possible that the software associated with the advertisement runs even when some mobile device software is already running as certain software is configured to interact with other software. Alternatively, if the software is mobile device software, the mobile device software can be just installed after step 265 but the mobile device software is not run on the platform until it is activated later or run after a currently run mobile device software has stopped running. In a further step 270, the one or more electronic processing devices of the personal computer generate a shortcut that can be triggered to execute the software (either independently or in conjunction with the platform) on a desired interface displayed on the display of the personal computer. The desired interface can be, for example, a home screen of the personal computer, a folder view of the personal computer, and so forth. In subsequent instances, the software can be executed or run by triggering the shortcut at the desired interface.

The method steps 240 to 270 of FIG. 2 provide a number of advantages. The abovementioned example provides users with a way to consume mobile device advertisements on their personal computer, whereby the advertisements are provided in a similar manner as though they were consumed on a mobile device. It is advantageous for owners of the mobile device advertisements as they are able to provide their advertisements on personal computers without having to expend resources to provide desktop scripts for the advertisements. Furthermore, the method is able to circumvent advertisement blockers installed on the personal computer as the blocking mechanisms are not able to operate in a desired manner when the method is carried out. This is due to the platform being operated like a secondary operating system and the applications operating in a main operating system (also known as "existing operating system") of the personal computer are unable to interfere with the operation of the platform to present the advertisements. Advertisements can also refer to public service announcements, which can be for the benefit of the user. In addition, provision of the shortcut for the installed software is advantageous in maintaining an interest of the user, as the shortcut is regularly viewed by the user, and thus, readily accessible and remembered by the user.

Figure 10:
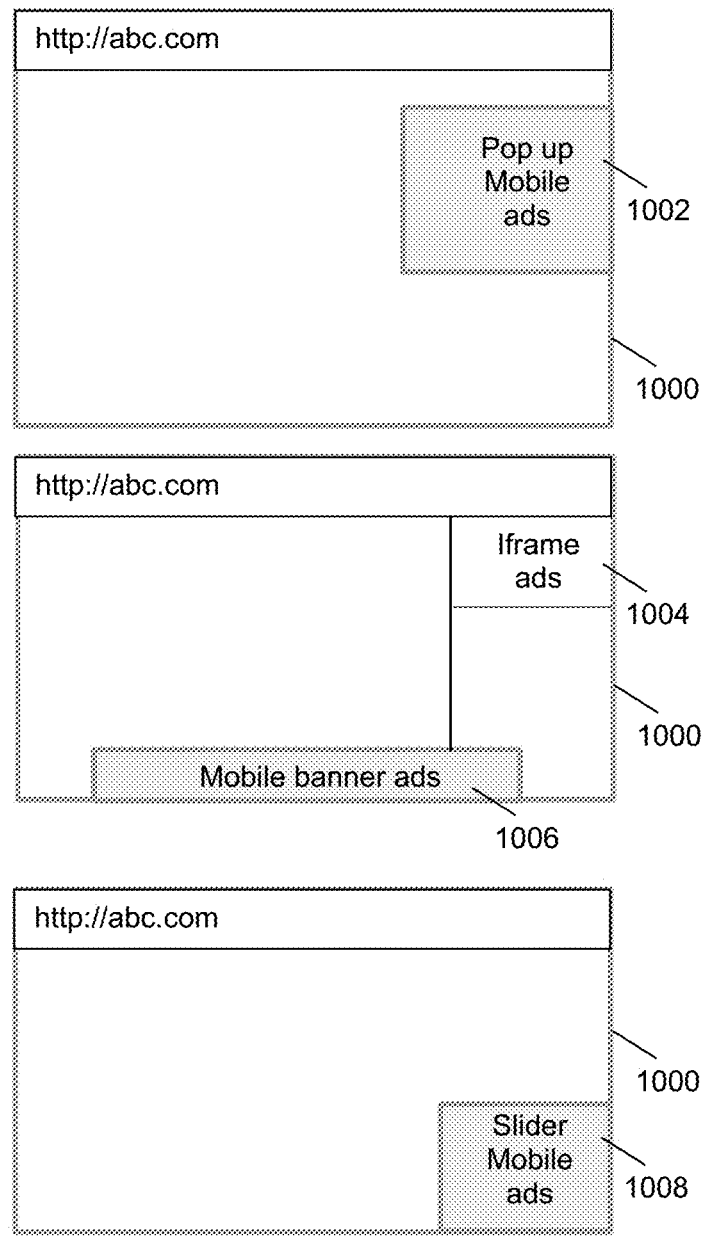
FIG. 10 shows examples of how advertisements may be presented in a browser displaying graphical contents of the mobile device software.

Examples on how the mobile device advertisements may be presented on a browser 1000 running the mobile device software through the platform are shown in FIG. 10. The mobile device advertisements may show up as pop up advertisement 1002, iframe advertisement 1004, banner advertisement 1006 or slider mobile advertisement 1008.

Figure 11:
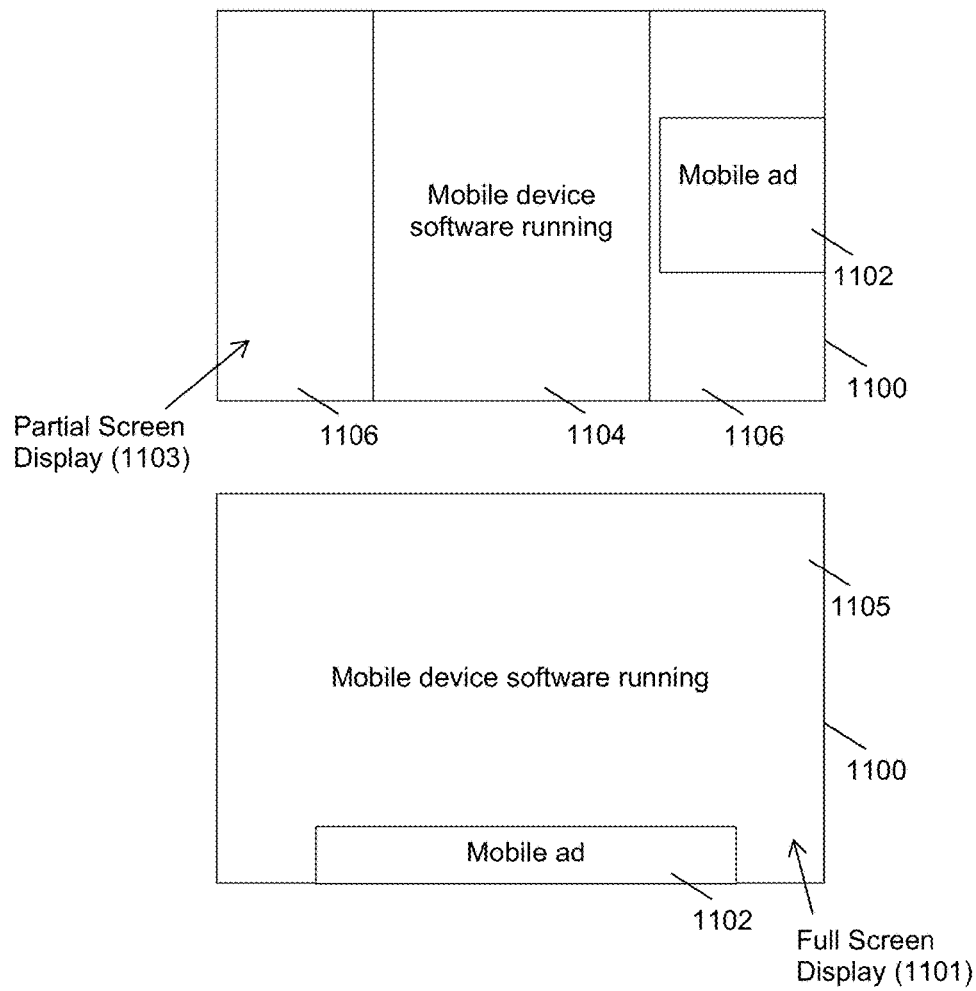
FIG. 11 shows examples of partial screen and full screen displaying graphical contents of the mobile device software.

FIG. 11 shows examples of partial screen and full screen displaying of the graphical contents of the above described mobile device software. For certain mobile device software, the optimised screen size is a full screen display 1101 of the graphical contents of the mobile device software that fills up fully the display space of a display 1100 of the above described personal computer. For some other mobile device software, the optimised screen size may be a partial screen display 1103 and only partially fills the display space of the display 1100 of the personal computer due to the preferred orientation of the mobile device software. For instance, some mobile device software prefers to have its graphical contents viewed in portrait orientation 1104 rather than in landscape orientation 1105. As some displays for personal computers are typical elongate (e.g. aspect ratio 16:9) like the display shown in FIG. 11 as opposed to squarish (e.g. aspect ratio 4:3), the optimised screen orientation would be a portrait view 1104 of the graphical contents of the mobile device software on such elongate displays with unfilled display spaces 1106 on the sides and/or the top and bottom (not illustrated in FIG. 11) of the displayed graphical contents of the mobile device software.

Figure 12:
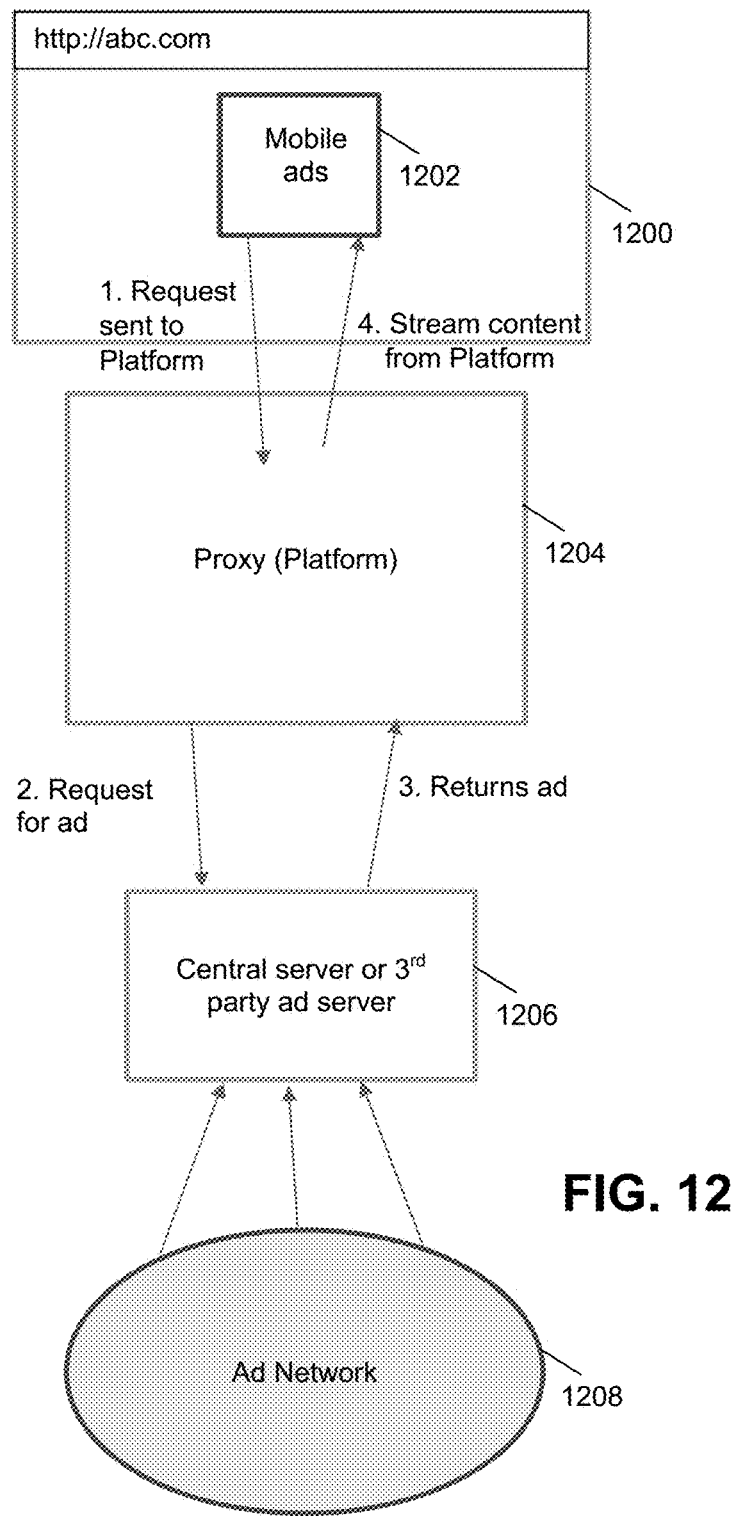
FIG. 12 shows an example of how the above described platform may serve as a proxy to push a mobile-specific advertisement to a browser.

FIG. 12 shows an example of how the above described platform 1204 may serve as a proxy 1204 to push a mobile-specific advertisement 1202 to a browser 1200 of the above described personal computer that is capable of running the above described mobile device software through the platform 1204. Note that the advertisement is not limited to mobile-specific ones, other types may be possible. However, mobile-specific advertisements can be said to be most resistant to anti-advertisement blockers because, the platform 1204 in the present example is an operating system running on the personal computer in addition to an existing operating system of the personal computer and anti-advertisement blocking operations of the existing operating system is unable to interfere with the operation of the platform 1204. The platform 1204 is activated or controlled by the one or more electronic processing devices of the personal computer to run in the background of the personal computer and act as the proxy 1204 for streaming to the browser 1200 of the personal computer advertisement content (including text, graphical (images, video etc.) and audio content) processed at the platform 1204 or received by the platform 1204 from a central server or a third party advertisement server 1206. The central server or a third party advertisement server 1206 may be supplied with advertisements from an advertisement network 1208, which may essentially be one or more servers storing and distributing advertisements. In the present example, the mobile-specific advertisement 1202 is pushed to the browser 1200 when the browser 1200 is running the mobile device software through the platform 1204. Specifically, the steps taken to present the mobile-specific advertisement 1202 on the browser 1200 are as follows:

1. When a user accesses the browser 1200 that is displaying graphical contents of mobile device software run through the platform 1204, a request is made to the platform 1204 to retrieve a mobile-specific advertisement 1202 for displaying on the browser 1200.

2. The platform 1204 then requests for contents of the mobile-specific advertisement 1202 from the central server or third party advertisement server 1206, which receives the mobile-specific advertisement 1202 from the advertisement network 1208.

3. The central server or third party advertisement server 1206 sends the contents of the requested mobile-specific advertisement 1202 to the platform 1204.

4. The platform 1204 streams the contents of the requested mobile-specific advertisement 1202 received from the central server or third party advertisement server 1206 to the browser 1200.

In the same manner, one or more links, and/or announcements and/or one or more software suggestions can be pushed via the setup described with reference to FIG. 12.

Figure 3:
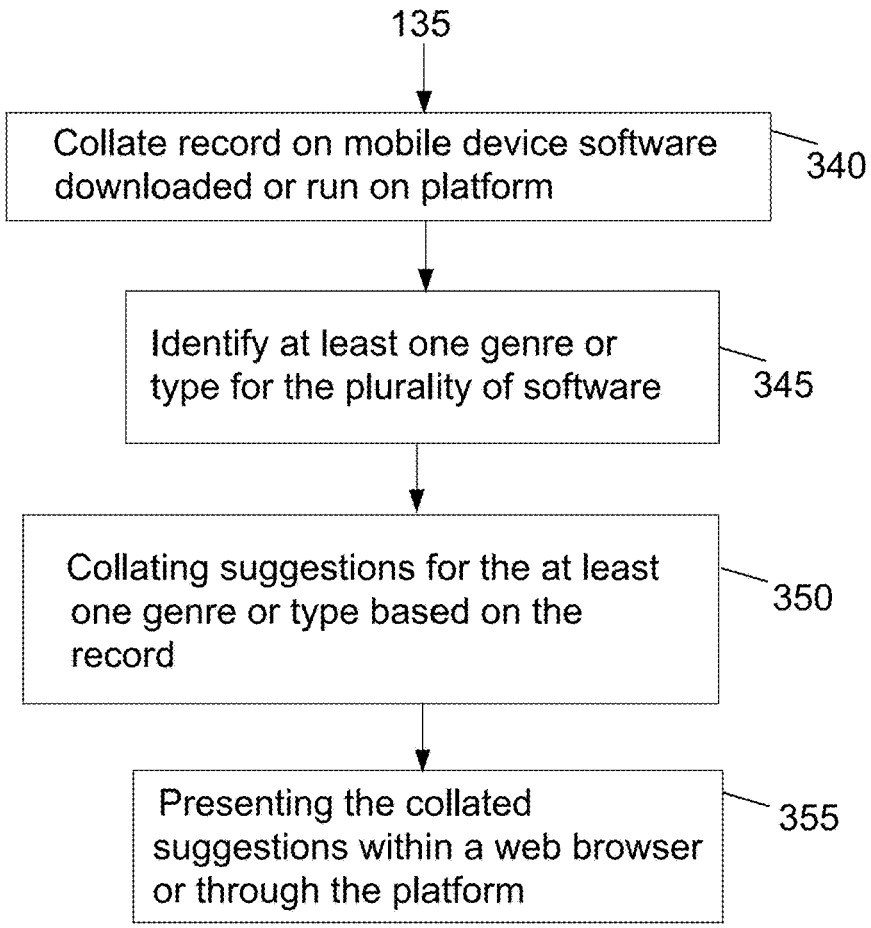
FIG. 3 shows a flow chart of steps for suggesting at least one mobile device software.

FIG. 3 also illustrates method steps continuing from step 135 in FIG. 1B. The steps 340 to 355 of FIG. 3 relate to providing at least one suggestion of specific mobile device software in relation to a particular type/genre of software that a user indicates and/or demonstrate an interest in. For illustration purposes, in regard to FIG. 3, the apparatus running the mobile device software through the aforementioned platform is a personal computer. It is appreciated that devices other than a personal computer is also possible.

The steps 340 to 355 of FIG. 3 relate to providing at least one suggestion of a mobile device software to be displayed on the display of the personal computer and they carry on from step 135 of FIG. 1B. Step 135 indicates that the mobile device software is already running on the personal computer through the platform. Specifically, steps 140 to 155 in FIG. 1B are steps relating to accessing of the map of controls to enable a user to control the mobile device software on the personal computer. Each of the set of steps 140 to 155 after step 135 of FIG. 1B, the set of steps 240 to 270 of FIG. 2, and the set of steps 340 to 355 of FIG. 3, are each carried out separately from one another or concurrently.

At step 340, the one or more electronic processing devices of the personal computer collate a record of a plurality of the mobile device software downloaded to the personal computer or had run on the platform. The fact that the mobile device software is downloaded or had run on the platform is an indication of the preference of a user for the type and genre of the mobile device software. This is because the user would download more of the mobile device software that he/she prefers and would run more often the mobile device software that he/she prefers. The record can include information such as, for example, a type of the mobile device software (e.g. games, shopping, news, socialisation, and so forth), a genre of the type of mobile device software (e.g. sports games, food shopping app, financial news app, sharing digital images app, and so forth) and so forth. Based on the record, at step 345, the one or more electronic processing devices is able to identify at least one genre of the type of mobile device software which is consumed by the user on the personal computer. For instance, if a majority of the mobile device software downloaded by the user is of a certain genre and type, the genre and type of the mobile device software with the highest downloads would be identified. Another example is that if a majority of the mobile device software that is operated on the platform by the user is of a certain genre and type, the genre and type of the mobile device software with the highest number of operations (i.e. highest usage) on the platform would be identified. It could also be that the condition for identifying the at least one genre or type of the mobile device software at step 345 is the highest number of downloads of the mobile device software of the at least one genre or type, and the highest number of operations of the mobile device software of the at least one genre or type on the platform. Furthermore, it is possible that all the genres and types of the mobile device software downloaded or operated on the platform are identified and not just those with highest downloads or operations on the platform.

Once the at least one genre or type is identified, software suggestions for the at least one genre are collated by the one or more electronic processing devices at step 350. Notably, these software suggestions are specific to the user of the personal computer and not suggestions provided to the general public. For example, if five genres or types are identified, five software suggestions can be provided for each of the five genres or types. The five software suggestions may be the ten most popular choices at a digital mobile software repository/store where the suggested software can be obtained. Subsequently, in the present example, the collated suggestions are presented within a web browser at step 355. The collated suggestions can be overlaid on content shown in the web browser, or presented within the content shown in the web browser. In other examples, instead of on the web browser, it is possible that the suggestions are presented on a display interface of the personal computer for displaying graphical contents for mobile device software on a display of the personal computer through the platform.

The platform running in the background of the personal computer may be configured to periodically connect to the one or more servers to receive one or more software suggestions or the one or more servers may be configured to initiate connection with the platform as and when one or more software suggestions is available to be pushed to the display interface displaying the mobile device software run through the platform on the display of the personal computer.

The platform may be further configured to periodically connect to the one or more servers or connect to the one or more servers when a user performs certain actions, for instance, make selections on a URL hosted by the one or more servers. After connecting to the one or more servers, the platform uploads information in the collated record to the one or more servers so that the one or more servers can derive user-specific software suggestions or non-user-specific software suggestions based on the information in the collated record. In another example, it may be that the one or more servers periodically connect to the platform to retrieve information in the collated record for deriving software suggestions when the platform has established connection with the one or more servers via the data network (i.e. Internet, Intranet, etc.).

Although user-specific software suggestions are discussed above, it is appreciated that suggestions based on demographics such as country, age, gender, ethnicity, marital status, etc. can also be worked out based on the records of each user downloading mobile device software using the aforementioned method and platform. For instance, the mobile device software that has been found to have highest number of downloads and/or usage based on a review of all records of users using the aforementioned method and the platform may be included in a suggestion for pushing to all users.

Accordingly, the above described method provides a number of advantages. The abovementioned example provides users with a way to be presented software suggestions which may be appealing to the users. The user need not have a high level of technical expertise (for example, installation and separate execution/configuration of an emulator is not required) to enable the presentation of the mobile device software suggestions on the personal computer. The collated suggestions benefit the user as the user need not make extra effort to seek out software which may be of interest to the user. The suggestions can be simply pushed to the personal computer during use of mobile device software through the platform. Furthermore, the collated suggestions also benefit software developers as their software is brought to the attention of a desired audience.

Figure 4:
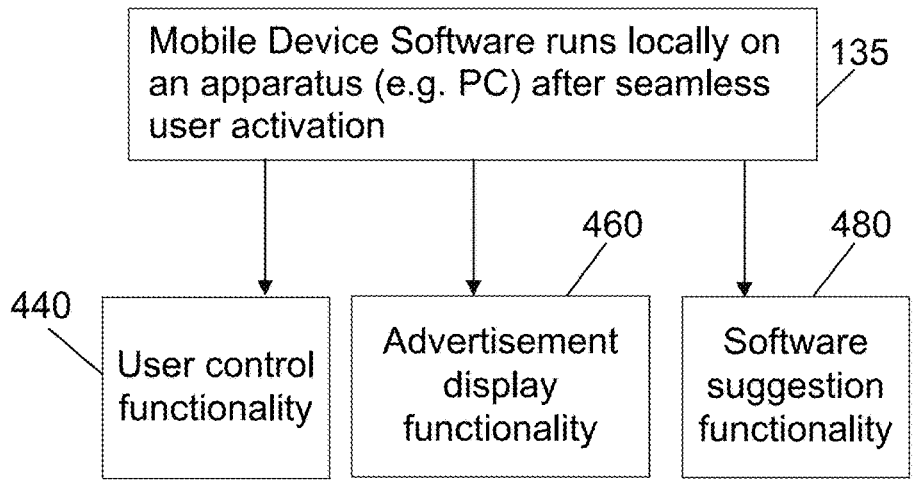
FIG. 4 shows a flow chart of a plurality of sets of steps corresponding to some steps in FIGS. 1B to 3.

FIG. 4 illustrates three sets of method steps 440, 460 and 480 continuing from step 135 in FIG. 1B. Step 135 of FIG. 1B includes running the mobile device software locally on the apparatus, which in the present example is the Personal Computer (PC), after seamless user activation or request to run the mobile device software. In FIG. 4, a first set of steps 440 provides user functionality and corresponds to the set of steps 140 to 155 in FIG. 1B. A second set of steps 460 provides advertisement display functionality and corresponds to the set of steps 240 to 270 in FIG. 2. A third set of steps 480 provides software suggestion functionality and corresponds to the set of steps 340 to 355 of FIG. 3. Through FIG. 4, it is illustrated that the method described with reference to FIGS. 1A, 1B, 2 and 3 allows a user to carry out all respective tasks of the sets of steps 440, 460 and 480 in any combination, concurrently or separately.

An example of a system for carrying out the steps of the method described with reference to FIGS. 1A, 1B, 2, 3 and 4 (whether individually or in any combination) will now be described with reference to FIG. 5.

In this example, the system 500 includes one or more apparatuses 530, a communications network 550, and one or more servers 540 (i.e. it can be one central server or a cluster/plurality of servers). In some embodiments, the one or more servers 540 can be administered by an entity which aggregates mobile device software for distribution to personal computers. In some embodiments, the one or more servers 540 can be administered by an entity which distributes their own proprietary mobile device software.

The communications network 550 can be of any appropriate form, such as the Internet and/or a number of local area networks (LANs). The configuration shown in FIG. 5 is for the purpose of example only, and in practice the apparatus 530 and the one or more servers 540 can communicate via any appropriate mechanism, such as via wired or wireless connections, including, but not limited to mobile networks, private networks, such as an 802.11 network, the Internet, LANs, WANs, or the like, as well as via direct or point-to-point connections, such as Bluetooth, or the like.

Apparatus 530

Figure 6:
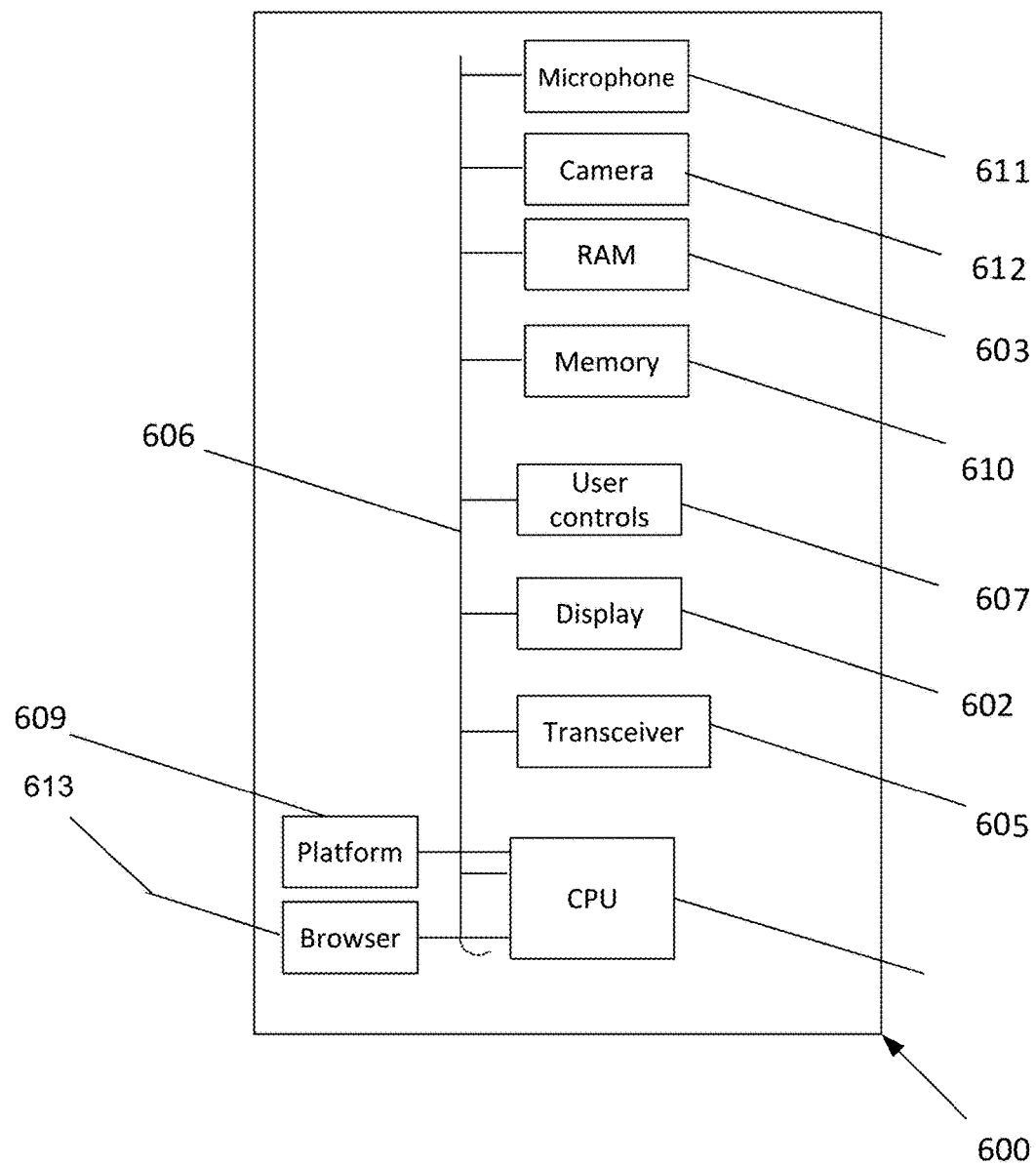
FIG. 6 is a schematic diagram showing components of an example apparatus of the system shown in FIG. 5.

The apparatus 530 of any of the examples herein described in the present disclosure may be a personal computer (such as a desktop, a notebook, and the like), a mobile device (such as smartphone, mini-tablet, and the like), a hybrid of the aforementioned (such as a portable laptop, tablet, and the like), and the like. An example of the apparatus 530 is the apparatus 600 is shown in FIG. 6. As shown, the apparatus 600 includes the following components in electronic communication via a bus 606:

1. a display 602;
2. non-volatile memory 610;
3. random access memory ("RAM") 603;
4. N processing components 601 ("one or more processors");
5. a transceiver component 605 that includes N transceivers;
6. user controls 607;
7. optionally, image capturing components 612; and
8. optionally, audio signal capturing components 611.

Although the components depicted in FIG. 6 represent physical components, FIG. 6 is not intended to be a hardware diagram; thus many of the components depicted in FIG. 6 may be realized by common constructs or distributed among additional physical components. Moreover, it is certainly contemplated that other existing and yet-to-be developed physical components and architectures may be utilized to implement the functional components described with reference to FIG. 6.

The display 602 generally operates to provide a presentation of graphical content (e.g. graphical contents of the mobile device software, the one or more links, announcements and/or advertisements herein described) to a user, and may be realized by any of a variety of displays (e.g., CRT, LCD, HDMI, micro-projector and OLED displays). And in general, the non-volatile memory 610 functions to store (e.g., persistently store) data and executable code including code that is associated with the functional components of a browser component 613 and applications, and in one example, a platform 609 for running mobile device software. In some embodiments, for example, the non-volatile memory 610 includes bootloader code, modem software, operating system code, file system code, and code to facilitate the implementation of one or more portions of the platform 609 as well as other components well known to those of ordinary skill in the art that are not depicted for simplicity.

In many implementations, the non-volatile memory 610 is realized by flash memory (e.g., NAND or NOR memory), but it is certainly contemplated that other memory types may be utilized as well. Although it may be possible to execute the code from the non-volatile memory 610, the executable code in the non-volatile memory 610 is typically loaded into RAM 603 and executed by one or more of the N processing components 601.

The N processing components 601 (or "one or more processors") in connection with RAM 603 generally operate to execute the instructions stored in non-volatile memory 610 to effectuate the functional components. As one skilled in the art (including ordinarily skilled) will appreciate, the N processing components 601 may include a video processor, modem processor, DSP, graphics processing unit (GPU), and other processing components. In some implementations, the processing components 601 are configured to determine a type of software activated on the apparatus 600.

The transceiver component 605 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks. In some implementations, the communication of the transceiver component 605 with communication networks enables a location of the apparatus 600 to be determined.

In some implementations, the user controls 607 are defined in the map of controls herein described. The image capturing components 612 and the audio signal capturing components 611 that are optionally available can also be utilised to input user controls, as defined in the map of controls.

One or More Servers 540

Figure 5:
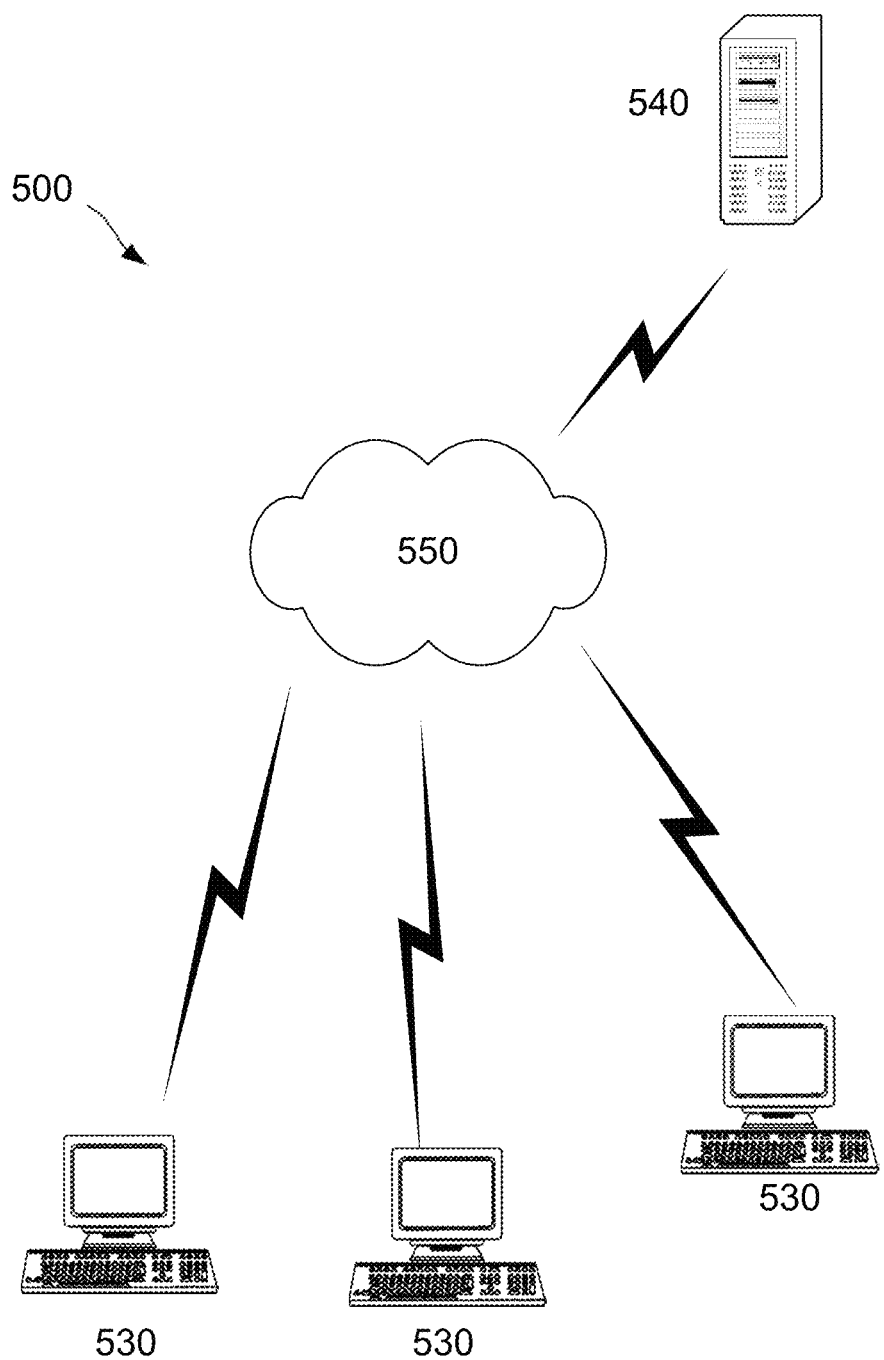
FIG. 5 is a schematic diagram of an example of a system to perform the method described with reference to FIGS. 1A, 1B, and 2 to 4.
Figure 7:
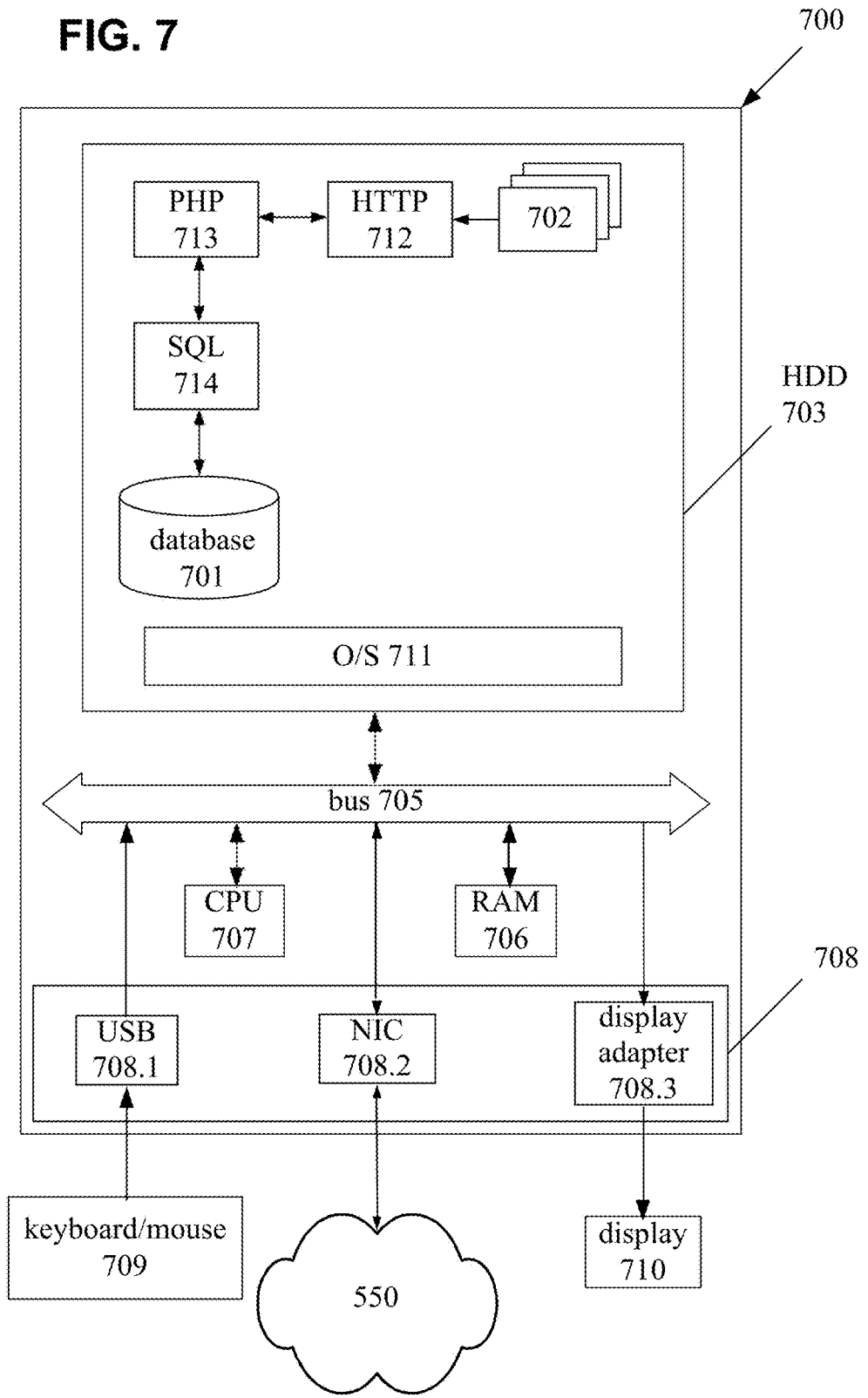
FIG. 7 is a schematic diagram showing components of an example server of the system shown in FIG. 5.

The one or more servers 540 in FIG. 5 of any of the examples herein described in the present disclosure may each be formed of any suitable processing device, and an example of one such suitable device is shown in FIG. 7.

In this example, a processing device is provided by a computing system 700 in communication with a database 701, as shown in FIG. 7. The computing system 700 is able to communicate with the personal computers 530, and/or other processing devices, as required, over a communications network 550 using standard communication protocols.

The components of the computing system 700 can be configured in a variety of ways. The components can be implemented entirely by software to be executed on standard computer server hardware, which may comprise one hardware unit or different computer hardware units distributed over various locations, some of which may require the communications network 550 for communication. A number of the components or parts thereof may also be implemented by application specific integrated circuits (ASICs) or field programmable gate arrays.

In the example shown in FIG. 7, the computing system 700 is a commercially available server computer system based on a 32 bit or a 64 bit Intel architecture, and the processes and/or methods executed or performed by the computing system 700 are implemented in the form of programming instructions of one or more software components or modules 702 stored on non-volatile (e.g., hard disk) computer-readable storage 703 associated with the computing system 700. At least parts of the software modules 702 could alternatively be implemented as one or more dedicated hardware components, such as application-specific integrated circuits (ASICs) and/or field programmable gate arrays (FPGAs).

The computing system 700 includes at least one or more of the following standard, commercially available, computer components, all interconnected by a bus 705:

1. random access memory (RAM) 706;
2. at least one computer processor 707, and
3. external computer interfaces 708:
   a. universal serial bus (USB) interfaces 708.1 (at least one of which is connected to one or more user-interface devices, such as a keyboard, a pointing device (e.g., a mouse 709 or touchpad),
   b. a network interface connector (NIC) 708.2 which connects the computing system 700 to a data communications network, such as the Internet 550; and
   c. a display adapter 508.3, which is connected to a display device 710 such as a liquid-crystal display (LCD) panel device.

The computing system 700 may include one or more of a plurality of standard software modules, including:

1. an operating system (OS) 711 (e.g., Mac, Linux or Microsoft Windows®);
2. web server software 712 (e.g., Apache, available at http://www.apache.org);
3. scripting language modules 713 (e.g., personal home page or PHP, available at http://www.php.net, or Microsoft ASP, C sharp, or javascript); and
4. structured query language (SQL) modules 714 (e.g., MySQL, available from http://www.mysql.com), which allow data to be stored in and retrieved/accessed from an SQL database.

Together, the web server 712, scripting language 713, and/or SQL modules 714 provide the computing system 700 with the general ability to allow users of the Internet 550 with standard computing devices equipped with standard web browser software to access the computing system 700 and in particular to provide data to and receive data from the database 701 (for example, data of mobile device software).

The boundaries between the modules and components in the software modules 702 are exemplary, and alternative embodiments may merge modules or impose an alternative decomposition of functionality of modules.

Each of the steps of the processes performed by the computing system 700 may be executed by a module (of software modules 702) or a portion of a module. The processes may be embodied in a non-transient machine-readable and/or computer-readable medium for configuring a computer system to execute the method. The software modules may be stored within and/or transmitted to a computer system memory to configure the computing system 700 to perform the functions of the module.

The computing system 700 normally processes information according to a program (a list of internally stored instructions such as a particular application program and/or an operating system) and produces resultant output information via input/output (I/O) devices 708.

Typically, the system 500 shown in FIG. 5 is illustrative, and can be used for carrying out the method described in the present disclosure. Data processing can be done respectively at the personal computers 530 and the one or more servers 540, or the data processing can be shared by the personal computers 530 and the one or more servers 540.

The programs, applications and software present in the one or more systems, apparatuses, and servers of FIGS. 5, 6 and/or 7 may be supplied to a user encoded on a data storage medium such as a CD-ROM, on a flash memory carrier, solid state drive or a Hard Disk Drive, and that may be read using a corresponding data storage medium reader. The programs, applications and software may be downloaded from a data network (e.g. Internet, Intranet etc.). The programs, applications and software are read and controlled in its execution by the respective processors of the apparatus 530, and the one or more servers 540. Intermediate storage of program data may be accomplished using Random Access Memory. In more detail, the one or more of the programs, applications and software may be stored on any non-transitory machine- or computer-readable medium. The machine- or computer-readable medium may include storage devices such as magnetic or optical disks, memory chips, or other storage devices suitable for interfacing with a general purpose computer or a mobile device such as a mobile smartphone, laptop, notebook, and the like. The programs, applications and software when loaded and executed on a general-purpose computer or apparatus effectively results in the implementation of the steps of the method described herein with respect to the Figures of the present disclosure.

Figure 9A:
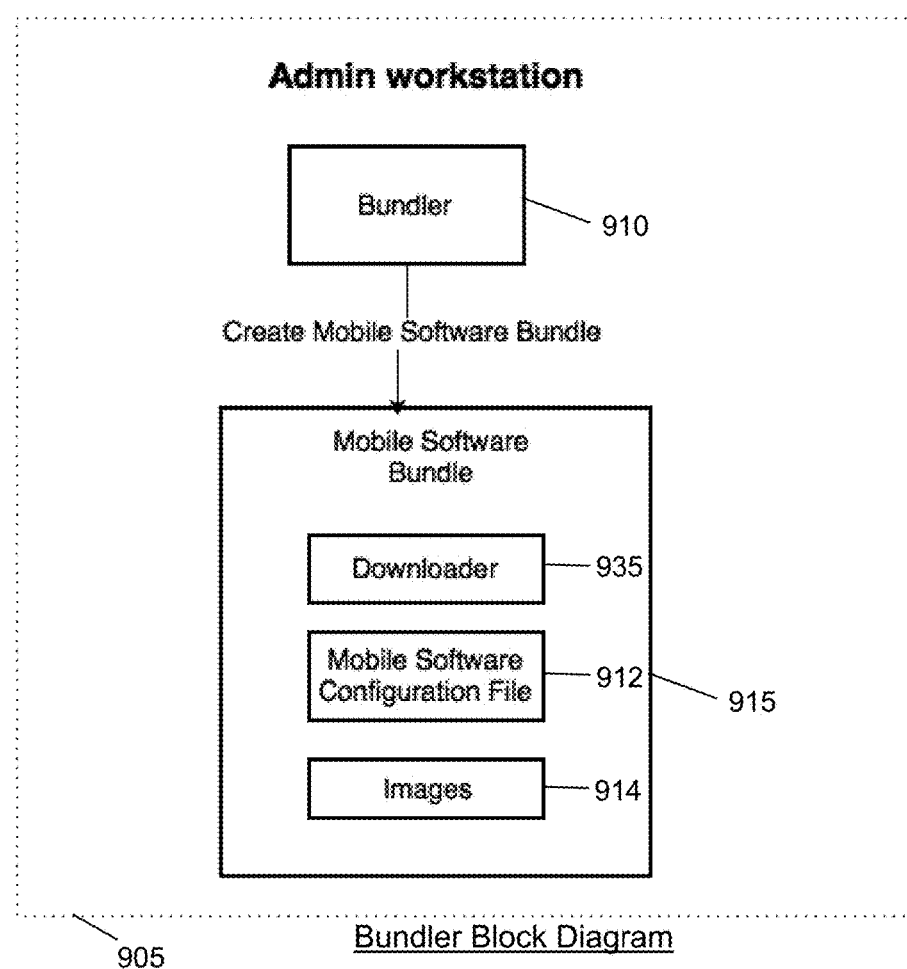
FIGS. 9A, 9B, 9C and 9D show block diagrams of components of example implementations including a platform described in the present disclosure.
Figure 9B:
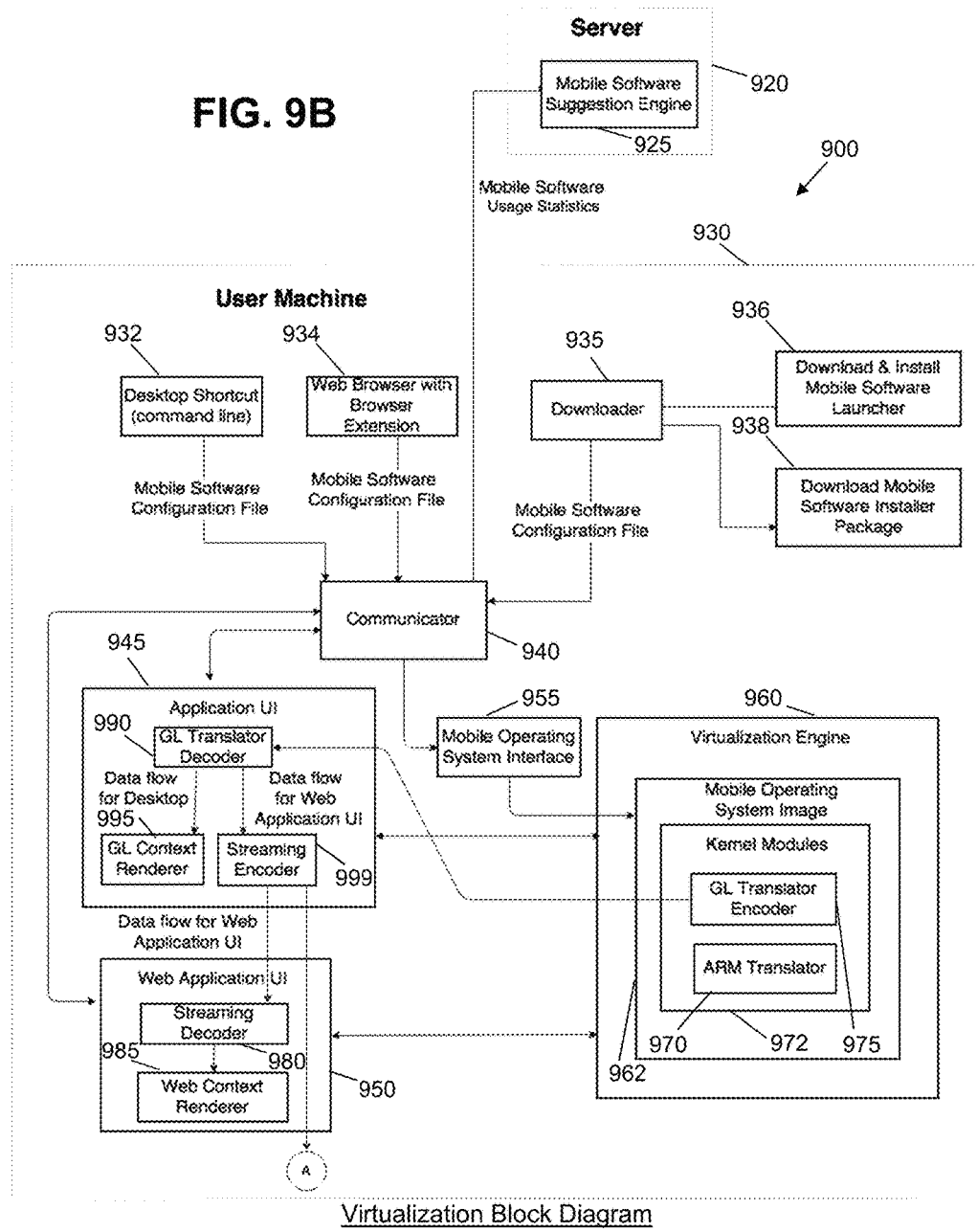
Figure 9C:
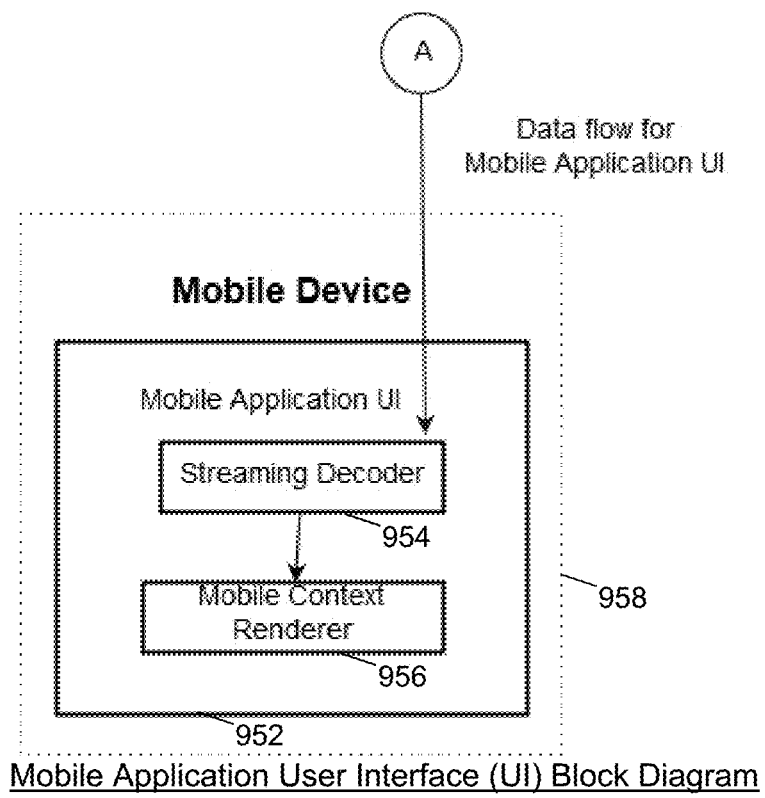

With reference to FIGS. 9A, 9B and 9C, there is shown a detailed example of a system 900 configured to perform the method to run mobile device software as described herein with reference to the Figures of the present disclosure. The apparatus (e.g. 530 in FIG. 5) for performing the method herein described is one of the components of the system 900. Specifically, the apparatus is the user machine 930. Respective software modules and/or hardware components of the system 900 will be described in the following paragraphs with reference to FIGS. 9A, 9B and 9C. Specifically, FIG. 9A shows a bundler block diagram, FIG. 9B shows a virtualization block diagram and FIG. 9C shows a mobile application User Interface (UI) block diagram. The hardware components of the system 900 are the admin workstation 905, the server 920, the user machine 930 and the mobile device 958. The rest of the components of the system 900 are software modules.

At a developer/system administrator end, an admin workstation 905 is used to operate a bundler 910. The bundler 910 is an application module for packaging a downloader 935, a mobile software configuration file 912, and images 914 that may include an icon image of the mobile device software into an executable file 915 (mobile software bundle). The executable file 915 is the same as the primary executable file (PEF) previously described with reference to FIG. 1B. The icon image of the mobile device software may be used as the icon image of the executable file 915 or another icon image that is also bundled may be used. The generated executable file 915 is then uploaded by the developer/system administrator to a central server 920 (i.e. the one or more servers described previously with reference to earlier Figured) hosting a URL (for example, a game suggestion web page in the case that the mobile device software is a game) for users browsing the URL via a browser of the user machine 930 to download the executable file 915. The downloading of the executable file 915 to the apparatus is performed when the user activates, for instance, a download button at the URL. After the executable file 915 is downloaded to the user machine 930, the executable file 915 is executed. The executable file 915 may automatically execute after downloading or there can be a prompt to the user to request for permission to execute the executable file 915.

It is appreciated that the executable file 915 may be distributed in a non-transitory computer- or machine-readable medium and be installed in a memory of the user machine 930 instead of being downloaded to the user machine 930 by the user from the URL. Executing the executable file 915 will activate the downloader 935 to perform tasks described below.

In the present example, a software component i.e. a mobile application UI module 952 has been downloaded and installed to the mobile device 958. The mobile application UI module 952 is mobile device software i.e. a mobile application that may be downloaded from a mobile application store.

Respective key software components at the user machine 930 are described as follows.

At the user machine 930, there is present the executable file 915 comprising of the downloader 935 and the mobile software configuration file 912 that have been downloaded from the above mentioned URL or made available through the a computer- or machine-readable medium as discussed above. The downloader 935 is a software module used to download the software components required for running the mobile device software on the user machine 930. User permission may be sought for the downloader 935 to be downloaded if it is accessed from a webpage. Activating the executable file 915 constitutes a request to run the mobile device software. The executable file 915 would in turn activate the downloader 935, which will perform actions leading to the running of the mobile device software. In the present example, the downloader 935 performs the following tasks.

1. The downloader 935 is configured to connect to the central server 920 or other server to download and install a mobile software launcher 936 if it is not installed on the user machine 930. The mobile software launcher is a primary module that is run to trigger the installation of other modules such as, in the present example, a web application user interface (UI) module 950, an application user interface (UI) module 945, a communicator 940 that is in a form of an executable application, a mobile operating system interface 955, and a virtualization engine 960. In another example, the downloading of the mobile software launcher 936 and the other modules may be triggered via a user input to the browser of the user machine 930. An example of the platform that is described herein with reference to the Figures of the present disclosure includes the mobile software launcher 936, and every other module that is subsequently downloaded, which includes the web application user interface (UI) module 950, the application user interface (UI) module 945, the communicator 940, the mobile operating system interface 955, and the virtualization engine 960. In the present example, information of the server to connect to download (i.e. download location) the mobile software launcher 936 and the other modules is provided in the mobile software configuration file 912. The steps in FIG. 1B to determine whether the platform is installed are performed prior to the downloading of the platform. It is noted that the web application user interface (UI) module 950 need not be downloaded if the graphical contents of the mobile device software is not to be displayed on a browser.

2. The downloader 935 is also configured to connect to the central server 920 or other server to download and, if not already installed on the user machine 930, install a mobile software installer package 938 that, when executed, facilitates the downloading of the mobile device software to be run. In another example, the downloading and installation of the mobile software installer package 938 may be triggered via a user input to the browser of the user machine 930. In the present example, information of the server to connect to download (i.e. download location) the mobile software installer package 938 and the other modules is provided in the mobile software configuration file 912. The mobile software installer package 938 may, for example, be in the form of an apk (android package kit) file. The steps in FIG. 1B to determine whether the mobile device software is installed are performed prior to the downloading.

Once downloaded, the mobile software launcher 936 is triggered by the downloader 935 to proceed with the downloading and/or installation the mobile software launcher 936 is tasked to perform. Once downloaded, the mobile software installer package 938 may be installed after the mobile software 936 has installed all the software components it is tasked to install and/or the mobile software installer package 938 may be installed at the point the mobile device software is being requested to run or launch. In other examples, the mobile software launcher 936 and the mobile software installer package 938 may be bundled as a single package and need not be downloaded separately.

3. The downloader 935 is configured to create a shortcut 932 for the mobile device software on a display interface of the user machine 930 that is displayable on a display of the user machine 930. The shortcut 932 is user selectable to run and is linked to a command line to run the mobile device software. The shortcut 932 provides a convenient means for the user to run the mobile device software. In the present example, the icon image 914 for the shortcut 932 is retrieved based on location, path or directory information provided in the mobile software configuration file 912. As an example, the display interface can be the desktop view of a Windows@ Operating System in the case that the user machine 930 is a personal computer running the Windows@ Operating System.

4. If the mobile device software run through the platform is to be displayed on a browser or an option is provided to use the browser for this purpose, the downloader 935 is configured to connect to the central server 920 or other server to, if not already installed on the user machine 930, download and install a bespoke web browser, or a browser extension. These browser related software 934 (i.e. bespoke browser or browser extension) have the functions to allow a Website (or webpage) to detect whether the platform and/or the mobile device software to be run are installed on the user machine 930 and to allow a Website (or webpage) to transmit a launch or run command through, for instance, a javascript action, to the communicator 940 of the Platform if the Platform and the mobile device software to be run are installed on the user machine 930. In the case that a browser is used, the steps in FIG. 1A to determine whether the browser related software 934 is installed at the user machine 930 would be performed. In the present example, information of the server to connect to download (i.e. download location) the browser related software 934 is provided in the mobile software configuration file 912. User permission may be sought on whether use of the browser is to be made available prior to the downloading of the browser related software 934.

5. The downloader 935 is configured to launch the communicator 940, which performs several actions. The communicator 940 can also be triggered through the shortcut 932 that is created. The communicator 940 can also be triggered via selection of a switch or link on a URL accessed via the web browser with browser extension 934. When the mobile device software is launched (i.e. requested to be run) from the shortcut 932 or the web browser (with the pre-defined or customized browser extension) 934, the communicator 940 acts as an entry point to connect to the web application UI module 950, the application UI module 945, and the virtualization engine 960 via the mobile operating system interface 955.

The communicator 940 has several functions. For instance, once launched by the downloader 935, the communicator 940 receives mobile software configuration file 912 as input, parses it and determines whether the latest mobile software installer package 938 is required. If required, the communicator 940 instructs the downloader 935 to download the latest mobile software installer package 938. The communicator 940 also comprises an updating function to determine in the background of the Host or Main Operating System of the user machine 930 whether the mobile software launcher 936 is the latest. If required, the communicator 940 instructs the downloader 935 to download the latest mobile software launcher 936. The updating function may also determine in the background of the Host or Main Operating System of the user machine 930 whether the mobile software installer package 938 is the latest. If required, the communicator 940 instructs the downloader 935 to download the latest mobile software installer package 938.

Once the necessary software components are downloaded and installed, in the present example, the communicator 940 generates a mobile device software icon using the icon images 914 to create the shortcut 932 if the shortcut 932 has not previously been generated.

After generation of the shortcut 932 (if applicable) or once the necessary software components are downloaded and installed, the communicator 940 starts the virtualization engine 960 and the virtualization engine 960 then launches and run the mobile device software.

Before launching the mobile device software, the communicator 940 accesses predefined data to determine screen size and orientation (portrait, landscape) requirements for displaying graphical contents of the mobile device software on the display of the user machine 930 according to the predefined data, which is defined according to the mobile device software requirements. Audio output and/or other output (e.g. vibration) of the mobile device software are processed by the virtualization engine 960 and produced for output by, for example, an audio speaker of the user machine 930, a user hardware module that can produce vibration, representing vibration by shaking or rocking the screen displaying the graphical contents of the mobile device software, representing vibration by producing certain sound, etc.

During operation of the mobile device software, the communicator 940 monitors the status (e.g. idle, in use, loading, downloading, etc.) of the mobile device software by communicating with the virtualization engine 960 using the mobile operating system interface 955.

The communicator 940 may also track in a record a duration and start/stop time of the use of the mobile device software. In the present example, such record containing the time information (i.e. mobile software usage statistics) is sent to the mobile software suggestion engine 925 residing at the central server 920 for processing to derive software suggestions. From the duration of use, it can be determined how long users spend their time on the mobile device software. The type and genre of the mobile device software with the longest user time usage may then be identified for the mobile software suggestion engine 925 to work out the mobile device software suggestions. From the start/stop time, it can be determined how frequent a specific mobile device software is accessed and what time of a day, month or year users prefer to use the mobile device software. The type and genre of the mobile device software with the most frequent use or highest usage during a certain time may then be identified for the mobile software suggestion engine 925 to work out the mobile device software suggestions. The communicator 940 may also update the record containing the time information with all mobile device software that has been downloaded, along with its type and genre, which can help to identify the type and genre of the mobile device software with the highest downloads. The communicator 940 may also update the record with all mobile device software that has been uninstalled by a user, along with its type and genre, which can help to identify the type and genre of the mobile device software with least uninstall by users.

The mobile operating system interface 955 is a software tool that facilitates communication between the communicator 940 and the mobile operating system run on the Virtualization Engine 960 and between the communicator 940 and the Virtualization Engine 960. The mobile operating system interface 955 also facilitates a variety of mobile operating system actions, such as installing and debugging of the mobile device software.

The virtualization engine 960 is a full virtualizer (also known as an emulator). In the present example, the virtualization engine 960 works on x86 hardware, targeted at server, desktop and embedded system/device use. x86 is a family of backward-compatible instruction set architectures based on the Intel 8086 Central Processing Unit (CPU) and its Intel 8088 variant. It is a setup for enabling mobile operating system X86 virtualization. The virtualization engine 960 comprises a mobile operating system image 962 (i.e. essentially a mobile device operating system), which, for instance, may be based on the Android Operating System for running Android mobile applications (i.e. the mobile device software). Within the mobile operating system image 962, there comprises kernel modules 972 that include an ARM (Advanced RISC Machine) translator 970 that is required to support ARM applications on the X86 platform. The ARM Translator 970 translates the commands in the ARM applications so that ARM applications can run in the mobile operating system X86 virtualization. A GL (Graphics Language) Translator Encoder 975 resides in the kernel modules 972 to encode the graphical information of the virtualization (i.e. graphical content generated by the mobile device software) and then passes the graphic information to the application UI module 945 or to the web application UI module 950 for displaying on the display of the user machine 930. The virtualization engine 960 also, if applicable, processes other content such as audio, text, etc. in addition to graphical information.

The web application UI module 950 is only in action when the mobile device software is required to be presented or displayed in a web browser of the user machine 930 and/or one or more software suggestions, and/or one or more links, announcements or advertisements are required to be pushed or presented in the web browser of the user machine 930. It provides users with similar functions found in the application UI module 945 except that the Graphical User Interface (GUI) environment is in the web browser. The web application UI 950 comprises a streaming decoder 980 to receive encoded graphical streams from the application UI module 945 and decodes them into a format that a web context renderer 985 can present to the users in the web browser. If applicable, other content such as audio, text, etc. streamed from the application UI module 945 are processed similarly.

The application UI module 945 provides an application GUI (not running in a web browser), which uses the virtualization engine 960 to enable users to:
1) execute the selected mobile device software; and
2) view and interact with advertisements and software suggestion pushed to the application GUI provided by the application UI module 945.

The application UI module 945 also performs control mapping based on data of the map of controls (similar to the map of controls described with reference to FIGs other than FIG. 9) contained in the mobile software configuration file 912 downloaded to the user machine 930 and provided via the communicator 940. The control mapping performed converts user control received at the user machine to control for the mobile device software so that the mobile device software can be controlled at the user machine. The application UI module 945 comprises a GL (Graphics Language) translator decoder 990 that receives the graphical information (or graphical contents) generated by the mobile device software from the virtualization engine 960 and decodes the graphical data of the graphical information into a format that can be presented by a GL (Graphics Language) context renderer 995. The graphical information received from the virtualization engine 960 to be presented for displaying on the display of the user machine 930 by the GL context renderer 995 would be subject to the screen size and orientation (portrait, landscape) requirements determined by the communicator 940.

The application UI module 945 comprises a streaming encoder 999 that is activated when the mobile device software and/or one or more software suggestions, and/or one or more links, announcements or advertisements are required to run or presented in a web browser of the user machine 930 or in the operating system environment of the mobile device 958 that is connected to the user machine 930 wirelessly or via wired means (more details on this below). As an example, the mobile device 958 can be an IOS (iPhone® Operating System) device. Otherwise, the mobile device software and/or one or more software suggestions, and/or one or more links, announcements or advertisements are run or presented via the application GUI provided by the application UI module 945. The streaming encoder 999 encodes the graphical information received from the GL translator decoder 990 into formats that can be consumed by the web context renderer 985 in the web application UI module 950 and a mobile context renderer 956 of the mobile application UI module 952 of the mobile device 958. The streaming encoder 999 then packs the encoded data of the graphical information into streams and sends them to the web application UI module 950 for presentation in the web browser or to the mobile application UI module 952 for presentation on a display of the mobile device 958. If applicable, other content such as audio, text, etc. are streamed from the application UI module 945 to the web application UI module 950 and the mobile application UI module 952 as well. In FIG. 9B, data flow between the streaming encoder 999 and the mobile application UI module 952 is shown to continue through the point marked A.

The mobile application UI module 952 is only in action when the mobile device software and/or one or more software suggestions, and/or one or more links, announcements or advertisements are required to be run or presented on the mobile device 958 that is connected to the user machine 930 wirelessly [e.g. Wireless Local Area Network (WiFi), Bluetooth, Cellular Network (GSM 2G, 3G, 4G and the like) and the like] or via wired means (i.e. cables and the like). The mobile application UI module 952 can be a mobile application (i.e. mobile device software) downloadable from a mobile application store. The mobile application UI module 952 provides users with similar functions found in the application UI module 945 except that the GUI provided by the mobile application UI module 952 is run in the operating system environment of the mobile device 958 instead of the environment of the user machine 930. Streaming of the graphical information and other content such as audio, text, etc. from the application UI module 945 to the mobile application UI module 952 can take place via Internet or local network wirelessly or via wired means. The mobile application UI module 952 comprises a streaming decoder 954 that receives encoded graphical streams from the streaming encoder 999 of the application UI module 945 and decodes them into a format that the mobile context renderer 956 can be presented by the mobile context renderer 956. If applicable, other content such as audio, text, etc. streamed from the application UI module 945 are processed similarly.

It is an advantage of the system 900 to be able to stream content (including text, graphical (images, video etc.) and audio content) of the mobile device software that is run on the user machine 930 from the user machine 930 to the mobile application UI module 952, which is operated on the mobile device 958. The mobile application UI module 952 can also transmit user controls received at the mobile device 958 to control the mobile device software running on the user machine 930. In this manner, users can operate the mobile device software running on the user machine 930 with full mobile experience remotely through an external device, which in this case is the mobile device 958. Furthermore, some mobile device software that is not compatible with or not supported by the operating system of the mobile device 958 can now be run on the mobile device 958. For instance, an IOS device that is unable to run an Android Operating System (OS) application can now run the Android OS application. There may be a need to create a separate configuration file or add on to the data in the mobile software configuration file 912 to convert the user controls received at the mobile device 958 to controls for the mobile device software running on the user machine 930.

Although in the present example, the mobile device 958 is one that is mobile, it is possible that the mobile device 958 is replaced by non- or less mobile devices, for instance, a personal computer such as a desktop computer or desktop replacement, a smart television, a video game console, a television streaming box, or a hybrid of the non- or less mobile devices and the mobile device 958 such as a tablet device and the like. However, in such a situation, the mobile application UI module 952 would not be applicable as it works only for the mobile device 958. Another application UI module having similar functions as the mobile application UI module 952 has to be created for the device replacing the mobile device 958 to communicate with the application UI module 945.

The central server 920 includes a mobile software suggestion engine 925 which receives mobile software usage statistics and processes the statistics to carry out suggestions of mobile device software. The central server 920 may also be the download source or location (i.e. software supplier) for the platform to connect (via the downloader 935) to download all the software modules that need to be downloaded to the user machine 930.

Figure 9D:
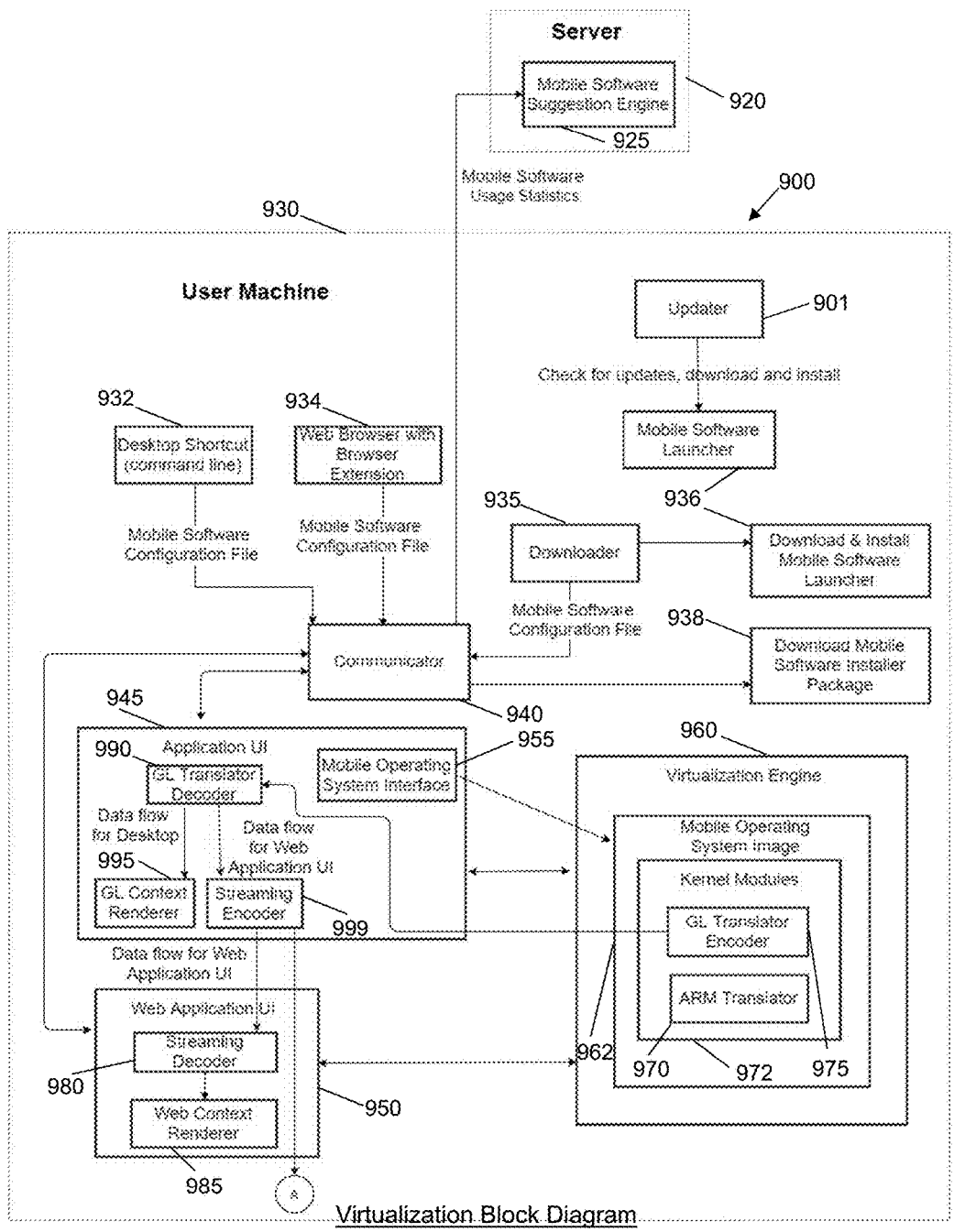

FIG. 9D shows an example of software and hardware components that are similar to the software and hardware components in FIG. 9B. The reference numerals of the software and hardware components in FIG. 9B are retained in FIG. 9D to show similarity. All of them have the same features and functions as described with reference to FIG. 9B unless otherwise stated below. There is a new software component called an Updater 901 (not shown in FIG. 9D) in the example of FIG. 9D that will be described later. There are some differences between FIG. 9B and FIG. 9D with regard to the Downloader 935, the Communicator 940, the Application UI module 945 and the mobile operating system interface 955, which will be described later. FIG. 9D is used to showcase a specific example that uses a system 900 to display on a Chrome Browser graphical contents of an Android mobile game application (i.e. mobile device software) run on the user machine 930 through a platform. Although games are the focus for FIG. 9D, it is appreciated that the system 900 of FIG. 9D may also be adapted for running mobile device software other than game applications.

The platform described with reference to earlier figures is present in the present example as well. The platform comprises a group of software modules, components, or applications that are installed on the user machine 930 or to be installed on the user machine 930 if not already installed. It is appreciated that the platform of the present example is not software that is readily available in the current state of the art. The platform of the present example comprises a Communicator 940, an Application UI module 945, a Web application UI module 950, and a Virtualization Engine 960. In the present example, the Virtualization Engine 960 used is VirtualBox Server. The Virtualization Engine 960 is also known as Emulator in the present example.

The VirtualBox Server 960 operates in the same manner as the Virtualization Engine 960 of FIG. 9B. The VirtualBox Server 960 is a conventional application that contains in itself an environment for running Android Virtual Machine 972 (i.e. Mobile Operating System image), and provides low-level Application Programming Interfaces (APIs) for interacting with the Android Virtual Machine 972. The VirtualBox Server 960 comprises a mobile operating system to run Android mobile device software. The VirtualBox Server 960 is a virtual machine, wherein there may be instances of Android Virtual Machine 972 running inside the VirtualBox Server 960. In the present example, it is a case of one Android Operating System instance per VirtualBox image. On its own, the VirtualBox Server 960 is unable to provide seamless user experience in terms of running mobile device software (in the present example, an Android mobile game application) that requires minimum technical knowledge for users. Similar to the example of FIG. 9B, the system 900 of FIG. 9D comprises a Downloader 935, the Communicator 940 and the Application UI module 945. The Downloader 935, the Communicator 940, the Application UI module 945 and the Web application UI module 950 are created to operate with the VirtualBox Server 960 to provide the seamless user experience.

The Downloader 935 in FIG. 9D does not have all the functions of the downloader 935 in FIG. 9B. It is still a part of an .exe application 915 in FIG. 9A (i.e. executable software application) that upon execution facilitates downloading of the mobile software launcher 936 to the user machine 930. The Downloader 935 refers to connection data (or server address) in the mobile software configuration file 912 to obtain the location (e.g. one or more servers 920) to download the mobile software launcher 936. In the present example, mobile software launcher 936 is an .msi package that contains all the parts of the platform. The mobile software launcher 936 is a primary module that is run to trigger the installation of the platform i.e. the Communicator 940, the Application UI module 945, the Web application UI module 950, and the Virtualization Engine 960 and, additionally, the Updater 901. However, unlike the example of FIG. 9B, the Downloader 935 in the present example of FIG. 9D does not download and install a mobile software installer package 938 if the mobile software installer package 938 is not installed on the user machine 930. Similar to the example of FIG. 9B, in the present example, the mobile software installer package 938 is the .apk (android package kit) file of the Android mobile game application. In the present example, this apk file is downloaded by the Communicator 940 and the Communicator 940 instructs the Application UI Interface 945 to instruct the VirtualBox Server 960 to install the apk file.

In the present example, the Updater 901 is a Windows@ Service provided by the Windows@ Operating System of the user machine 930 that constantly watches whether the mobile software launcher 936 with a newer version of the platform is available. If so, the Updater 901 downloads the latest version of the mobile software launcher 936 from one or more servers 920 in background mode, and silently installs the platform on the user machine 930. Other than the differences set out below, the Communicator 940 in FIG. 9D has all the functions of the communicator 940 in FIG. 9B. The Communicator 940 of FIG. 9D is an application that receives a controlling command issued from, in the present example, either a user input via selection of a Desktop Shortcut 932, execution of the executable application 915 or an action (e.g. a javascript action) from browser related software 934 to launch the Android mobile game application. The Communicator 940 is responsible for checking whether the latest version of the mobile software installer package 938 is installed on the user machine 930. If it is not installed, the Communicator 940 connects to the one or more servers 920 and performs the downloading of the mobile software installer package 938, and instructs the Application UI Interface 945 to instruct the VirtualBox Server 960 to install the mobile software installer package 938. If the mobile software installer package 938 is installed, the Communicator 940 communicates the controlling command to the Application UI module 945, which is responsible for starting the process to launch the Android mobile game application. The Application UI module 945 in turn instructs the VirtualBox Server 960 to run the Android mobile game application.

The Application UI module 945 is tightly integrated with the VirtualBox Server 960. Different from the example of FIG. 9B, the Application UI module 945 of FIG. 9D comprises the mobile operating system interface 955 that allows the Android Virtual Machine 972 to interact or communicate with an existing Host or Main Operating System of the user machine 930, which is the Windows@ Operating System. In FIG. 9B, the mobile operating system interface 955 is a separate software module from the Application UI module 945. The Application UI module 945 of FIG. 9D instructs the VirtualBox Server 960 to launch the Android mobile game application through the mobile operating system interface 955 when the Application UI module 945 receives the controlling command to launch the Android mobile game application from the Communicator 940.

The Web Application UI module 950 in FIG. 9D has all the functions of the Web Application UI module 950 in FIG. 9B. The Web Application UI module 950 in FIG. 9D has to be downloaded because the Chrome browser is used to run the mobile device software (i.e. Android mobile game application) through the Emulator. In other examples in which the browser is not used or not to be provided to users as an option for use, the web application UI module 950 need not be downloaded.

Running the mobile device software on the Chrome browser through the platform incorporates steps of executing the mobile device software using the platform and displaying graphical contents of the mobile device software on the browser. Audio output of the mobile device software are processed and provided by the platform. It is understood that the sound from the audio output are produced by an audio speaker (not shown in FIG. 9D) of the user machine 930. In the present example, the browser related software 934 is provided in the form of a browser extension to enable the Chrome browser to display graphical contents of the Android mobile game application run through the Platform. Specifically, the browser extension is a Chrome browser extension 934 (in short "Chrome extension"), which provides APIs for interaction between one or more Game Websites and the Communicator 940 of the Platform. The main purposes of the Chrome browser extension 934 is to:

- allow a Game Website (or webpage) to detect whether the Platform and/or the specific Android mobile game application to be run are installed on the user machine 930; and
- allow the Game Website (or webpage) to transmit a Launch Game command through, for instance, a javascript action, to the communicator 940 of the Platform if the Platform and the specific Android mobile game application to be run are installed on the user machine 930.

If the Game Website detects that the Platform and/or the specific Android mobile game application to be run are not installed on the user machine 930, the Game Website facilitates the downloading of the executable file 915 (mobile software bundle) described with reference to FIG. 9A to the user machine 930. The Game Website may facilitate the downloading of the executable file 915 by connecting to respective one or more servers 920 through, for instance, a javascript action. User permission may be requested for the executable file 915 to be downloaded. The executable file 915 is the same as the primary executable file (PEF) previously described with reference to FIG. 1B.

Each of the one or more Game Websites may be a website devoted to one or more Android Operating System based mobile games. The system 900 of FIG. 9D provides a solution to run an Android mobile game application on the user machine 930 through, for example, a javascript action in the Chrome browser.

In the example of FIG. 9D, in order to start an Android mobile game application on the user machine 930 and have graphical contents of the Android mobile game application presented on the Chrome browser, the following conditions must be met:

1) the Chrome extension 934 has to be installed on the user machine 930 to determine whether the Platform and/or the specific Android mobile game application to be run are installed on the user machine 930 and facilitate launching of the Android game mobile application through the Platform;

2) the Platform must be installed on the user machine 930; and 3) the Android mobile game application must be installed on the user machine 930.

After the Android mobile game application is launched, graphical contents generated by the Android mobile game application would be translated into graphical contents of the Android game mobile application that are displayable on the Chrome browser. Such graphics translation would be described in more detail later.

With reference to the setup of FIGS. 9A, 9D and 9C, a procedure for starting an Android mobile game application from one Game Website using a Chrome browser is as follows.

At first, the user machine must have the Chrome extension 934 installed for the Chrome browser. When the user surfs to the Game Website on the Internet or Intranet using the Chrome browser and selects to play an Android mobile game application, the Chrome extension 934 provides the Game Website with a JavaScript Application Programming Interface (API) that allows the Game Website to detect whether the Chrome browser has the Chrome extension 934 installed or not. In the case that the Chrome extension 934 is not installed, a JavaScript API of the Game Website or the Chrome extension 934 is triggered to seek permission from the user to install the Chrome extension 934.

After the Chrome extension 934 is installed or the Chrome extension 934 is detected to be installed, the Game Website uses a JavaScript API provided by the Chrome extension 934 to detect whether the Platform and/or the Android mobile game application (or the latest version of the Android mobile game application) have been installed. When using this API, the Chrome extension 934 connects with the Communicator 940 through a Native Messaging API. If the Platform is not present, the Communicator 940 will not be present as the Communicator 940 is part of the Platform. In this case, the Platform will be deemed as not installed on the user machine 930. If the Platform is installed, upon receiving this Native Messaging API call, the Communicator 940 checks whether the Android mobile game application or its latest version is installed on the user machine 930. If the Platform is installed, the Updater 901 of the Platform would be running in the background of the main or host operating system of the user machine 930 to ensure that the latest version of the Platform is installed on the user machine 930.

(A) the Case that the Platform and the Android Mobile Game Application (or the Latest Version of the Android Mobile Game Application) are Installed:

In the case that the Platform and the Android mobile game application (or the latest version of the Android mobile game application) are installed, the Communicator 940 of the Platform will be added as a Native Messaging Host for the Chrome extension 934, and the Native Messaging API call triggered by the Chrome extension 934 will send a confirmation to the Game Website. When the Game Website receives such confirmation, the Game Website uses a JavaScript API of the Chrome extension 934 to launch the Android mobile game application. In the present example, the launch command may be in JSON format, which stands for JavaScript Object Notation and herein known as Game-.JSON. In the JSON format, the launch command describes all necessary details to start the Android mobile game application. The Chrome extension 934 then passes the launch command i.e. the data of Game.JSON to the Communicator 940 through the Native Messaging API. After receiving the data of Game.JSON, the Communicator 940 makes a remote procedure call (i.e. controlling command) to the Application UI module 945 and instructs it to launch the Android mobile game application. In some examples of the present disclosure, the Android mobile game application may be installed after the Application UI module 945 is instructed to launch the Android mobile game application.

(B) The Case that the Platform or the Android Mobile Game Application or the Latest Version of the Android Mobile Game Application is not Installed:

In the case that the Platform is not installed at all, the Communicator 940 does not exist and thus the Communicator 940 will not be added as a Native Messaging Host for the Chrome extension 934, and the Native Messaging API call triggered by the Chrome extension 934 will fail to confirm to the Game Website that the Platform is installed. In this case where the Chrome extension 934 does not send a confirmation to the Game Website, the Game Website will, through a JavaScript API, seek user endorsement (i.e. seek user permission) to download the .exe application 915. Upon downloading the .exe application 915, the .exe application 915 may automatically run the Downloader 935 or start running the Downloader 935 after seeking user endorsement. Upon running, the Downloader 935 downloads the mobile software launcher 936, which will upon downloading to the user machine 930 install all the parts of the Platform.

After the Platform is installed, the Communicator 940 of the Platform will be activated and the Communicator 940 proceeds to determine whether the Android mobile game application or its latest version is installed. In the case that the Android mobile game application or its latest version is not installed, the Communicator 940 will download the mobile software installer package 938, which is an .apk file of the Android mobile game application, and instruct the Android Virtual Machine 972 of the VirtualBox Server 960 to install the mobile software installer package 938. The Communicator 940 instructs the Android Virtual Machine 972 of the VirtualBox Server 960 to carry out the installation of the .apk file through the help of the Application UI module 945. Furthermore, after the Platform is installed for the first time, the Updater 901 of the Platform would be activated to run in the background of the main or host operating system of the user machine 930 to periodically or constantly check whether the mobile software launcher 936 with a newer version of the Platform is available. If available, the Updater 901 downloads the latest version of the mobile software launcher 936 from one or more servers 920 in background mode, and silently installs the platform on the user machine 930.

After the Platform is installed and the Android mobile game application (or the latest version of the Android mobile game application) are installed, the procedures described under (A) above are carried out.

With reference to the setup of FIGS. 9A, 9D and 9C, a procedure for starting an Android mobile game application by activating the .exe application 915 associated with the Android mobile game application (instead of activating via the Chrome browser) is as follows.

The .exe application 915 can be prepared to launch the Android mobile game application in several ways. One way is called "bundling" where the .exe application 915 is bundled to contain a URL link to a remote location to obtain data of the launch command (Game.JSON) of the Android mobile game application. The remote location to obtain data of the launch command (Game.JSON) of the Android mobile game application may be provided in the mobile software configuration file 912 (i.e. configuration data).

Upon receiving user input at the user machine 930 to launch the .exe application 915, the Downloader 935 of the exe application 915 is activated to download the mobile software launcher 936 to install the Platform if the Platform or its latest version is not already installed. After the Platform is installed for the first time, the Updater 901 of the Platform would be activated to run in the background of the main or host operating system of the user machine 930 to periodically or constantly check whether the mobile software launcher 936 with a newer version of the Platform is available. If available, the Updater 901 downloads the latest version of the mobile software launcher 936 from one or more servers 920 in background mode, and silently installs the platform on the user machine 930. After the Platform is installed, the Downloader 935 accesses the Internet or Intranet to fetch the data of Game.JSON and passes the data to the Communicator 940 of the Platform. The Communicator 940 checks whether the Android mobile game application or its respective latest version is installed. If it is installed, the Communicator 940 makes a remote procedure call (i.e. controlling command) to the Application UI module 945 and instructs it to launch the Android mobile game application. If the Android mobile game application or its latest version is not installed, the Communicator 940 downloads the mobile software installer package 938 i.e. the apk file of the Android mobile game application or its latest version and makes a remote procedure call (i.e. controlling command) to the Application UI module 945 and instructs the Application UI module 945 to instruct the VirtualBox Server 960 to install the downloaded mobile software installer package 938. Once both the Platform and the Android mobile game application (or the latest version of the Android mobile game application) are installed, the Communicator 940 makes a remote procedure call (i.e. controlling command) to the Application UI module 945 and instructs it to launch the Android mobile game application. The Application UI module 945 in turn instructs the VirtualBox Server 960 through the help of the mobile software operating system interface 955.

In both the procedure for starting an Android mobile game application from one Game Website using a Chrome browser and the procedure for starting an Android mobile game application by activating the .exe application 915 associated with the Android mobile game application, there may comprise a step to generate the shortcut 932 associated with the Android mobile game application if the Communicator 940 determines that the Android mobile game application is downloaded for the first time. The step to generate the shortcut 932 may be performed once the necessary components are installed but before the Communicator 940 makes the remote procedure call (i.e. controlling command) to the Application UI module 945 to instruct it to launch the Android mobile game application. The shortcut 932 contains a folder or directory path to the Communicator 940 and passes Game.JSON as a parameter to the Communicator 940. After receiving Game.JSON, the Communicator 940 makes a remote procedure call to the Application UI module 945 and instructs it to launch the Android mobile game application. The Application UI module 945 in turn instructs the VirtualBox Server 960 through the help of the mobile software operating system interface 955.

In summary, the Communicator 940 of the present example of FIG. 9D is an application that receives launch game commands in a variety of ways i.e. from the Chrome extension 934, the Downloader 935, or the shortcut 932. In the present example, instead of the Downloader 935 like the example of FIG. 9B, the Communicator 940 downloads the Android mobile game application i.e. the apk file, and triggers its installation. The Game.JSON parameter as discussed above may describe the following details, for instance, .apk filename and/or location of the Android mobile game application, game name, game icon, game popup picture, screen mode (i.e. portrait or landscape, and/or resolution or aspect ratio) etc. The Communicator 940 transforms the Game.JSON data into a unified remote procedure call to the Application UI module 945, thereby instructing it to launch the Android mobile game application. The Communicator 940 may also be configured with a functionality to prohibit users to start mobile device software without having certain pre-defined or customized browser extension installed.

More details of the Application UI module 945 of FIG. 9D are now provided. The Application UI module 945 provides a set of services. Each of the services starts a different channel of communication between the Android Virtual Machine 972 inside the VirtualBox Server 960 and the existing Host or Main Operating System of the user machine 930. The Application UI module 945 comprises the mobile operating system interface 955, which enables the Application UI module 945 to communicate with the VirtualBox Server 960. The Application UI module 945 also comprises a GL Translator Decoder 990 for receiving graphical contents from the VirtualBox Server 960.

During operation of the Android mobile game application, the GL Translator Decoder 990 of the Application UI module 945 receives a stream of GL (Graphics Language) commands from a GL Translator Encoder 975 that is built into the Android Virtual Machine 972 inside the VirtualBox Server 960. The GL commands from the GL Translator Encoder 975 constitute the graphical contents of the Android mobile game application. The GL Translator Decoder 990 passes these GL commands to a GL context renderer 995 of the existing Host or Main Operating System of the user machine 930. The GL commands provide graphical context for displaying the frames rendered by the GL rendering device i.e. the graphical contents of the Android mobile game application on a display of the user machine 930.

Furthermore, during the operation of the Android mobile game application, the Application UI module 945 receives controlling commands i.e. user input from the user machine 930, which may be input from, for example, a keyboard and/or a mouse. Such controlling commands are directed to control the Android mobile game application. The Application UI module 945 translates or converts these controlling commands into commands that are able to control the Android mobile game application, for example, touch screen's taps, swipes, and keypresses of a virtual keyboard/joystick and the like. The Application UI module 945 refers to a map of controls (i.e. configuration data) in the mobile software configuration file 912 provided in the .exe application 915 to perform the translation or conversion. After the controlling commands received at the user machine 930 are translated or converted, the Application UI module 945 passes the translated or converted commands to the Android Virtual Machine 972 using a VBTouchScreen API provided by the VirtualBox Server 960.

The Application UI module 945 is configured to comprise an Internal Android Debug Bridge (IADB) functionality, which allows the Android Virtual Machine 972 of the VirtualBox Server 960 and the Application UI module 945 to pass Android Debug Bridge (ADB) commands between each other. The mobile operating system interface 955 comprises this Internal Android Debug Bridge (IADB) functionality. The ADB commands allow the Application UI module 945 to command the Android Virtual Machine 972 to install a game, start a game, close a game, etc. The remote procedure call comprising the data of the Game.JSON that is sent from the Communicator 940 to launch the Android mobile game application indicates the details of the Android mobile game application to the Application UI module 945. With these details, the Application UI module 945 may instruct the VirtualBox Server 960 to install the .apk of the Android mobile game application after the Platform is installed. The Application UI module 945 may also instruct the VirtualBox Server 960 to start or run the Android mobile game application after the Android mobile game application is installed. The Android Virtual Machine 972 uses ADB commands to report to the Application UI module 945 that the Android Operating System is started, and report statuses of currently running games (e.g. report whether a game was started, or failed to start). The Application UI module 945 uses such status information to decide which moment to display a Graphical User Interface containing GL Rendering Context of the Android mobile game application. The Graphical User Interface may be in a form of a window on the display of the user machine 930 and the window settings may be full screen or partial screen depending on the preferred screen size and orientation of the Android mobile game application.

In addition, the Application UI module 945 provides the Android Virtual Machine 972 with means to access the filesystem of the existing Host or Main Operating System of the user machine 930. The Android Virtual Machine 972 uses the filesystem of the existing Host or Main Operating System to load (i.e. install and run) .apk packages of mobile device software (in this case, Android Operating System games), and to store VDI (Virtual Disk Image) files of the Android Virtual Machine 972, which contain the filesystem of the Android Virtual Machine 972.

There is provided a mechanism in the example of FIG. 9D that allows bypassing of the Android Operating System (OS) loading screen and Android OS home screen, and directly display on the display of the user machine 930 graphical contents of the Android mobile game application being run.

After the Communicator 940 sends the launch command (i.e. Game.JSON) to the Application UI module 945 to launch the Android mobile game application, the processes of the Application UI module 945 and the VirtualBox Server 960 will be running. Neither the Application UI module 945 nor the VirtualBox Server 960 at the point the Communicator 940 sends the launch command has any user interface being displayed. The VirtualBox Server 960 does not provide any user interface in the present example. The Application UI module 945 is configured such that no user interface is displayed until the graphical contents of the Android mobile game application are displayed on the display of the user machine 930. The Application UI module 945 only subsequently starts up the window, which contains a canvas for displaying the GL Rendering Context of the Android mobile game application, when the graphical contents of the Android mobile game application are to be displayed on the display of the user machine 930.

When commanded to launch the Android mobile game application, the Application UI module 945 first sends a command to the VirtualBox Server 960 to start an instance of the Android Virtual Machine 972. After that, the Application UI module 945 waits until the Android Virtual Machine 972 reports through the ADB commands that the Android Virtual Machine 972 has been run or started. When the Android Virtual Machine 972 is run or started, the Application UI module 945 sends to the Android Virtual Machine 972 a set of ADB commands to check if the downloaded mobile software installer package 938, which is an .apk package of the Android mobile game application, is already installed. Installation of the .apk package of the Android mobile game application is equivalent to installation of the Android mobile game application. After the installation of the mobile software installer package 938, the Android Virtual Machine 972 starts or run the Android mobile game application. Thereafter, there is a wait for the Android Virtual Machine 972 to report that the Android mobile game application has started successfully.

After the Application UI module 945 receives an ADB command from the Android Virtual Machine 972 that the Android mobile game application started successfully, the Application UI module 945 creates the window for containing Graphical Context to display rendered GL commands associated with the Android mobile game application. The Android mobile game application then displays its loading screen in the window. In this manner, the loading screen of the Android Operating System and the home screen of the Android Operating System are successfully bypassed, and the user only sees the images that appear after the Android mobile game application has been launched by the Android Virtual Machine 972.

Details of the GL Translation mechanism principles adopted in the example of FIG. 9D are as follows. In order to overcome a limitation of the Android Virtual Machine 972, wherein the Android Virtual Machine 972 does not physically have Graphics Processing Unit (GPU) hardware, GL Translation technique is used to improve the graphics displaying performance in the displaying of the graphical contents of the Android mobile game application. The GL Translation mechanism comprises of several components, which are distributed between the Android Virtual Machine 972 and the Application UI module 945. The Android Virtual Machine 972 has been specially configured to have two driver level components, one being a Virtual Screen Device, which the Android Operating System (OS) provides to Android applications to send GL commands to. The other driver level component is the specially configured GL Translator Encoder 975 residing in Kernel modules 962 of the Android Virtual Machine 972, which keeps constant connection with the counterpart GL Translator Decoder 990 of the Application UI module 945. The stream of GL commands communicated from the GL Translator Encoder 975 to the GL Translator Decoder 990 are carried out using TCP (Transmission Control Protocol) protocol. The GL Translator Decoder 990 receives a stream of the GL Commands from the GL Translator Encoder 975 and translates them from OpenGL 2.0 ES to OpenGL 2.0 desktop commands, and sends them to the GPU drivers (i.e. the GL context renderer 995) of the existing Host or Main Operating System GPU to render the GL commands into actual video stream of the Android mobile game application. The rendered frames (i.e. video stream) are then displayed within a graphical context, which in the present example, is the window created by the Application UI module 945, and made visible to users on the display of the user machine 930.

Details of the principles adopted in the determination of screen size and/or orientation to display graphical contents of the Android mobile game application on the display of the user machine 930 are as follows. In the present example, the Android Operating System requires screen size to stay unchanged during runtime of the Android mobile game application. However, Android mobile game applications are generally not designed to adapt to different screen resolutions and Dots Per Inch (DPI) in real-time because mobile devices generally only have one display, and do not support hot-swapping of displays. This limitation requires sticking to the same screen parameters of the Android Virtual Machine during the runtime of the Android mobile game application. In the present example, the GL Translator mechanism including the GL Translator Encoder 975 and the GL Translator Decoder 990 that is incorporated to the Android firmware is hardcoded to a specific DPI and is configured to 720p screen resolution. Customization of the GL Translator mechanism can be made available in order to change these parameters (for instance, to 1080p screen resolution or better, or lower resolution to improve compatibility and operation stability (i.e. no lag)) before the Android mobile game application is started. Hence, in some examples of the present disclosure, the Application UI module 945 may be configured to provide a settings graphical user interface for allowing changes to be made to the parameters of the GL Translator mechanism. In this manner, the screen parameters for each Android mobile game application can be specifically changed. This will enable the use of the highest supported resolution for games that support high texture definitions. However, for games that does not have such support for high texture definitions, such games may stick with lower resolutions for compatibility and operation stability (i.e. no lag) reasons.

In the present example of FIG. 9D, the displaying of the graphical contents of the Android mobile game application are carried out by the window mode of the Application UI module 945. The rendered images displayed in the window are of the same size as it is provided from the GL Translator Decoder 990 (i.e. in 720p resolution). When the window is presented in full screen mode, the images are sized to cover the full screen and the same pixel resolution of 720p is maintained. The Application UI module 945 is configured to respond to user triggered changes to the orientation of the window, which displays the graphical contents of the Android mobile game application, for Android mobile game applications that support both portrait and landscape orientation. For example, the F12 key on a keyboard can be used to switch the window displayed between portrait and landscape orientation. The switching may be performed at the Application UI module 945 by redrawing the image with height and width changed accordingly. For Android mobile game applications that only support either the portrait orientation or the landscape orientation, the Application UI module 945 may be configured to disallow switching of orientation and only one orientation is displayed.

In addition, pixel coordinates associated with user input are also scaled or converted appropriately for each screen displayed in the portrait or landscape orientation so that the Android mobile game application can be controlled by the user in both the portrait or landscape orientation. Such scaling or conversion data can be stored in the predefined configuration data for mobile device software controls (i.e. map of controls) of the mobile software configuration file 912. The mobile software configuration file 912 may be configured as the Game.JSON described earlier, or the Game.JSON may be separately created to contain the predefined configuration data for mobile device software controls (i.e. map of controls) obtained from the mobile software configuration file 912. For games designed to work only in portrait or landscape orientation, the preferred orientation may be set in the Game.JSON, so that the respective game will always be launched in the window provided by the Application UI module 945 in the preferred orientation.

In the present example of FIG. 9D, in order to support both x86 and ARM Android applications, the Android firmware is incorporated with ARM translation. The customized Android firmware that is provided in the Platform is built on the basis of the Android x86 open source project. The Platform is specially configured to provide services required for the GL Translation mechanism and services for communication between the Android Virtual Machine 972 and the Application UI module 945, which is an application run in the existing Host or Main Operating System (OS) of the user machine 930. Such services include communication channels for passing GL commands, converted keyboard/mouse commands to control the Android mobile game application, ADB commands, allowing the Android Virtual Machine 972 and/or the Application UI module 945 to access the existing Host or Main OS filesystem and the VDI (Virtual Disk Image) image etc.

The Web Application UI module 950 of FIG. 9D operates in the same way as the web application UI module 950 of FIG. 9B. The Web Application UI module 950 is only in action when the Android mobile game application is required to be presented or displayed in a web browser of the user machine 930 and/or one or more software suggestions, and/or one or more links, announcements or advertisements are required to be pushed or presented in the web browser of the user machine 930. It provides users with similar functions found in the Application UI module 945 except that the Graphical User Interface (GUI) environment is in the web browser. The Web Application UI module 950 comprises a streaming decoder 980 to receive encoded graphical streams from the Application UI module 945 and decodes them into a format that a web context renderer 985 can present to the users in the web browser. If applicable, other content such as audio, text, etc. streamed from the Application UI module 945 are processed similarly. The Application UI module 945 additionally comprises a streaming encoder 999 that is activated when the mobile device software and/or one or more software suggestions, and/or one or more links, announcements or advertisements are required to run or presented in a web browser of the user machine 930 or in the operating system environment of the mobile device 958 in FIG. 9C that is connected to the user machine 930 wirelessly or via wired means. The streaming encoder 999 encodes the graphical information received from the GL translator decoder 990 into formats that can be consumed by the web context renderer 985 in the web application UI module 950 and a mobile context renderer 956 of the mobile application UI module 952 of the mobile device 958. The streaming encoder 999 then packs the encoded data of the graphical information into streams and sends them to the Web Application UI module 950 for presentation in the web browser or to the mobile application UI module 952 for presentation on a display of the mobile device 958. If applicable, other content such as audio, text, etc. are streamed from the Application UI module 945 to the Web Application UI module 950 and the mobile application UI module 952 as well. In FIG. 9D, data flow between the streaming encoder 999 and the mobile application UI module 952 is shown to continue through the point marked A.

The platform as described in the present disclosure may have a silent downloading/installation feature similar to that of the Updater 901 discussed above. This silent downloading/installation feature is elaborated as follows. After a user requests to run the mobile device software (e.g. through clicking an advertisement, a hyperlink on a webpage, desktop shortcut to execute a program, activating an executable application to run, and the like), downloading and/or installation of the platform and/or the mobile device software or updated versions thereof on the user machine 930 will commence according to a determination of whether the platform and/or the mobile device software or updated versions thereof is already downloaded and installed. During the downloading and/or installation of the platform and/or the mobile device software or updated versions thereof, a list of conditions or exceptions that would individually trigger a silent downloading/installation process or mode to operate in the background of the user machine 930 to resume or continue to download and/or install the platform and/or the mobile device software or updated versions thereof is as follows.

When a user closes an installation screen when the platform and/or the mobile device software is installing.

When network/Internet connection drops and resumes back again.

When the user machine 930 reboots.

The silent downloading/installation process will run in the background until the requested mobile device software is launched or run through the platform on the user machine 930.

It has been discovered by the inventors of the present invention that downloading and/or installation time of the platform and/or the software or updated versions thereof affects the interest of users who request to run the mobile device software through the platform. Users may lose interest in the mobile device software or the platform if the downloading and/or installation time takes too long. To address this problem, the platform may be further configured to retrieve machine specifications, for instance, Internet Connection Speed, CPU Model, CPU Usage, Available RAM, Virtualisation space and Hard Disk space and the like from the user machine 930. From the machine specifications, the platform is configured to work out the estimated time for the downloading and/or installation. Furthermore, a plurality of user profiles may be defined and each user that requests to run the mobile device software can be categorised under one of the user profiles. Each user profile may be associated with a timeframe, wherein the silent downloading/installation process is configured to commence if the estimated time for the downloading and/or installation will exceed the timeframe set for the user profile.

For instance, a first user profile may be a user who requests to run the mobile device software through an advertisement on a web page, a second user profile may be a user who requests to run the mobile device software through a user interface application that may be part of an already downloaded platform and the user interface provides a plurality of mobile device software for download, and a third user profile may be a user who requests to run the mobile device software through a webpage that provides a plurality of mobile device software for download.

It may be that the users under the second user profile is regarded as having the most patience to wait out the full downloading and/or installation time and a timeframe with longest time may be set. In this case, the silent downloading/installation may only commence when one of the aforementioned conditions or exceptions take place.

It may also be that the users under the first user profile is regarded as having the least patience and the shortest timeframe of, for instance, 3 seconds is thus set for the first user profile. If the time estimated for the downloading or installation exceeds the 3 seconds, the silent downloading/installation will commence and the user may be informed accordingly that the silent downloading/installation process with the capability to automatic resume or continue downloading or installation has commenced. In this case, the user need not wait out the full downloading and/or installation time, and may proceed to do other things while the silent downloading/installation process takes care of the downloading and/or installation in the background.

The timeframe set for each user profile may be automatically adjusted by the platform by tracking behavioural patterns of the users under each user profile. For instance, the third user profile may overtake the second user profile as the user profile with most patience and thus the longest timeframe may be set if, for instance, mobile device software uninstallation rate tracked by the platform is the lowest and/or that usage time duration of the mobile device software installed is the highest for users under the third user profile among the users of the plurality of user profiles.

In summary, a timeframe may be set according to a user profile determined for each user, wherein the user profile may be categorised according to how the user makes the request to run the mobile device software, and the silent downloading/installation process commences if the timeframe is exceeded.

FIGS. 13 to 16 illustrates several useful applications of the platform as described in the present disclosure.

Figure 13:
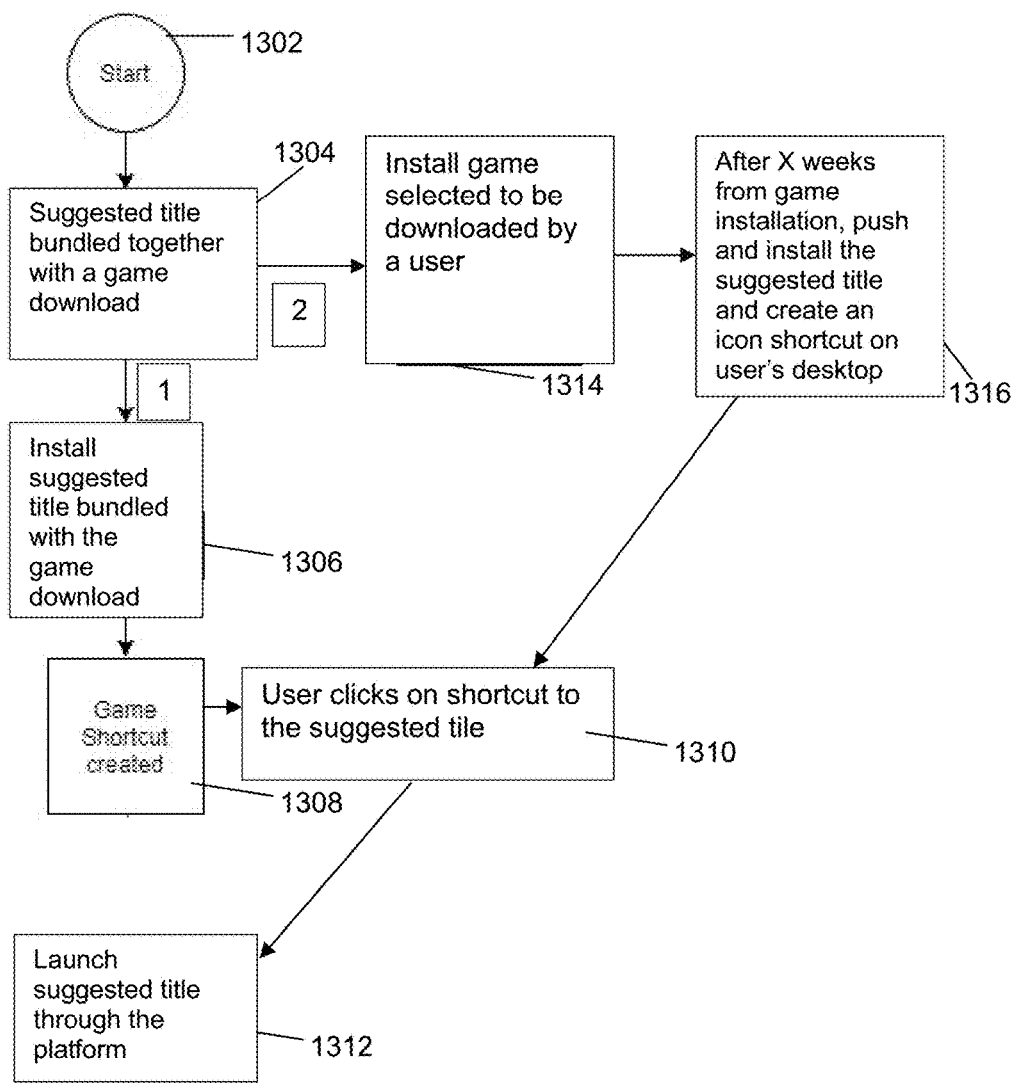
FIG. 13 shows a flowchart illustrating 2 methods to push mobile device software to an apparatus described in the present disclosure.

FIG. 13 illustrates 2 methods on how suggested mobile device software may be pushed to a user machine or apparatus with the help of the platform. In the present example, the user machine or apparatus is a personal computer.

In a first method, a software push process begins at a step 1302. At a step 1304, a suggested title i.e. suggested mobile device software is bundled together with a mobile game application that may be downloaded to the user machine or apparatus by the platform. The suggested title may be machine-suggested, for instance, suggested by the mobile software suggestion engine 925 of FIGS. 9B and 9D. Such bundling can be done, for instance, with reference FIG. 9A, at the time that the .exe application 915 is bundled to contain a URL link to a remote location to obtain data of the launch command (Game.JSON) of the Android mobile game application. Like the remote location to obtain data of the launch command (Game.JSON) of the Android mobile game application, the remote location to obtain data of the launch command of the suggested title may be provided in the mobile software configuration file 912 (i.e. configuration data) as well to facilitate downloading and launching later. At a step 1306, when the mobile game application is downloaded to the user machine or apparatus through the platform, the suggested title is also downloaded together with the mobile game application. A shortcut executable icon i.e. in this case, a desktop shortcut is then created at a step 1308 on the user machine or apparatus for the mobile game application and for the suggested title as well. In the present example, the desktop shortcut is created on a desktop screen of an operating system (e.g. Windows) of the user machine or apparatus. When a user clicks on the shortcut at a step 1310, the suggested title is launched through the platform at a step 1312.

In a second method, steps 1302 and 1304 are carried out sequentially, followed by a step 1314. At step 1314, the mobile game application is selected by a user to be downloaded to the user machine or apparatus through the platform and the downloading takes place. After a predetermined time period e.g. X number of weeks from the downloading of the mobile game application, the suggested title is installed and pushed to the user machine or apparatus with the help of the platform and a shortcut executable icon i.e. desktop shortcut is created at a step 1316. In the present example, the suggested title is a machine suggested title but in another example, the title may not be a machine suggested title but is one determined by an administrator. Thereafter, when the user clicks on the shortcut at a step 1310, the suggested title is launched through the platform at a step 1312. In this second method, with reference to FIG. 9A, like the remote location to obtain data of the launch command (Game.J-SON) of the Android mobile game application described earlier, the remote location to obtain data of the launch command of the suggested title may be provided in the mobile software configuration file 912 (i.e. configuration data) as well to facilitate downloading and launching later. Additionally, the predetermined period of time to automatically download the suggested title may be indicated in the configuration data as well so that the platform would be tasked to download the suggested title after the predetermined period of time.

The platform may be configured such that if the user does not click on the shortcut to the suggested title over a predetermined period of time (i.e. non-use by the user), the suggested title would automatically uninstall. Such automatic uninstallation may be performed for any other mobile device software that has been downloaded through techniques described in the present disclosure as well.

Figure 14:
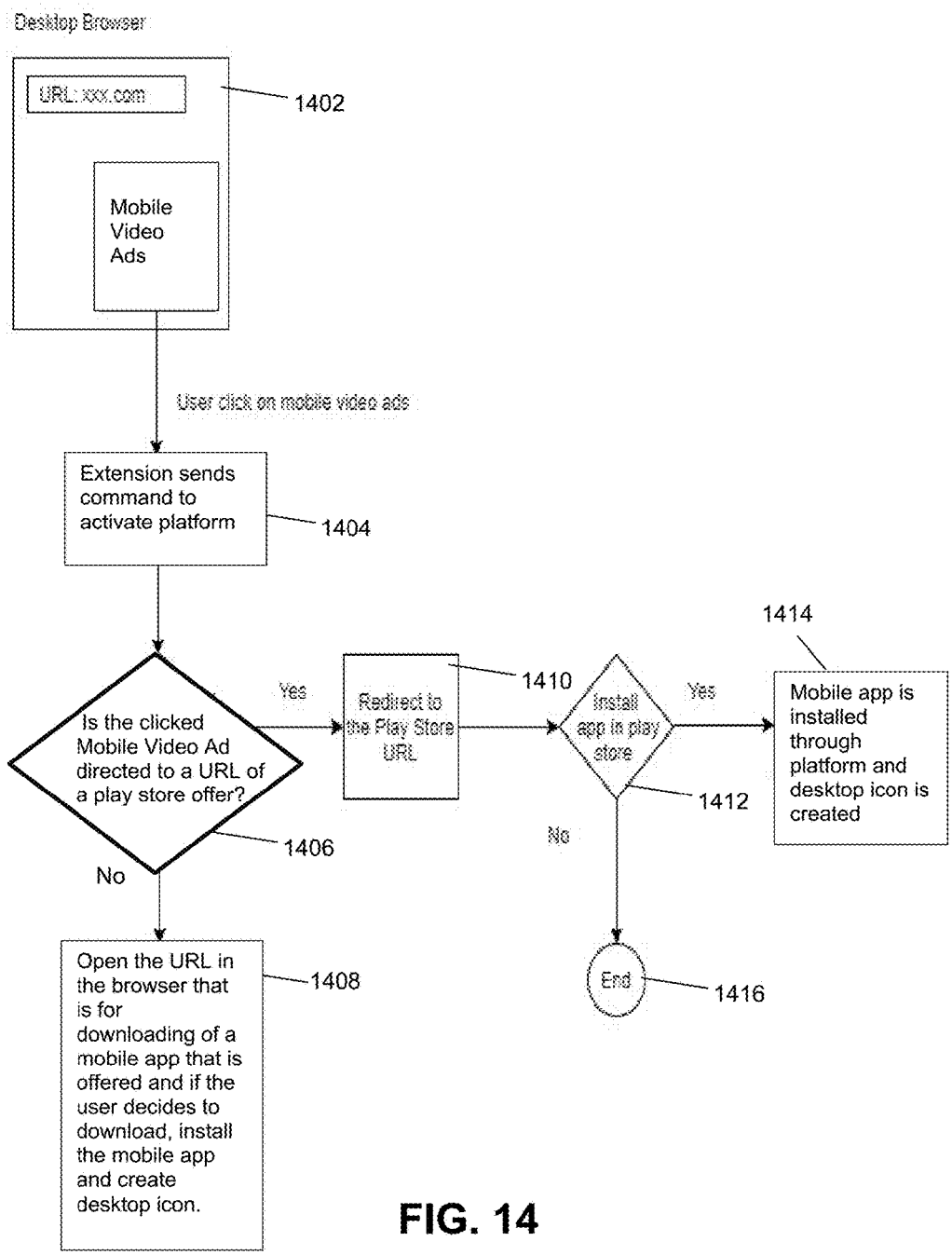
FIG. 14 shows a flowchart illustrating that a mobile advertisement can be injected into a browser and installation initiation of mobile device software can be activated by a user clicking on the mobile advertisement.

FIG. 14 shows that a mobile video advertisement may be injected into a browser by the platform running on a user machine or apparatus. In the present example, the user machine or apparatus is a personal computer. Such mobile video advertisement can be injected by way of obtaining data of the mobile video advertisement from a server and generating graphical content of the mobile video advertisement for displaying on the browser. The browser may have to pre-install an extension or may have to be a browser that is configured to work with the platform.

In the example of FIG. 14, it is assumed that the platform is already installed. The browser of the present example is assumed to have an extension that is configured to work with the platform. At a step 1402, the browser displays a url containing a mobile video advertisement directed to specific mobile device software and a user clicks on the mobile video advertisement. At a step 1404, on receiving the user click, the extension of the browser sends a command to activate the platform for downloading and installation of the mobile device game software. It is next determined at a step 1406 whether the clicked mobile video advertisement is directed to a URL of a store offering the specific mobile device software. A store herein refers to a URL where a plurality of mobile device software can be downloaded free or at a cost. For instance, in this case, the store is the Google play store for downloading Android mobile applications and the Google play store URL has an offer for downloading the mobile device software directed by the mobile video advertisement. If the clicked mobile video advertisement is directed to the URL of the store at step 1406, the browser is then directed to display the URL of the store at a step 1410. When directed to the URL of the store, the mobile device software being offered is displayed. At a step 1412, it is determined whether the user selects to install the mobile device software. If the user selects to install the mobile device software, the mobile device software is installed through the platform and a shortcut executable icon i.e. desktop shortcut is created for the mobile device software at a step 1414. If the user does not install the mobile device software, the process ends at a step 1416. If the clicked mobile video advertisement is not directed to a URL of the store but to another URL not tied to the store that has an offer to download mobile device software as well, the URL would be accessed by the browser at a step 1408 to display details of the mobile device software offered to let the user decide whether to download the mobile device software. If the user decides to download the mobile device software, it would be downloaded and installed through the platform and a shortcut executable icon i.e. desktop shortcut is created for the mobile device software.

Figure 15:
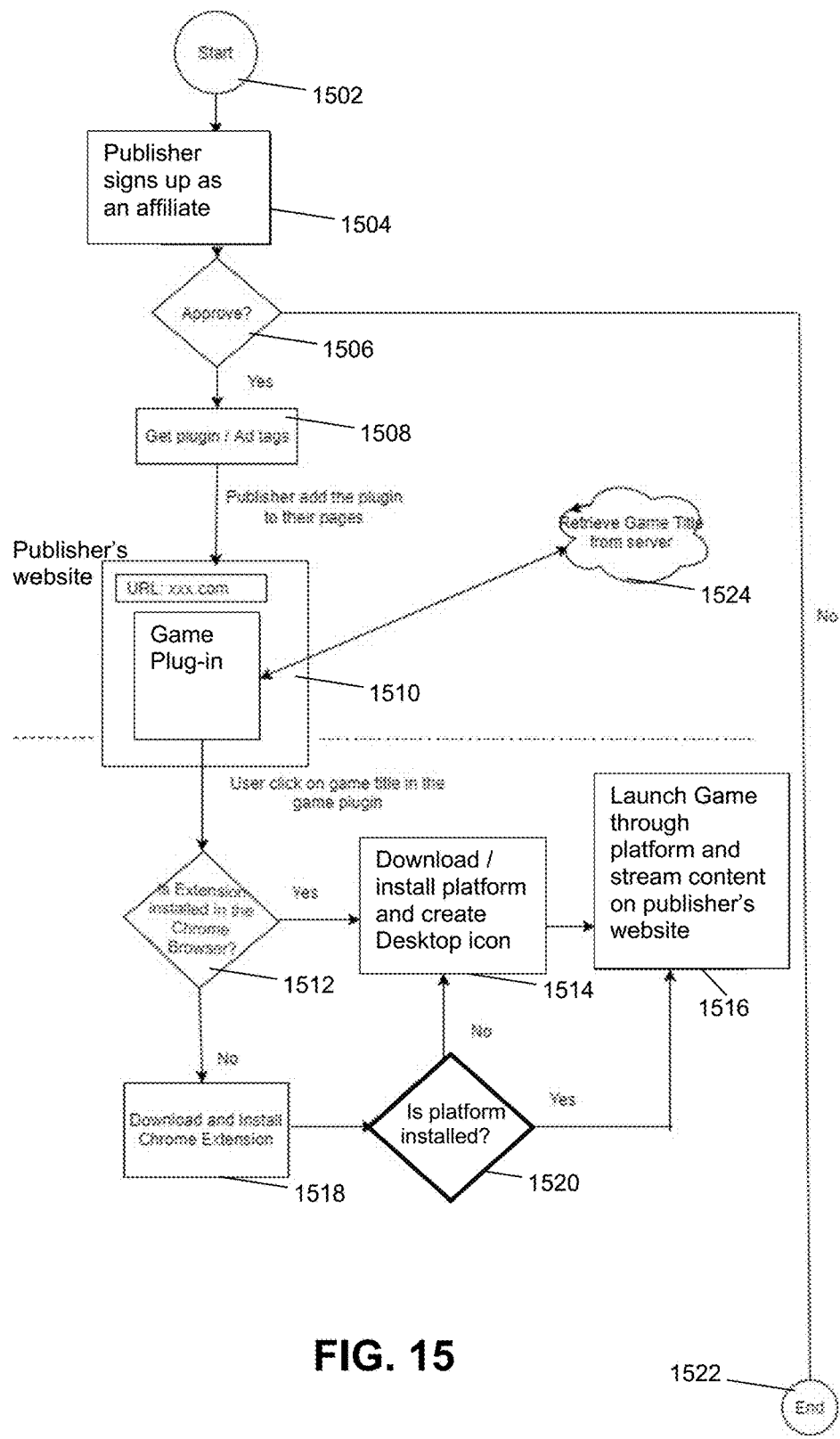
FIG. 15 shows a flowchart illustrating installation initiation and launch of mobile device software on a webpage resulting from a user clicking a mobile device software plugin on the webpage.

FIG. 15 shows a flowchart illustrating how the platform may benefit a third party advertising on a website, herein named as publisher, and a mobile device software consumer. The third party may be any party interested to advertise on a website.

The process of FIG. 15 begins at a step 1502. At a step 1504, a publisher signs up as an affiliate from, for instance, a webpage displayed on a browser, and a user account of the publisher managed at a central server (e.g. 540 in FIGS. 5 and 920 in FIGS. 9B and 9D) is created. If the user account of the publisher is not approved by an administrator controlling the central server at a step 1506, the process ends at a step 1522. However, if the user account of the publisher is approved at the step 1506, the publisher is then able to login under the user account, for instance, via a website and have access to an option to request or order for plugins/advertisements tags, or select ready available ones. Upon the request, order or selection, the publisher would get the plugins /advertisements tags at a step 1508 for publishing on one or more webpages according to the publisher's wishes. After obtaining the plugins/advertisements tags, the publisher may include them onto the publisher's selected website at a step 1510. The plugins/advertisements tags may be in a form of an advertisement to download mobile device software. In the present example, the plugin /advertisement is related to a mobile game application with a specific game title and is in a form of a game plugin. The game plugin may be linked to a cloud system 1524 and is retrievable from the cloud system 1524. In one example, the plugins/advertisements tags herein described may be mobile game title advertisements or game preview video plugins to be directly uploaded or streamed from the cloud system 1524 to the one or more webpages according to the publisher's wishes. When a user accesses the publisher's website through a browser run on an apparatus or user machine, which may be a personal computer, the user may click on the game plugin. For example, the game plugin may provide a "play now" button for the user to click to play the game title. In the present example, upon the user click, a check to determine whether a specific browser extension operable with the platform is installed on the browser is performed at a step 1512. In the present example, the browser used by the user is the Chrome Browser. If the browser extension is already installed, the platform and the mobile game application would be downloaded and installed upon user approval and a shortcut to the mobile game application in the form of a desktop icon would be created at a step 1514. The mobile game application would be launched through the platform at a step 1516 either automatically after the platform and the mobile game application are installed or upon user activation of the mobile game application via, for instance, the desktop icon. In the present example, the mobile game application is launched through the platform and displayed directly on a web page of the publisher's website by a browser at the step 1516 instead of on a separate webpage by the browser or in a separate application window and not on a webpage by the browser. Specifically, the graphical contents of the mobile game application are streamed for displaying directly on the web page of the publisher's website. If the check at step 1512 indicates that the browser extension is not installed, the user would at a step 1518 be prompted to download and install the browser extension to enable the browser to operate with the platform to, for instance, display graphical contents of the mobile device software on a browser through the platform and/or check whether the platform and/or mobile device software to be run and their latest version is installed etc. as described previously with reference to, for instance, FIGS. 9B and 9D. After the browser extension is downloaded and installed, the browser extension helps to check whether the platform is installed on the apparatus or user machine at a step 1520. If the check at step 1520 indicates that the platform is installed, the process proceeds to step 1516. If the check at step 1520 indicates that the platform is not installed, the process proceeds to step 1514.

In the present example, the game plugin shows a video preview/animation of a game being promoted and is viewable by a user browsing the publisher's selected website regardless whether the platform and the specific browser extension operable with the platform is downloaded. In some instances, the plugin or in this case the game plugin may show the video preview/animation only after the platform and the specific browser extension are downloaded and installed because the plugin is configured to be run by the platform working in cooperation with the browser extension. In such instances, the plugin may then be just a static image clickable by a user if the user is interested in specific mobile device software promoted in the static image.

In summary, examples of the present disclosure may have the following features.

For avoidance of doubt, the term "platform" used throughout the present disclosure refers to software configured to operate in an existing operating system of the apparatus to run mobile device software and the existing operating system of the apparatus is not originally configured to run the mobile device software. The platform may comprise a virtualization engine (or emulator) and a plurality of software applications, modules or components. The platform may be configured to perform one or more of the method steps set out below.

A method for running mobile device software, the method comprising: receiving, on an apparatus, a request to run mobile device software (e.g. 110 in FIG. 1A); determining whether a platform (including up-to-date platform; e.g. 125 in FIG. 1B) for operating the mobile device software is installed on the apparatus and whether the mobile device software (including up-to-date platform; e.g. 130 in FIG. 1B) is installed on the apparatus; connecting to one or more servers to download the platform from the one or more servers to the apparatus if the platform (including up-to-date platform) is determined to be not installed on the apparatus, and/or download the mobile device software from the one or more servers to the apparatus if the mobile device software (including up-to-date mobile device software) is determined to be not installed on the apparatus (e.g. 120 to 130 in FIG. 1B); installing the platform if the platform is determined to be not installed on the apparatus (e.g. 120 to 130 in FIG. 1B); instructing the platform to install the mobile device software if the mobile device software is determined to be not installed on the apparatus (e.g. 120 to 130 in FIG. 1B); determining at the apparatus screen size and/or orientation for displaying graphical contents of the mobile device software on a display of the apparatus (e.g. 135 in FIG. 1B); running the mobile device software on the apparatus through the platform (e.g. 135 in FIG. 1B) if the platform is installed and the mobile device software is installed; translating at the apparatus graphical contents generated by the mobile device software running through the platform into the graphical contents of the mobile device software that are displayable on the display of the apparatus (e.g. 135 in FIG. 1B); and converting at the apparatus user controls received at the apparatus to controls for the mobile device software based on predefined configuration data (e.g. the map of controls previously described) and instructing the platform to execute the controls for the mobile device software (e.g. 140 to 155 in FIG. 1B), wherein the platform is configured to operate in an existing operating system of the apparatus to run the mobile device software and the existing operating system of the apparatus is not originally configured to run the mobile device software.

The apparatus mentioned in the aforementioned method may be a personal computer.

The displaying of the graphical contents of the mobile device software on the display of the apparatus may comprise displaying the graphical contents of the mobile device software running through the platform on a browser (e.g. 135 in FIG. 1B).

The method may further comprise downloading an executable application from the one or more servers to the apparatus that is configured to perform the downloading of the platform and/or the mobile device software from the one or more servers to the apparatus if the executable application of the apparatus is not installed in the apparatus (e.g. 120 in FIG. 1B).

The received request to run the mobile device software may be made through a browser installed in the apparatus and the method further comprises: determining whether a browser extension to allow a webpage to detect whether the platform and/or the mobile device software are installed on the apparatus, and allow the webpage to transmit a command to the platform to run the mobile device software if the platform and the mobile device software are installed on the apparatus (e.g. 115 in FIG. 1A); and connecting to the one or more servers to download the browser extension from the one or more servers to the apparatus and installing the browser extension if the browser extension is determined to be not installed on the apparatus (e.g. 117 in FIG. 1A), wherein the displaying of the graphical contents of the mobile device software on the display of the apparatus comprises displaying the graphical contents of the mobile device software that are displayable on the display of the apparatus on the installed browser (e.g. 135 in FIG. 1B). To clarify, it should be understood that all instances of the browser referred to in the present paragraph is one that is installed in the apparatus and is determined whether the particular browser extension is installed.

The method may further comprise determining whether a browser that allow a webpage to detect whether the platform and/or the mobile device software are installed on the apparatus, and allow the webpage to transmit a command to the platform to run the mobile device software if the platform and the mobile device software are installed on the apparatus (e.g. 112 in FIG. 1A); and connecting to the one or more servers to download the browser from the one or more servers to the apparatus and installing the browser if the browser is determined to be not installed on the apparatus (e.g. 117 in FIG. 1A), wherein the displaying of the graphical contents of the mobile device software on the display of the apparatus comprises displaying the graphical contents of the mobile device software that are displayable on the display of the apparatus on the browser (e.g. 135 in FIG. 1B).

The method may further comprise creating a shortcut displayable on the display to enable a user to make the request to run the mobile device software by selecting the shortcut (e.g. 135 in FIG. 1B), wherein the shortcut may be created when the mobile device software is determined to be not installed on the apparatus and the request to run the mobile device software is received.

The method may further comprise instructing the platform to start running; receiving a status update from the platform that the platform has started running; instructing the platform to install the downloaded mobile device software if the mobile device software is determined to be not installed on the apparatus before running the mobile device software through the platform; and receiving a status update from the platform that the mobile device software has started running before the displaying of the graphical contents of the mobile device software on the display of the apparatus (e.g. 135 in FIG. 1B). These steps advantageously facilitate bypassing of the loading/home screen of mobile operating systems and not displaying them, and as a result, only the graphical contents of the mobile device software is displayed. This makes the user experience to run the mobile device software appears more seamless.

The method may further comprise activating a downloader module of the executable application of the apparatus to perform the downloading of the platform and/or the mobile device software from the one or more servers; and processing connection data provided by the application of the apparatus to connect to the one or more servers to enable the downloader module to perform the downloading of the platform and/or the mobile device software from the one or more servers (e.g. 120 in FIG. 1B).

The method may further comprise displaying information from the predefined configuration data (e.g. 814 in FIG. 8E) on the display for informing a user which user control at the apparatus converts to which control for the mobile device software.

The method may further comprise receiving user input (e.g. 806 in FIG. 8A, 810 in FIGS. 8B, and 812 in FIG. 8C) at the apparatus to edit the configuration data to set how user control at the apparatus converts to control for the mobile device software.

The method may further comprise operating the platform to connect to the one or more servers to receive one or more links, announcements and/or advertisements for displaying on the display of the apparatus (e.g. 240 in FIG. 2).

The method may further comprise receiving user input directed to the one or more links, announcements or advertisements; and downloading to the apparatus software associated with the one or more links, announcements or advertisements, the software including the mobile device software or the platform and the mobile device software, or activating software associated with the one or more links, announcements or advertisements through the platform (e.g. 260 in FIG. 2).

The method may further comprise creating a shortcut displayable on the display to enable a user to make a request to run the software associated with the one or more links, announcements and/or advertisements by selecting the shortcut (e.g. 270 in FIG. 2).

The one or more links, announcements or advertisements may be in a form of a plug-in on a webpage of a browser, wherein the method may further comprise receiving the user input directed to the plug-in on the webpage of the browser (e.g. 1510 in FIG. 15); upon user approval, downloading to the apparatus software associated with the plug-in (e.g. 1514 in FIG. 15); upon user request, activating the downloaded software through the platform; and displaying graphical contents of the software on the webpage (e.g. 1516 in FIG. 15).

The method may further comprise collating a record of a plurality of mobile applications downloaded to the apparatus or had run on the platform (e.g. 340 in FIG. 3); and presenting at least one suggestion for a mobile application for consumption by a user, wherein the record contributes to derivation of the at least one suggestion (e.g. 355 in FIG. 3).

The method may further comprise operating the platform to provide an instant messaging platform or social networking platform to operate together with the mobile device software running on the apparatus.

The method may further comprise operating the platform to stream content of the mobile device software running on the apparatus through the platform to an external device, wherein user controls received at the external device are converted to controls for the mobile device software running on the apparatus.

The method may further comprise extending user input area for controls for the mobile device software to beyond a display area displaying graphical contents of the mobile device software in the display (e.g. FIG. 8F and the accompanying description).

The method may further comprise bundling more than one mobile device software; receiving user input directed to download one of the bundled more than one mobile device software; and downloading to the apparatus the bundled more than one mobile device software upon receiving the user input (e.g. 1304 in FIG. 13).

One of the bundled mobile device software may be a machine-suggested mobile device software for downloading; wherein the method further comprises: downloading to the apparatus the bundled more than one mobile device software, including the machine-suggested mobile device software, upon receiving the user input (e.g. 1304 in FIG. 13).

The method may further comprise installing the machine-suggested mobile device software after a predetermined time period (e.g. 1316 in FIG. 13).

The method may further comprise uninstalling downloaded mobile device software after a predetermined time period of non-use by a user.

The method may further comprise setting a timeframe associated to a user profile based on how the request to run mobile device software is made; and performing a silent downloading/installation process to download/install the platform and/or the mobile device software in the background at the apparatus if the timeframe is exceeded.

An apparatus (e.g. 530 in FIG. 5, and 930 in FIG. 9) for running mobile device software, the apparatus comprises: a memory (e.g. 603 and 610 of FIG. 6); and a processor (e.g. 601 in FIG. 6) configured to execute instructions stored in the memory to operate the apparatus to receive a request to run a mobile device software; determine whether a platform (including up-to-date platform; e.g. 1204 in FIG. 12) for running the mobile device software is installed on the apparatus and whether the mobile device software (including up-to-date mobile device software) is installed on the apparatus; connect to one or more servers (e.g. 540 in FIG. 5, 700 in FIG. 7, 920 in FIGS. 9B & 9D, and 1206 in FIG. 12) to download the platform (including up-to-date platform) from the server to the apparatus if the platform is determined to be not installed on the apparatus, and/or download the mobile device software (including up-to-date mobile device software) from the one or more servers to the apparatus if the mobile device software is determined to be not installed on the apparatus; install the platform if the platform is determined to be not installed on the apparatus; instruct the platform to install the mobile device software if the mobile device software is determined to be not installed on the apparatus; determine at the apparatus screen size and/or orientation for displaying graphical contents of the mobile device software on a display of the apparatus; run the mobile device software on the apparatus through the platform if the platform is installed and the mobile device software is installed; translate at the apparatus graphical contents generated by the mobile device software running through the platform into the graphical contents of the mobile device software that are displayable on the display of the apparatus; and convert at the apparatus user controls received at the apparatus to controls for the mobile device software based on predefined configuration data (e.g. the map of controls previously described) and instruct the platform to execute the controls for the mobile device software, wherein the platform is configured to operate in an existing operating system of the apparatus to run the mobile device software and the existing operating system of the apparatus is not originally configured to run the mobile device software.

The apparatus (e.g. 530 in FIG. 5, and 930 in FIGS. 9B & 9D) may be a personal computer.

The graphical contents of the mobile device software that are displayable on the display of the apparatus may be displayed on a browser.

The processor (e.g. 601 in FIG. 6) may be configured to execute instructions stored in the memory (e.g. 603 and 610 of FIG. 6) to operate the apparatus (530 in FIG. 5, and 930 in FIGS. 9B & 9D) to: downloading an executable application (e.g. 915 in FIG. 9 and the PEF previously described) from the one or more servers (e.g. 540 in FIG. 5, 700 in FIG. 7, 920 in FIGS. 9B & 9D, and 1206 in FIG. 12) to the apparatus that is configured to perform the downloading of the platform (e.g. 1204 in FIG. 12) and/or the mobile device software from the one or more servers to the apparatus if the executable application of the apparatus is not installed in the apparatus.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: when the received request to run the mobile device software is made through a browser installed in the apparatus, activate the application (e.g. 915 in FIG. 9A and the PEF previously described) of the apparatus to determine whether a browser extension to allow a webpage to detect whether the platform (e.g. 1204 in FIG. 12) and/or the mobile device software are installed on the apparatus, and allow the webpage to transmit a command to the platform to run the mobile device software if the platform and the mobile device software are installed on the apparatus; connect to the one or more servers (e.g. 540 in FIG. 5, 700 in FIG. 7, 920 in FIGS. 9B & 9D, and 1206 in FIG. 12) to download the browser extension from the one or more servers to the apparatus and install the browser extension if the browser extension is determined to be not installed on the apparatus; and display the graphical contents of the mobile device software that are displayable on the display of the apparatus on the installed browser. To clarify, it should be understood that all instances of the browser referred to in the present paragraph is one that is installed in the apparatus and is determined whether the particular browser extension is installed.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: determine whether a browser that allow a webpage to detect whether the platform and/or the mobile device software are installed on the apparatus, and allow the webpage to transmit a command to the platform to run the mobile device software if the platform (e.g. 1204 in FIG. 12) and the mobile device software are installed on the apparatus, and connect to the one or more servers (e.g. 540 in FIG. 5, 700 in FIG. 7, 920 in FIGS. 9B & 9D, and 1206 in FIG. 12) to download the browser from the one or more servers to the apparatus and install the browser if the browser is determined to be not installed on the apparatus; and display the graphical contents of the mobile device software that are displayable on the display of the apparatus on the browser. To clarify, it should be understood that all instances of the browser referred to in the present paragraph is one that enables running of the mobile device software.

The apparatus (e.g. 530 in FIG. 5, and 930 in FIGS. 9B & 9D) may comprise the display (e.g. 602 in FIG. 6) to display a shortcut to enable a user to make the request to run the mobile device software by selecting the shortcut, wherein the shortcut is created when the mobile device software is determined to be not installed on the apparatus and the request to run the mobile device software is received.

The processor (e.g. 601 in FIG. 6) may be configured to execute instructions stored in the memory (e.g. 603 and 610 of FIG. 6) to operate the apparatus (e.g. 530 in FIG. 5, 930 in FIGS. 9B & 9D) to instruct the platform to start running; receive a status update from the platform that the platform has started running; instruct the platform to install the downloaded mobile device software if the mobile device software is determined to be not installed on the apparatus before running the mobile device software through the platform; and receive a status update from the platform that the mobile device software has started running before the displaying of the graphical contents of the mobile device software on the display of the apparatus. These features advantageously facilitate bypassing of the loading/home screen of mobile operating systems and not displaying them, and as a result, only the graphical contents of the mobile device software is displayed. This makes the user experience to run the mobile device software appears more seamless.

The executable application (e.g. 915 in FIG. 9A and the PEF previously described) of the apparatus (e.g. 530 in FIG. 5, and 930 in FIG. 9) may comprise: a downloader module (e.g. 935 in FIGS. 9A, 9B & 9D) to perform the downloading of the platform (e.g. 1204 in FIG. 12) and the mobile device software from the one or more servers (e.g. 540 in FIG. 5, 700 in FIG. 7, 920 in FIG. 9, and 1206 in FIG. 12); and connection data for connecting to the one or more servers to enable the downloader module to perform the downloading of the platform and/or the mobile device software from the one or more servers.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to display information from the predefined configuration data on the display (e.g. 602 in FIG. 6) of the apparatus for informing a user which user control at the apparatus converts to which control for the mobile device software.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to receive user input at the apparatus to edit the configuration data to set how user control at the apparatus converts to control for the mobile device software.

The apparatus (e.g. 530 in FIG. 5, and 930 in FIGS. 9B & 9D) may comprise the display (e.g. 602 in FIG. 6), and the processor may be configured to execute instructions stored in the memory (e.g. 603 and 610 of FIG. 6) to operate the apparatus to: operate the platform (e.g. 1204 in FIG. 12) to connect to the one or more servers (e.g. 540 in FIG. 5, 700 in FIG. 7, 920 in FIGS. 9B & 9D, and 1206 in FIG. 12) to receive one or more links, announcements and/or advertisements for displaying on the display of the apparatus.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: receive user input directed to the one or more links, announcements or advertisements; and download to the apparatus software associated with the one or more links, announcements or advertisements, the software including the mobile device software or the platform and the mobile device software, or activate software associated with the one or more links, announcements or advertisements through the platform.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: create a shortcut displayable on the display (e.g. 602 in FIG. 6) to enable a user to make a request to run the software associated with the one or more links, announcements and/or advertisements by selecting the shortcut.

The one or more links, announcements or advertisements may be in a form of a plug-in on a webpage of a browser, wherein the processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: receive the user input directed to the plug-in on the webpage of the browser (e.g. 1510 in FIG. 15); upon user approval, download to the apparatus software associated with the plug-in (e.g. 1514 in FIG. 15); upon user request, activate the downloaded software through the platform; and display graphical contents of the software on the webpage (e.g. 1516 in FIG. 15).

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: collate a record of a plurality of mobile device software downloaded to the apparatus or had run on the platform (e.g. 1204 in FIG. 12); and present at least one suggestion for a mobile device software for consumption by a user on the display (e.g. 602 in FIG. 6) of the apparatus, wherein the record contributes to derivation of the at least one suggestion.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to operate the platform (e.g. 1204 in FIG. 12) to provide an instant messaging platform or social networking platform to operate together with the mobile device software running on the apparatus.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to operate the platform (e.g. 1204 in FIG. 12) to stream content of the mobile device software run on the apparatus to an external device (e.g. 958 in FIG. 9C), wherein user controls received at the external device are converted to controls for the mobile device software run on the apparatus.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: extend user input area for controls for the mobile device software to beyond a display area displaying graphical contents of the mobile device software in the display (e.g. FIG. 8F and the accompanying description).

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: bundle more than one mobile device software; receive user input directed to download one of the bundled more than one mobile device software; and download to the apparatus the bundled more than one mobile device software upon receiving the user input (e.g. 1304 in FIG. 13).

One of the bundled mobile device software may be a machine-suggested mobile device software for downloading and the processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: download to the apparatus the bundled more than one mobile device software, including the machine-suggested mobile device software, upon receiving the user input (e.g. 1304 in FIG. 13).

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: install the machine-suggested mobile device software after a predetermined time period (e.g. 1316 in FIG. 13).

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: uninstall downloaded mobile device software after a predetermined time period of non-use by a user.

The processor (e.g. 601 in FIG. 6) may be configured to execute instructions stored in the memory (e.g. 603 and 610 of FIG. 6) to operate the apparatus (e.g. 530 in FIG. 5, and 930 in FIGS. 9B & 9D) to: set a timeframe associated to a user profile based on how the request to run mobile device software is made; and perform a silent downloading/installation process to download/install the platform (including up-to-date platform; e.g. 125 in FIG. 1B) and/or the mobile device software in the background at the apparatus if the timeframe is exceeded.

A non-transitory computer readable storage medium embodying thereon a program of computer readable instructions which, when executed by one or more processors (e.g. 601 in FIG. 6) of an apparatus (e.g. 530 in FIG. 5, and 930 in FIGS. 9B & 9D), cause the apparatus to carry out a method for running mobile device software, the method comprising: receiving, on the apparatus, a request to run the mobile device software (e.g. 110 in FIG. 1A); determining whether a platform (including up-to-date platform; e.g. 125 in FIG. 1B) for operating the mobile device software is installed on the apparatus and whether the mobile device software (including up-to-date platform; e.g. 130 in FIG. 1B) is installed on the apparatus; connecting to one or more servers (e.g. 540 in FIG. 5, 700 in FIG. 7, 920 in FIGS. 9B & 9D, and 1206 in FIG. 12) to download the platform from the one or more servers to the apparatus if the platform (including up-to-date platform) is determined to be not installed on the apparatus, and/or download the mobile device software from the one or more servers to the apparatus if the mobile device software (including up-to-date mobile device software) is determined to be not installed on the apparatus (e.g. 120 to 130 in FIG. 1B); installing the platform if the platform is determined to be not installed on the apparatus; instructing the platform to install the mobile device software if the mobile device software is determined to be not installed on the apparatus; determining at the apparatus screen size and/or orientation for displaying graphical contents of the mobile device software on a display of the apparatus (e.g. 135 in FIG. 1B); running the mobile device software on the apparatus through the platform (e.g. 135 in FIG. 1B) if the platform is installed and the mobile device software is installed; translating at the apparatus graphical contents generated by the mobile device software running through the platform into the graphical contents of the mobile device software that are displayable on the display of the apparatus (e.g. 135 in FIG. 1B); and converting at the apparatus user controls received at the apparatus to controls for the mobile device software based on predefined configuration data (e.g. the map of controls previously described) and instructing the platform to execute the controls for the mobile device software (e.g. 140 to 155 in FIG. 1B), wherein the platform is configured to operate in an existing operating system of the apparatus to run the mobile device software and the existing operating system of the apparatus is not originally configured to run the mobile device software.

In the aforementioned features, the determination that checks whether the platform and mobile device software are installed is not just to see if the platform and mobile device software exists on the apparatus, it also checks whether the latest versions of the platform and the mobile device software exist. If they do not exist, each of them is downloaded. It is noted that in some examples, the platform and the mobile device software may be provided with or already installed on the apparatus. In these examples, whether the latest versions of the platform and the mobile device software are installed would be checked and the latest versions of the platform and/or the mobile device software, if not installed, would be installed accordingly.

Throughout this specification and claims which follow, unless the context requires otherwise, the word "comprise", and variations such as "comprises" or "comprising", will be understood to imply the inclusion of a stated integer or group of integers or steps but not the exclusion of any other integer or group of integers.

While the invention has been described in the present disclosure in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

The invention claimed is:

1. A method for running mobile device software, the method comprising:
   receiving, on an apparatus, a request to run mobile device software, wherein the apparatus is a user machine;
   determining whether a platform for operating the mobile device software is installed on the apparatus and whether the mobile device software is installed on the apparatus;
   connecting to one or more servers to
      download the platform from the one or more servers to the apparatus if the platform is determined to be not installed on the apparatus, and/or
      download the mobile device software from the one or more servers to the apparatus if the mobile device software is determined to be not installed on the apparatus;
   installing the platform if the platform is determined to be not installed on the apparatus;
   instructing the platform to install the mobile device software if the mobile device software is determined to be not installed on the apparatus;
   determining at the apparatus screen size and/or orientation for displaying graphical contents of the mobile device software on a display of the apparatus;
   running the mobile device software locally and not remotely on the apparatus through the platform when the downloaded platform and the downloaded mobile device software are installed;
   translating at the apparatus graphical contents generated by the mobile device software running through the platform into the graphical contents of the mobile device software that are displayable on the display of the apparatus; and
   converting at the apparatus user controls received at the apparatus to controls for the mobile device software based on predefined configuration data and instructing the platform to execute the controls for the mobile device software, wherein the predefined configuration data is defined before the mobile device software is downloaded to the apparatus,
   wherein the platform is configured to operate in an existing operating system of the apparatus to run the mobile device software and the existing operating system of the apparatus is not originally configured to run the mobile device software,
   wherein the received request to run the mobile device software is made through a first browser installed in the apparatus and the method further comprises:
   determining installation of a browser extension to
      allow a webpage to detect whether the platform and/or the mobile device software are installed on the apparatus, and
      allow the webpage to transmit a command to the platform to run the mobile device software when the downloaded platform and the downloaded mobile device software are installed on the apparatus; and
   connecting to the one or more servers to download the browser extension from the one or more servers to the apparatus and installing the browser extension if the browser extension is determined to be not installed on the apparatus, wherein
   displaying the graphical contents of the mobile device software on the display of the apparatus comprises displaying the graphical contents of the mobile device software that are displayable on the display of the apparatus on the installed browser.

2. The method as claimed in claim 1, wherein the apparatus is a personal computer.

3. The method as claimed in claim 1, wherein the method further comprises:
   downloading an executable application from the one or more servers to the apparatus that is configured to perform the downloading of the platform and/or the mobile device software from the one or more servers to the apparatus if the executable application of the apparatus is not installed in the apparatus.

4. The method as claimed in claim 1, wherein the method further comprises:
   determining installation of a second browser that allows a webpage to detect whether the platform and/or the mobile device software are installed on the apparatus, and allows the webpage to transmit a command to the platform to run the mobile device software when the downloaded platform and the downloaded mobile device software are installed on the apparatus; and connecting to the one or more servers to download the second browser from the one or more servers to the apparatus and installing the second browser if the second browser is determined to be not installed on the apparatus, wherein displaying the graphical contents of the mobile device software on the display of the apparatus comprises displaying the graphical contents of the mobile device software that are displayable on the display of the apparatus on the second browser.

5. The method as claimed in claim 1, wherein the method further comprises:

creating a shortcut displayable on the display to enable a user to make the request to run the mobile device software by selecting the shortcut, wherein the shortcut is created when the mobile device software is determined to be not installed on the apparatus and the request to run the mobile device software is received.

6. The method as claimed in claim 1, wherein the method further comprises:

instructing the platform to start running;

receiving a status update from the platform that the platform has started running;

instructing the platform to install the downloaded mobile device software if the mobile device software is determined to be not installed on the apparatus before running the mobile device software through the platform; and receiving a status update from the platform that the mobile device software has started running before the displaying of the graphical contents of the mobile device software on the display of the apparatus.

7. The method as claimed in claim 3, wherein the method further comprises:

activating a downloader module of the executable application of the apparatus to perform the downloading of the platform and/or the mobile device software from the one or more servers; and processing connection data provided by the application of the apparatus to connect to the one or more servers to enable the downloader module to perform the downloading of the platform and/or the mobile device software from the one or more servers.

8. The method as claimed in claim 7, wherein the executable application comprises the configuration data, the connection data and the downloader module.

9. The method as claimed in claim 7, wherein the executable application comprises images relating to the mobile device software for shortcut creation.

10. The method as claimed in claim 1, wherein the method further comprises:

displaying information from the configuration data on the display for informing a user which user control at the apparatus converts to which control for the mobile device software.

11. The method as claimed in claim 1, wherein the method further comprises:

receiving user input at the apparatus to edit the predefined configuration data to set how user control at the apparatus converts to control for the mobile device software.

12. The method as claimed in claim 1, wherein the method further comprises:

operating the platform to connect to the one or more servers to receive one or more links, announcements and/or advertisements for displaying on the display of the apparatus.

13. The method as claimed in claim 1, wherein the method further comprises:

collating a record of a plurality of mobile device software downloaded to the apparatus or had run on the platform; and presenting at least one suggestion for a mobile device software for consumption by a user on the display of the apparatus, wherein the record contributes to derivation of the at least one suggestion.

14. The method as claimed in claim 1, wherein the method further comprises:

operating the platform to provide an instant messaging platform or social networking platform to operate together with the mobile device software running on the apparatus.

15. The method as claimed in claim 1, wherein the method further comprises:

operating the platform to stream content of the mobile device software running on the apparatus to an external device, wherein user controls received at the external device are converted to controls for the mobile device software running on the apparatus.

16. The method as claimed in claim 1, wherein the method further comprises:

extending user input area for controls for the mobile device software to beyond a display area displaying graphical contents of the mobile device software in the display.

17. The method as claimed in claim 1, wherein the method further comprises:

bundling more than one mobile device software;

receiving user input directed to download one of the bundled more than one mobile device software; and downloading to the apparatus the bundled more than one mobile device software upon receiving the user input.

18. The method as claimed in claim 17, wherein one of the bundled mobile device software is a machine-suggested mobile device software for downloading; and the method further comprises:

downloading to the apparatus the bundled more than one mobile device software, including the machine-suggested mobile device software, upon receiving the user input.

19. The method as claimed in claim 18, wherein the method further comprises installing the machine-suggested mobile device software after a predetermined time period.

20. The method as claimed in claim 1, wherein the method further comprises: uninstalling downloaded mobile device software after a predetermined time period of non-use by a user.

21. The method as claimed in claim 1, wherein the method further comprises:

setting a timeframe associated to a user profile based on how the request to run mobile device software is made; and performing a silent downloading/installation process to download/install the platform and/or the mobile device software in the background at the apparatus if the timeframe is exceeded.

22. An apparatus for running mobile device software, the apparatus comprises:
   a memory;
   a display; and
   a processor configured to execute instructions stored in the memory to operate the apparatus to receive a request to run a mobile device software; and
   determine whether a platform for running the mobile device software is installed on the apparatus and whether the mobile device software is installed on the apparatus;
   connect to one or more servers to
      download the platform from the server to the apparatus if the platform is determined to be not installed on the apparatus, and/or
      download the mobile device software from the one or more servers to the apparatus if the mobile device software is determined to be not installed on the apparatus;
   install the platform if the platform is determined to be not installed on the apparatus;
   instruct the platform to install the mobile device software if the mobile device software is determined to be not installed on the apparatus;
   determine at the apparatus screen size and/or orientation for displaying the graphical contents of the mobile device software on the display;
   run the mobile device software locally and not remotely on the apparatus through the platform when the downloaded platform is installed and the downloaded mobile device software is installed;
   translate at the apparatus graphical contents generated by the mobile device software run through the platform into the graphical contents of the mobile device software that are displayable on the display;
   convert at the apparatus user controls received at the apparatus to controls for the mobile device software based on configuration data and instruct the platform to execute the controls for the mobile device software, wherein the predefined configuration data is defined before the mobile device software is downloaded to the apparatus;
   when the received request to run the mobile device software is made through a first browser installed in the apparatus,
   determine installation of a browser extension to
      allow a webpage to detect whether the platform and/or the mobile device software are installed on the apparatus, and
      allow the webpage to transmit a command to the platform to run the mobile device software when the downloaded platform and the downloaded mobile device software are installed on the apparatus; and
   connect to the one or more servers to download the browser extension from the one or more servers to the apparatus and install the browser extension if the browser extension is determined to be not installed on the apparatus; and
   display the graphical contents of the mobile device software that are displayable on the display of the apparatus on the installed browser,
   wherein the platform is configured to operate in an existing operating system of the apparatus to run the mobile device software and the existing operating system of the apparatus is not originally configured to run the mobile device software,
   wherein the apparatus is a user machine.

23. The apparatus as claimed in claim 22, wherein the apparatus is a personal computer.

24. The apparatus as claimed in claim 22, wherein the processor is configured to execute instructions stored in the memory to operate the apparatus to:
   download an executable application from the one or more servers to the apparatus that is configured to perform the downloading of the platform and/or the mobile device software from the one or more servers to the apparatus if the executable application of the apparatus is not installed in the apparatus.

25. The apparatus as claimed in claim 22, wherein the processor is configured to execute instructions stored in the memory to operate the apparatus to:
   determine whether a second browser that enables displaying of the graphical contents of the mobile device software on the second browser is installed on the apparatus, and
   connect to the one or more servers to download the second browser from the one or more servers to the apparatus and install the second browser if the second browser is determined to be not installed on the apparatus; and
   display the graphical contents of the mobile device software that are displayable on the display of the apparatus on the second browser.

26. The apparatus as claimed in claim 22, wherein a shortcut is displayable on the display to enable a user to make the request to run the mobile device software by selecting the shortcut, wherein the shortcut is created when the mobile device software is determined to be not installed on the apparatus and the request to run the mobile device software is received.

27. The apparatus as claimed in claim 22, wherein the processor is configured to execute instructions stored in the memory to operate the apparatus to:
   instruct the platform to start running;
   receive a status update from the platform that the platform has started running;
   instruct the platform to install the downloaded mobile device software if the mobile device software is determined to be not installed on the apparatus before running the mobile device software through the platform; and
   receive a status update from the platform that the mobile device software has started running before the displaying of the graphical contents of the mobile device software on the display of the apparatus.

28. The apparatus as claimed in claim 27, wherein the executable application of the apparatus comprises:
   a downloader module to perform the downloading of the platform and the mobile device software from the one or more servers; and
   connection data for connecting to the one or more servers to enable the downloader module to perform the downloading of the platform and/or the mobile device software from the one or more servers.

29. The apparatus as claimed in claim 28, wherein the executable application comprises the configuration data, the connection data and the downloader module.

30. The apparatus as claimed in claim 28, wherein the executable application comprises images relating to the mobile device software for shortcut creation.

31. The apparatus as claimed in claim 22, wherein the processor is configured to execute instructions stored in the memory to operate the apparatus to:
  display information from the predefined configuration data on the display of the apparatus for informing a user which user control at the apparatus converts to which control for the mobile device software.

32. The apparatus as claimed in claim 22, wherein the processor is configured to execute instructions stored in the memory to operate the apparatus to:
  receive user input at the apparatus to edit the predefined configuration data to set how user control at the apparatus converts to control for the mobile device software.

33. The apparatus as claimed in claim 22, wherein the processor is configured to execute instructions stored in the memory to operate the apparatus to:
  operate the platform to connect to the one or more servers to receive one or more links, announcements and/or advertisements for displaying on the display of the apparatus.

34. The apparatus as claimed in claim 22, wherein the processor is configured to execute instructions stored in the memory to operate the apparatus to:
  collate a record of a plurality of mobile device software downloaded to the apparatus or had run on the platform; and
  present at least one suggestion for a mobile device software for consumption by a user on the display of the apparatus,
wherein the record contributes to derivation of the at least one suggestion.

35. The apparatus as claimed in claim 22, wherein the processor is configured to execute instructions stored in the memory to operate the apparatus to:
  operate the platform to provide an instant messaging platform or social networking platform to operate together with the mobile device software run on the apparatus.

36. The apparatus as claimed in claim 22, wherein the processor is configured to execute instructions stored in the memory to operate the apparatus to:
  operate the platform to stream content of the mobile device software run on the apparatus to an external device, wherein user controls received at the external device are converted to controls for the mobile device software run on the apparatus.

37. The apparatus as claimed in claim 22, wherein the processor is configured to execute instructions stored in the memory to operate the apparatus to:
  extend user input area for controls for the mobile device software to beyond a display area displaying graphical contents of the mobile device software in the display.

38. The apparatus as claimed in claim 22, wherein the processor is configured to execute instructions stored in the memory to operate the apparatus to:
  bundle more than one mobile device software;
  receive user input directed to download one of the bundled more than one mobile device software; and
  download to the apparatus the bundled more than one mobile device software upon receiving the user input.

39. The apparatus as claimed in claim 38, wherein one of the bundled mobile device software is a machine-suggested mobile device software for downloading and the processor is configured to execute instructions stored in the memory to operate the apparatus to:
  download to the apparatus the bundled more than one mobile device software, including the machine-suggested mobile device software, upon receiving the user input.

40. The apparatus as claimed in claim 38, wherein the processor is configured to execute instructions stored in the memory to operate the apparatus to:
  install the machine-suggested mobile device software after a predetermined time period.

41. The apparatus as claimed in claim 22, wherein the processor is configured to execute instructions stored in the memory to operate the apparatus to:
  uninstall downloaded mobile device software after a predetermined time period of non-use by a user.

42. The apparatus as claimed in claim 22 wherein the processor is configured to execute instructions stored in the memory to operate the apparatus to:
  set a timeframe associated to a user profile based on how the request to run mobile device software is made; and
  perform a silent downloading/installation process to download/install the platform and/or the mobile device software in the background at the apparatus if the timeframe is exceeded.

43. A non-transitory computer readable storage medium embodying thereon a program of computer readable instructions which, when executed by one or more processors of an apparatus, cause the apparatus to carry out a method for running mobile device software, the method comprising:
  receiving, on the apparatus, a request to run the mobile device software, wherein the apparatus is a user machine;
  determining whether a platform for operating the mobile device software is installed on the apparatus and whether the mobile device software is installed on the apparatus; and
  connecting to one or more servers to
    download the platform from the one or more servers to the apparatus if the platform is determined to be not installed on the apparatus, and/or
    download the mobile device software from the one or more servers to the apparatus if the mobile device software is determined to be not installed in the apparatus;
  installing the platform if the platform is determined to be not installed on the apparatus;
  instructing the platform to install the mobile device software if the mobile device software is determined to be not installed on the apparatus;
  determining at the apparatus screen size and/or orientation for displaying graphical contents of the mobile device software on a display of the apparatus;
  running the mobile device software locally and not remotely on the apparatus through the platform when the downloaded platform is installed and the downloaded mobile device software is installed;
  translating at the apparatus graphical contents generated by the mobile device software run through the platform into the graphical contents of the mobile device software that are displayable on the display of the apparatus;
  and
  converting at the apparatus user controls received at the apparatus to controls for the mobile device software based on predefined configuration data and instructing the platform to execute the controls for the mobile device software, wherein the predefined configuration data is defined before the mobile device software is downloaded to the apparatus, wherein the platform is configured to operate in an existing operating system of the apparatus to run the mobile device software and the existing operating system of the apparatus is not originally configured to run the mobile device software, wherein the received request to run the mobile device software is made through a browser installed in the apparatus and the method further comprises:

determining installation of a browser extension to
- allow a webpage to detect whether the platform and/or the mobile device software are installed on the apparatus, and
- allow the webpage to transmit a command to the platform to run the mobile device software when the downloaded platform and the downloaded mobile device software are installed on the apparatus; and connecting to the one or more servers to download the browser extension from the one or more servers to the apparatus and installing the browser extension if the browser extension is determined to be not installed on the apparatus, wherein displaying the graphical contents of the mobile device software on the display of the apparatus comprises displaying the graphical contents of the mobile device software that are displayable on the display of the apparatus on the installed browser.

* * * * *